(12) United States Patent
Jhang et al.

(10) Patent No.: US 12,072,473 B2
(45) Date of Patent: Aug. 27, 2024

(54) OPTICAL IMAGING LENS INCLUDING NINE LENSES OF +-+-++++- OR +-+--++-- REFRACTIVE POWERS

(71) Applicant: GENIUS ELECTRONIC OPTICAL (XIAMEN) CO., LTD., Fujian (CN)

(72) Inventors: Jia-Sin Jhang, Fujian (CN); Yanbin Chen, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 692 days.

(21) Appl. No.: 17/189,267

(22) Filed: Mar. 2, 2021

(65) Prior Publication Data
US 2022/0196978 A1    Jun. 23, 2022

(30) Foreign Application Priority Data
Dec. 18, 2020    (CN) .......................... 202011503681.5

(51) Int. Cl.
*G02B 13/00*    (2006.01)
*G02B 9/64*    (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| 2020/0209593 A1 | 7/2020 | Hirano | |
|---|---|---|---|
| 2020/0209594 A1 | 7/2020 | Hirano | |
| 2020/0271898 A1 | 8/2020 | Hirano | |
| 2022/0146793 A1* | 5/2022 | Zhou | ........................ G02B 9/64 |

FOREIGN PATENT DOCUMENTS

| CN | 111381350 | 7/2020 |
|---|---|---|
| CN | 111694137 | 9/2020 |
| CN | 111812812 | 10/2020 |
| CN | 111812814 | 10/2020 |
| TW | 202045974 | 12/2020 |
| TW | I745057 | 11/2021 |

OTHER PUBLICATIONS

"Office Action of Taiwan Counterpart Application", issued on Jul. 13, 2021, p. 1-p. 12.
"Office Action of China Counterpart Application", issued on Dec. 23, 2021, p. 1-p. 14.
"Office Action of Taiwan Counterpart Application", issued on Dec. 26, 2023, p. 1-p. 6.

* cited by examiner

Primary Examiner — Wen Huang
(74) Attorney, Agent, or Firm — JCIPRNET

(57) ABSTRACT

An optical imaging lens sequentially including a first lens element to a ninth lens element arranged in sequence from an object side to an image side along an optical axis is provided. Each of the first lens element to the ninth lens element includes an object-side surface facing the object-side surface and allowing imaging rays to pass through and an image-side surface facing the image-side and allowing the imaging rays to pass through. Lens elements of the optical imaging lens are only the nine lens elements described above, wherein the second lens element has negative refracting power, the fourth lens element has negative refracting power, an optical axis region of the object-side surface of the seventh lens element is concave, and an optical axis region of the image-side surface of the ninth lens element is concave.

19 Claims, 13 Drawing Sheets

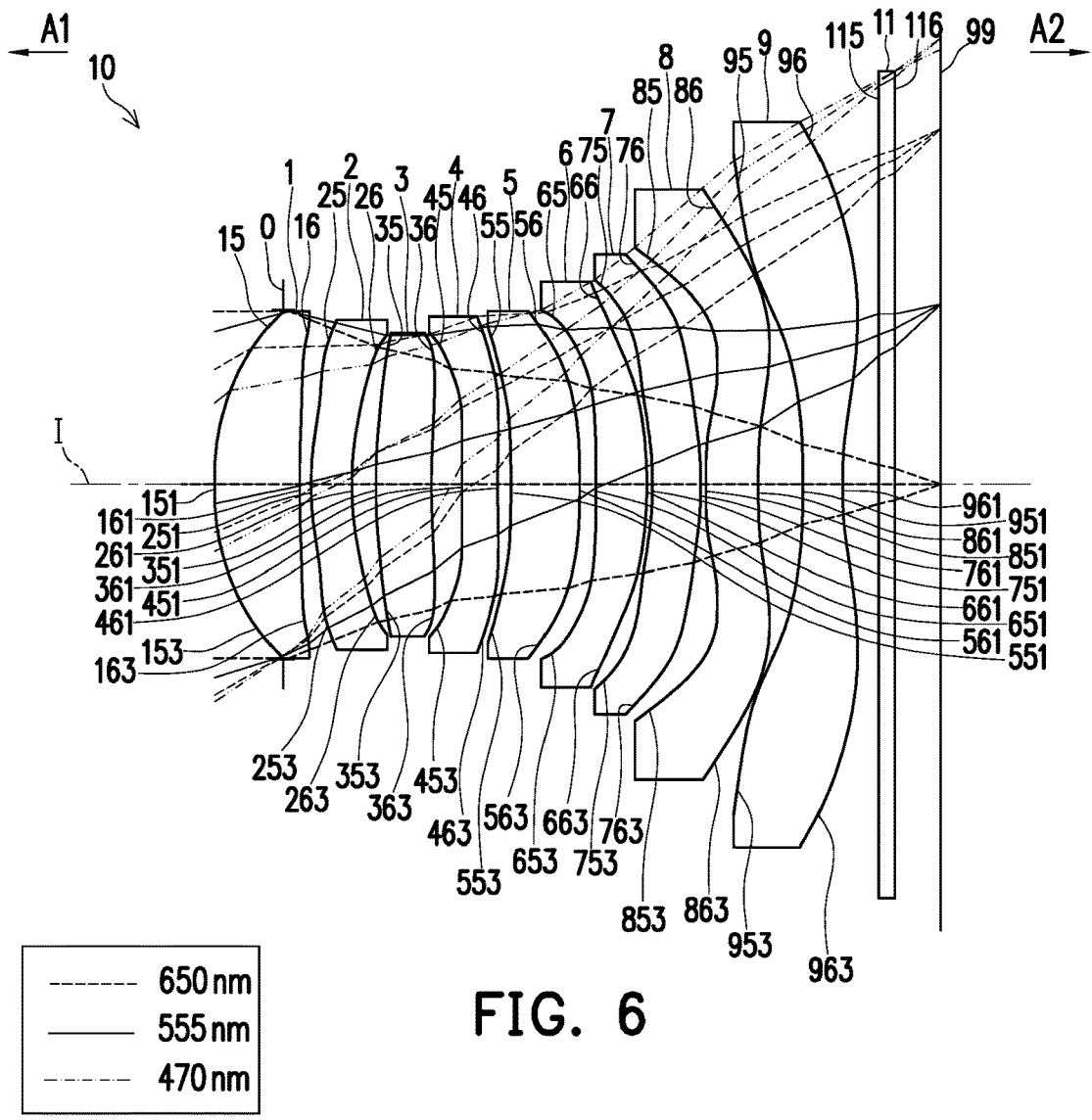
FIG. 6
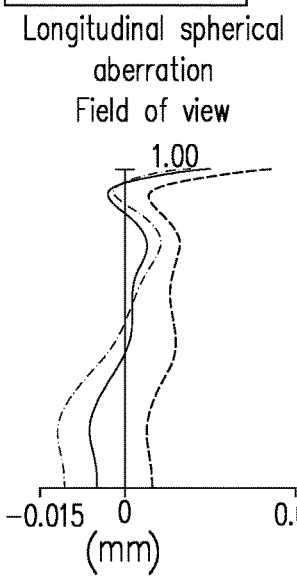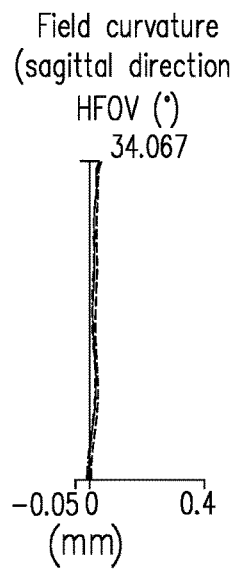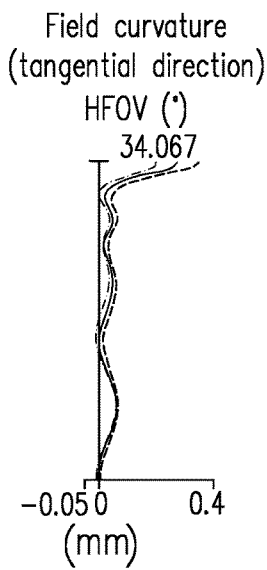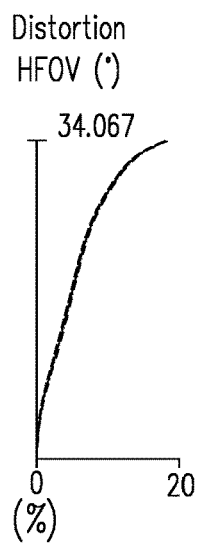
FIG. 7A  FIG. 7B  FIG. 7C  FIG. 7D

OPTICAL IMAGING LENS INCLUDING NINE LENSES OF +-+-++++- OR +-+--++-- REFRACTIVE POWERS

CROSS REFERENCE TO RELATED APPLICATION

This application claims the priority benefit of China application serial no. 202011503681.5, filed on Dec. 18, 2020. The entirety of the above-mentioned patent application is hereby incorporated by reference herein and made a part of specification.

BACKGROUND

Technical Field

The disclosure relates to an optical device, and particularly to an optical imaging lens.

Description of Related Art

In recent years, optical imaging lenses have been evolving continuously. In addition to providing compact and slim optical imaging lenses, it is also increasingly important to improve the imaging quality of the lenses, such as mitigating optical aberration, chromatic aberration, etc. However, increasing the number of optical lens elements in response to the demands also increases the distance between the object-side surface of a first lens element and the image plane on the optical axis, which is of no avail for thinning the mobile phones and digital cameras.

Therefore, it has always been a development goal of design to provide an optical imaging lens with features of compactness, slimness, and good imaging quality. In addition, a small f-number (Fno) may increase a light flux, and a large image height moderately increases the pixel size to facilitate night shooting, which also gradually becomes a market trend.

SUMMARY

The disclosure provides an optical imaging lens, which has a larger image height and meanwhile shortens a system length of the optical imaging lens and reduces an f-number (Fno) of the optical imaging lens.

The disclosure provides an optical imaging lens sequentially including a first lens element, a second lens element, a third lens element, a fourth lens element, a fifth lens element, a sixth lens element, a seventh lens element, an eighth lens element, and a ninth lens element arranged in sequence from an object side to an image side along an optical axis, and each of the first lens element to the ninth lens element includes an object-side surface facing the object-side and allowing imaging rays to pass through and an image-side surface facing the image-side and allowing the imaging rays to pass through. The second lens element has negative refracting power. The fourth lens element has negative refracting power. An optical axis region of the object-side surface of the seventh lens element is concave. An optical axis region of the image-side surface of the ninth lens element is concave, wherein lens elements of the optical imaging lens are only the nine lens elements described above.

The disclosure provides an optical imaging lens sequentially including a first lens element, a second lens element, a third lens element, a fourth lens element, a fifth lens element, a sixth lens element, a seventh lens element, an eighth lens element, and a ninth lens element arranged in sequence from an object side to an image side along an optical axis, and each of the first lens element to the ninth lens element includes an object-side surface facing the object-side and allowing imaging rays to pass through and an image-side surface facing the image-side and allowing the imaging rays to pass through. The first lens element has a positive refracting power. The third lens element has a positive refracting power. An optical axis region of the object-side surface of the seventh lens element is concave. An optical axis region of the image-side surface of the ninth lens element is concave, wherein lens elements of the optical imaging lens are only the nine lens elements described above.

The disclosure provides an optical imaging lens sequentially including a first lens element, a second lens element, a third lens element, a fourth lens element, a fifth lens element, a sixth lens element, a seventh lens element, an eighth lens element, and a ninth lens element arranged in sequence from an object side to an image side along an optical axis, and each of the first lens element to the ninth lens element includes an object-side surface facing the object-side and allowing imaging rays to pass through and an image-side surface facing the image-side and allowing the imaging rays to pass through. The second lens element has negative refracting power. The fourth lens element has negative refracting power. A periphery region of the object-side surface of the fifth lens element is concave. An optical axis region of the image-side surface of the seventh lens element is convex, wherein lens elements of the optical imaging lens are only the nine lens elements described above.

In view of the above, the optical imaging lens provided in one or more embodiments is advantageous because of the following: by satisfying the aforementioned concave-convex curved surface arrangement design and refracting power conditions, the optical imaging lens has a larger image height and meanwhile a system length of the optical imaging lens is reduced and an Fno of the optical imaging lens is reduced.

In order to make the aforementioned and other features and advantages comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

FIG. 6 is a schematic diagram of an optical imaging lens according to a first embodiment of the disclosure.

FIG. 7A to FIG. 7D are diagrams of a longitudinal spherical aberration and various optical aberrations of the optical imaging lens of the first embodiment.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
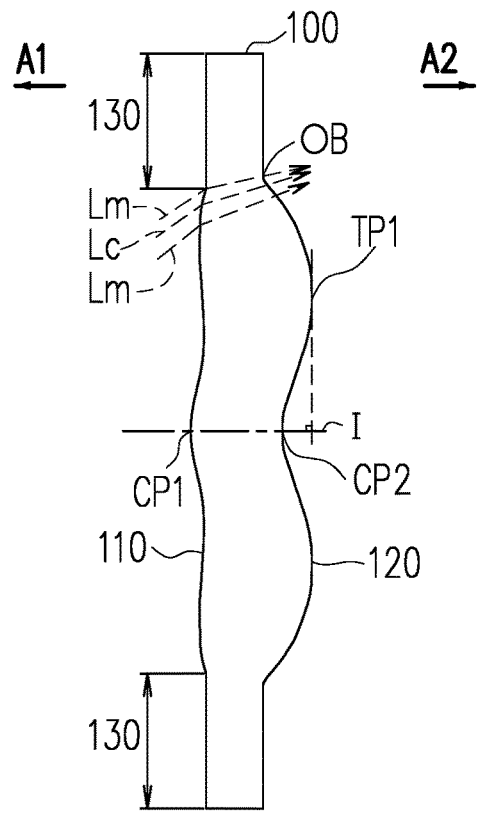
FIG. 1 is a schematic diagram illustrating a surface shape structure of a lens.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
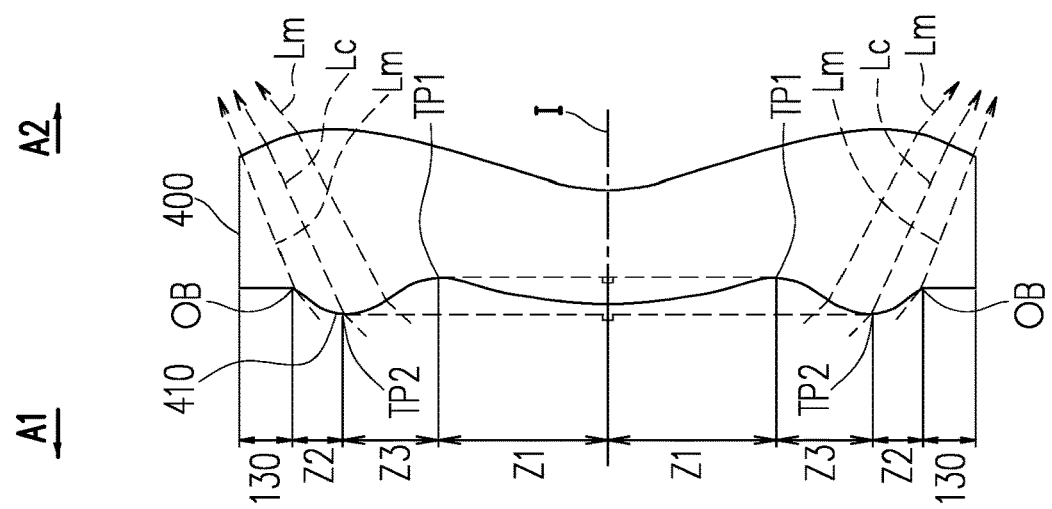
FIG. 4 is a schematic diagram illustrating a surface shape structure of a lens according to an example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
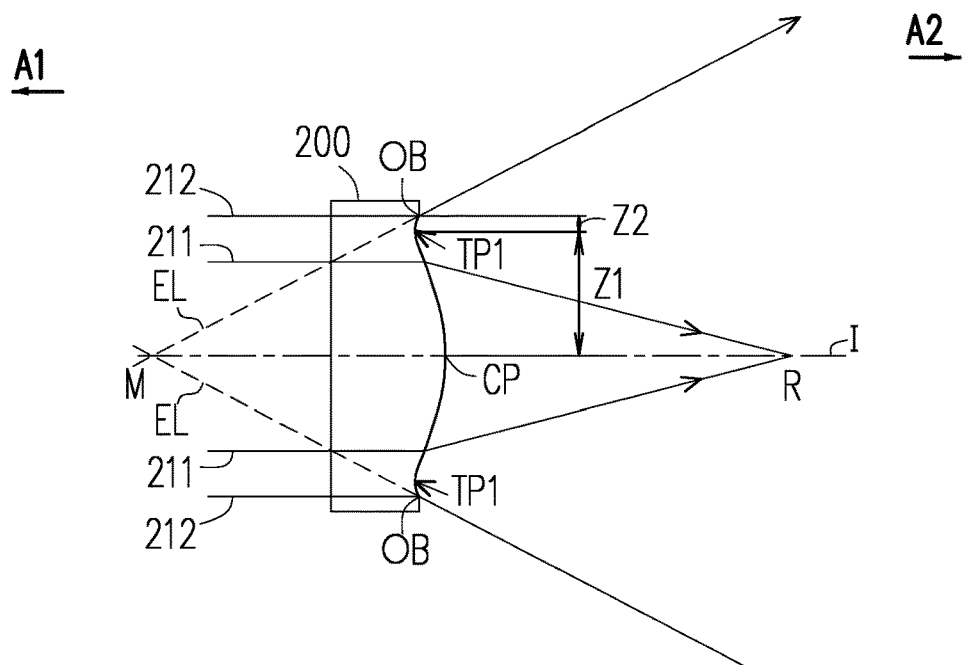
FIG. 2 is a schematic diagram of illustrating a surface shape concave-convex structure and ray intersections of a lens.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
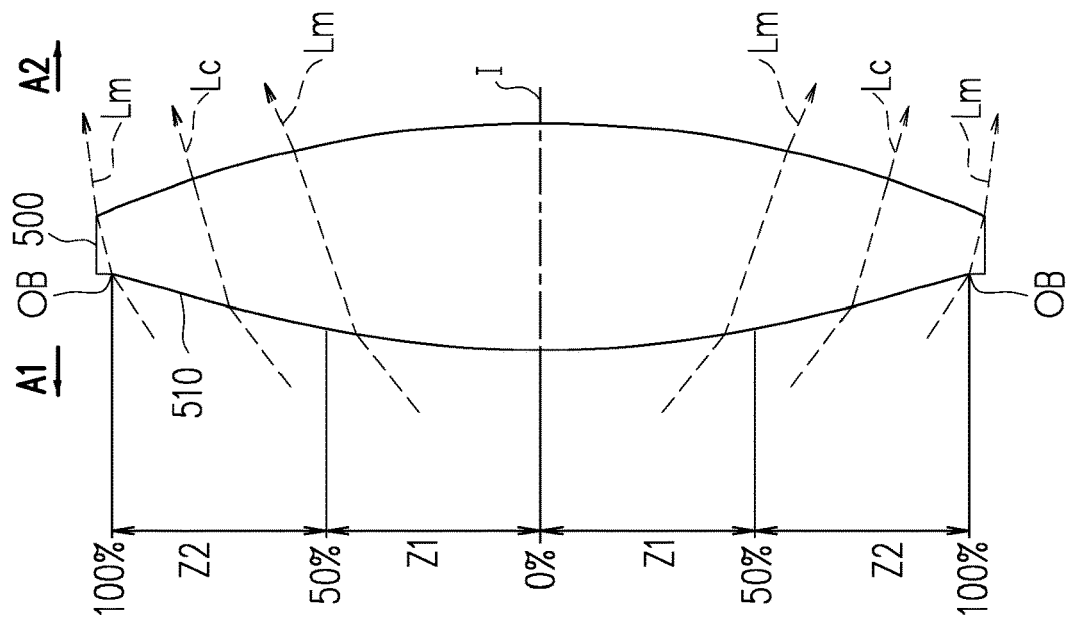
FIG. 5 is a schematic diagram illustrating a surface shape structure of a lens according to an example 3.
Figure 3:
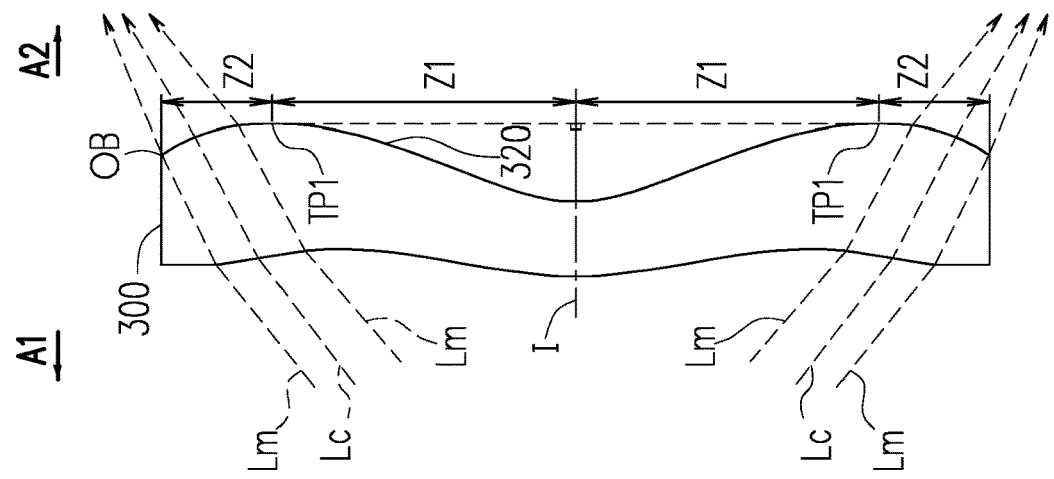
FIG. 3 is a schematic diagram illustrating a surface shape structure of a lens according to an example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic diagram of an optical imaging lens of a first embodiment of the disclosure. FIG. 7A to FIG. 7D are diagrams of a longitudinal spherical aberration and various optical aberrations of the optical imaging lens of the first embodiment. Referring to FIG. 6 first, the optical imaging lens 10 of the first embodiment of the disclosure sequentially includes an aperture 0, a first lens element 1, a second lens element 2, a third lens element 3, a fourth lens element 4, a fifth lens element 5, a sixth lens element 6, a seventh lens element 7, an eighth lens element 8, a ninth lens element 9 and a filter 11 along an optical axis I of the optical imaging lens 10 from an object-side A1 to an image-side A2. When a ray emitted by an object to be photographed enters the optical imaging lens 10, and passes through the aperture 0, the first lens element 1, the second lens element 2, the third lens element 3, the fourth lens element 4, the fifth lens element 5, the sixth lens element 6, the seventh lens element 7, the eighth lens element 8, the ninth lens element 9 and the filter 11, an image is formed on an image plane 99. The filter 11 is disposed between an image-side surface 96 of the ninth lens element 9 and the image plane 99. It should be noted that the object-side A1 is a side facing the object to be photographed, and the image-side A2 is a side facing the image plane 99. In the embodiment, the filter 11 is an infrared (IR) cut filter.

In the embodiment, the first lens element 1, the second lens element 2, the third lens element 3, the fourth lens element 4, the fifth lens element 5, the sixth lens element 6, the seventh lens element 7, the eighth lens element 8, the ninth lens element 9, and the filter 11 of the optical imaging lens 10 respectively have object-side surfaces 15, 25, 35, 45, 55, 65, 75, 85, 95, 115 facing the object-side A1 and allowing imaging rays to pass through and image-side surfaces 16, 26, 36, 46, 56, 66, 76, 86, 96, 116 facing the image-side A2 and allowing the imaging rays to pass through. In the embodiment, the aperture 0 is disposed between the object side A1 and the first lens element 1.

The first lens element 1 has a positive refracting power. A material of the first lens element 1 is plastic. An optical axis region 151 of the object-side surface 15 of the first lens element 1 is convex, and a periphery region 153 thereof is convex. An optical axis region 161 of the image-side surface 16 of the first lens element 1 is concave, and a periphery region 163 thereof is concave. In the embodiment, both of the object-side surface 15 and the image-side surface 16 of the first lens element 1 are aspheric surfaces, but the disclosure is not limited thereto.

The second lens element 2 has negative refracting power. A material of the second lens element 2 is plastic. An optical axis region 251 of the object-side surface 25 of the second lens element 2 is convex, and a periphery region 253 thereof is convex. An optical axis region 261 of the image-side surface 26 of the second lens element 2 is concave, and a periphery region 263 thereof is concave. In the embodiment, both of the object-side surface 25 and the image-side surface 26 of the second lens element 2 are aspheric surfaces, but the disclosure is not limited thereto.

The third lens element 3 has a positive refracting power. A material of the third lens element 3 is plastic. An optical axis region 351 of the object-side surface 35 of the third lens element 3 is convex, and a periphery region 353 thereof is convex. An optical axis region 361 of the image-side surface 36 of the third lens element 3 is concave, and a periphery region 363 thereof is convex. In the embodiment, both of the object-side surface 35 and the image-side surface 36 of the third lens element 3 are aspheric surfaces, but the disclosure is not limited thereto.

The fourth lens element 4 has negative refracting power. A material of the fourth lens element 4 is plastic. An optical axis region 451 of the object-side surface 45 of the fourth lens element 4 is concave, and a periphery region 453 thereof is concave. An optical axis region 461 of the image-side surface 46 of the fourth lens element 4 is concave, and a periphery region 463 thereof is convex. In the embodiment, both of the object-side surface 45 and the image-side surface 46 of the fourth lens element 4 are aspheric surfaces, but the disclosure is not limited thereto.

The fifth lens element 5 has a positive refracting power. A material of the fifth lens element 5 is plastic. An optical axis region 551 of the object-side surface 55 of the fifth lens element 5 is concave, and a periphery region 553 thereof is concave. An optical axis region 561 of the image-side surface 56 of the fifth lens element 5 is convex, and a periphery region 563 thereof is convex. In the embodiment, both of the object-side surface 55 and the image-side surface 56 of the fifth lens element 5 are aspheric surfaces, but the disclosure is not limited thereto.

The sixth lens element 6 has a positive refracting power. A material of the sixth lens element 6 is plastic. An optical axis region 651 of the object-side surface 65 of the sixth lens element 6 is concave, and a periphery region 653 thereof is concave. An optical axis region 661 of the image-side surface 66 of the sixth lens element 6 is convex, and a periphery region 663 thereof is convex. In the embodiment, both of the object-side surface 65 and the image-side surface 66 of the sixth lens element 6 are aspheric surfaces, but the disclosure is not limited thereto.

The seventh lens element 7 has a positive refracting power. A material of the seventh lens element 7 is plastic. An optical axis region 751 of the object-side surface 75 of the seventh lens element 7 is concave, and a periphery region 753 thereof is concave. An optical axis region 761 of the image-side surface 76 of the seventh lens element 7 is convex, and a periphery region 763 thereof is convex. In the embodiment, both of the object-side surface 75 and the image-side surface 76 of the seventh lens element 7 are aspheric surfaces, but the disclosure is not limited thereto.

The eighth lens element 8 has a positive refracting power. A material of the eighth lens element 8 is plastic. An optical axis region 851 of the object-side surface 85 of the eighth lens element 8 is convex, and a periphery region 853 thereof is concave. An optical axis region 861 of the image-side surface 86 of the eighth lens element 8 is concave, and a periphery region 863 thereof is convex. In the embodiment, both of the object-side surface 85 and the image-side surface 86 of the eighth lens element 8 are aspheric surfaces, but the disclosure is not limited thereto.

The ninth lens element 9 has negative refracting power. A material of the ninth lens element 9 is plastic. An optical axis region 951 of the object-side surface 95 of the ninth lens element 9 is concave, and a periphery region 953 thereof is concave. An optical axis region 961 of the image-side surface 96 of the ninth lens element 9 is concave, and a periphery region 963 thereof is convex. In the embodiment, both of the object-side surface 95 and the image-side surface 96 of the ninth lens element 9 are aspheric surfaces, but the disclosure is not limited thereto.

In the embodiment, lens element of the optical imaging lens 10 are only the nine lens elements described above.

Other detailed optical data of the first embodiment is shown in TABLE 1, and an effective focal length (EFL) of the optical imaging lens 10 of the first embodiment is 6.251 mm, a half field of view (HFOV) is 34.067 degrees, a system length is 8.122 mm, an f-number (Fno) is 1.600, and an image height is 5.000 mm, where the system length refers to a distance from the object-side surface 15 of the first lens element 1 to the image plane 99 on the optical axis I.

TABLE 1

| | | First embodiment<br>System length = 8.122 mm, Effective focal length = 6.251 mm,<br>HFOV = 34.067°, Image height = 5.000 mm, Fno = 1.600 | | | | |
|---|---|---|---|---|---|---|
| Device | Surface | Radius of curvature (mm) | Thickness (mm) | Refractive index | Abbe number | Focal length (mm) |
| Object | | Infinity | Infinity | | | |
| Aperture 0 | | Infinity | −0.769 | | | |
| First lens element 1 | Object-side surface 15 | 2.948 | 0.951 | 1.545 | 55.987 | 6.266 |
| | Image-side surface 16 | 18.847 | 0.143 | | | |
| Second lens element 2 | Object-side surface 25 | 5.115 | 0.439 | 1.671 | 19.243 | −14.987 |
| | Image-side surface 26 | 3.284 | 0.267 | | | |
| Third lens element 3 | Object-side surface 35 | 5.231 | 0.644 | 1.535 | 55.690 | 15.368 |
| | Image-side surface 36 | 13.672 | 0.340 | | | |
| Fourth lens element 4 | Object-side surface 45 | −25.112 | 0.395 | 1.671 | 19.243 | −18.043 |
| | Image-side surface 46 | 23.974 | 0.143 | | | |
| Fifth lens element 5 | Object-side surface 55 | −12.021 | 0.751 | 1.545 | 55.987 | 58.995 |
| | Image-side surface 56 | −8.949 | 0.188 | | | |
| Sixth lens element 6 | Object-side surface 65 | −41.837 | 0.571 | 1.535 | 55.690 | 16.561 |
| | Image-side surface 66 | −7.370 | 0.061 | | | |
| Seventh lens element 7 | Object-side surface 75 | −4.871 | 0.551 | 1.608 | 26.904 | 17.970 |
| | Image-side surface 76 | −3.521 | 0.047 | | | |
| Eighth lens element 8 | Object-side surface 85 | 4.399 | 0.588 | 1.545 | 55.987 | 34.466 |
| | Image-side surface 86 | 5.469 | 0.511 | | | |
| Ninth lens element 9 | Object-side surface 95 | −8.268 | 0.431 | 1.545 | 55.987 | −5.234 |
| | Image-side surface 96 | 4.451 | 0.400 | | | |
| Filter 11 | Object-side surface 115 | Infinity | 0.210 | 1.517 | 64.167 | |
| | Image-side surface 116 | Infinity | 0.489 | | | |
| | Image plane 99 | Infinity | | | | |

In addition, in the embodiment, a total of eighteen surfaces including the object-side surfaces 15, 25, 35, 45, 55, 65, 75, 85, 95 and the image-side surfaces 16, 26, 36, 46, 56, 66, 76, 86, 96 of the first lens element 1, the second lens element 2, the third lens element 3, the fourth lens element 4, the fifth lens element 5, the sixth lens element 6, the seventh lens element 7, the eighth lens element 8, and the ninth lens element 9 are all aspheric surfaces, where the object-side surfaces 15, 25, 35, 45, 55, 65, 75, 85, 95 and the image-side surfaces 16, 26, 36, 46, 56, 66, 76, 86, 96 are general even aspheric surfaces. These aspheric surfaces are defined by a following equation (1):

$$Z(Y) = \frac{Y^2}{R} \Big/ \left(1 + \sqrt{1 - (1+K)\frac{Y^2}{R^2}}\right) + \sum_{i=1}^{n} a_{2i} \times Y^{2i}$$

Where:

R: a radius of curvature of a lens element surface near the optical axis I;

Z: a depth of an aspheric surface (a perpendicular distance between a point on the aspheric surface that is spaced by the distance Y from the optical axis and a tangent plane tangent to a vertex of the aspheric surface on the optical axis I);

Y: a perpendicular distance between a point on an aspheric surface and the optical axis I;

K: a conic constant;

$a_{2i}$: a $2i^{th}$ order aspheric coefficient

The aspheric coefficients of the object-side surface 15 of the first lens element 1 to the image-side surface 96 of the ninth lens element 9 in the equation (1) are shown in TABLE 2. Where, a column number 15 in TABLE 2 indicates that it is the aspheric coefficient of the object-side surface 15 of the first lens element 1, and the other column fields may be deduced by analogy. In the embodiment, second-order aspheric coefficients $a_2$ of the aspheric surfaces are all zero, which are not listed in TABLE 2.

TABLE 2

| Surface | K | $a_4$ | $a_6$ | $a_8$ | $a_{10}$ |
|---|---|---|---|---|---|
| 15 | 0.000000E+00 | 2.577710E−03 | −8.941270E−04 | 1.024241E−03 | −5.290634E−04 |
| 16 | 0.000000E+00 | −1.876190E−03 | −2.549625E−03 | 3.788888E−03 | −1.860425E−03 |
| 25 | 0.000000E+00 | −1.866749E−02 | −8.048154E−03 | 1.197295E−02 | −5.828054E−03 |
| 26 | −3.166635E+00 | −9.518042E−03 | −1.432310E−02 | 1.714914E−02 | −9.675041E−03 |
| 35 | 0.000000E+00 | −2.674743E−03 | −1.174971E−02 | 5.533977E−03 | −3.864877E−03 |
| 36 | 0.000000E+00 | −5.912138E−03 | −8.699242E−03 | 1.116568E−03 | −9.842160E−04 |
| 45 | 0.000000E+00 | −4.777836E−02 | 3.817474E−02 | −5.843586E−02 | 4.638253E−02 |
| 46 | 0.000000E+00 | −9.313573E−02 | 1.457705E−01 | −1.760725E−01 | 1.336245E−01 |
| 55 | 0.000000E+00 | −8.641942E−02 | 1.442609E−01 | −1.527992E−01 | 1.006778E−01 |
| 56 | 0.000000E+00 | −1.888273E−02 | −1.735936E−02 | 1.941617E−02 | −1.242155E−02 |
| 65 | 0.000000E+00 | 9.047608E−04 | −5.447513E−02 | 2.907956E−02 | 3.327967E−03 |
| 66 | 0.000000E+00 | −6.496069E−03 | 2.069978E−02 | 1.335387E−02 | −1.254502E−02 |
| 75 | 0.000000E+00 | −6.256591E−02 | 1.262956E−01 | −8.969691E−02 | 3.675221E−02 |
| 76 | −2.485016E+00 | 3.069176E−02 | 2.993638E−02 | −4.516782E−02 | 2.639566E−02 |
| 85 | −3.732323E+01 | 6.708805E−02 | −7.650771E−02 | 3.790257E−02 | −1.346437E−02 |
| 86 | −5.437497E+01 | 3.534699E−02 | −3.057599E−02 | 1.026044E−02 | −2.237058E−03 |
| 95 | 0.000000E+00 | −8.633388E−03 | −1.282069E−03 | 7.552577E−05 | 1.957361E−04 |
| 96 | 0.000000E+00 | −2.727862E−02 | 2.640794E−03 | −2.954708E−04 | 3.213865E−05 |

| Surface | $a_{12}$ | $a_{14}$ | $a_{16}$ | $a_{18}$ | $a_{20}$ |
|---|---|---|---|---|---|
| 15 | 1.669605E−04 | −2.815720E−05 | 1.957145E−06 | | |
| 16 | 4.944192E−04 | −6.965984E−05 | 4.115170E−06 | | |
| 25 | 1.592287E−03 | −2.249139E−04 | 1.280695E−05 | | |
| 26 | 3.759246E−03 | −8.445246E−04 | 9.170182E−05 | | |
| 35 | 2.372552E−03 | −6.756057E−04 | 7.044209E−05 | | |
| 36 | 1.211866E−03 | −5.139596E−04 | 6.945480E−05 | | |
| 45 | −2.027874E−02 | 4.609271E−03 | −4.233659E−04 | | |
| 46 | −6.889064E−02 | 2.500827E−02 | −6.144821E−03 | 9.019490E−04 | −5.855862E−05 |
| 55 | −4.776846E−02 | 1.775786E−02 | −4.752340E−03 | 7.559104E−04 | −5.146023E−05 |
| 56 | 3.142798E−03 | 4.243377E−04 | −3.669233E−04 | 6.205509E−05 | −3.091318E−06 |
| 65 | −1.320112E−02 | 7.584788E−03 | −2.076124E−03 | 2.819880E−04 | −1.531108E−05 |
| 66 | 3.486109E−03 | −2.443833E−04 | −5.912606E−05 | 1.217041E−05 | −6.581140E−07 |
| 75 | −9.344183E−03 | 1.267032E−03 | −3.463852E−05 | −1.098529E−05 | 9.181352E−07 |
| 76 | −8.935752E−03 | 1.832211E−03 | −2.223400E−04 | 1.461675E−05 | −3.990497E−07 |
| 85 | 3.444247E−03 | −6.129900E−04 | 7.094943E−05 | −4.732707E−06 | 1.370836E−07 |
| 86 | 3.343409E−04 | −3.408164E−05 | 2.301765E−06 | −9.377677E−08 | 1.737622E−09 |
| 95 | −4.935997E−05 | 5.513703E−06 | −3.317095E−07 | 1.049408E−08 | −1.372650E−10 |
| 96 | −1.632438E−06 | −7.188809E−08 | 1.258925E−08 | −5.378890E−10 | 7.708000E−12 |

In addition, a relationship between important parameters in the optical imaging lens 10 of the first embodiment is as shown in TABLE 23 and TABLE 24.

Where, f1 is a focal length of the first lens element;
f2 is a focal length of the second lens element;
f3 is a focal length of the third lens element;
f4 is a focal length of the fourth lens element;
f5 is a focal length of the fifth lens element;
f6 is a focal length of the sixth lens element;
f7 is a focal length of the seventh lens element;
f8 is a focal length of the eighth lens element;
f9 is a focal length of the ninth lens element;
n1 is a refractive index of the first lens element;
n2 is a refractive index of the second lens element;
n3 is a refractive index of the third lens element;
n4 is a refractive index of the fourth lens element;
n5 is a refractive index of the fifth lens element;
n6 is a refractive index of the sixth lens element;
n7 is a refractive index of the seventh lens element;
n8 is a refractive index of the eighth lens element;
n9 is a refractive index of the ninth lens element;
V1 is an Abbe number of the first lens element;
V2 is an Abbe number of the second lens element;
V3 is an Abbe number of the third lens element;
V4 is an Abbe number of the fourth lens element;
V5 is an Abbe number of the fifth lens element;
V6 is an Abbe number of the sixth lens element;
V7 is an Abbe number of the seventh lens element;
V8 is an Abbe number of the eighth lens element;
V9 is an Abbe number of the ninth lens element;
T1 is a thickness of the first lens element on the optical axis;
T2 is a thickness of the second lens element on the optical axis;
T3 is a thickness of the third lens element on the optical axis;
T4 is a thickness of the fourth lens element on the optical axis;
T5 is a thickness of the fifth lens element on the optical axis;
T6 is a thickness of the sixth lens element on the optical axis;
T7 is a thickness of the seventh lens element on the optical axis;
T8 is a thickness of the eighth lens element on the optical axis;
T9 is a thickness of the ninth lens element on the optical axis;
G12 is an air gap between the first lens element and the second lens element on the optical axis;
G23 is an air gap between the second lens element and the third lens element on the optical axis;
G34 is an air gap between the third lens element and the fourth lens element on the optical axis;
G45 is an air gap between the fourth lens element and the fifth lens element on the optical axis;

G56 is an air gap between the fifth lens element and the six lens on the optical axis;

G67 is an air gap between the sixth lens element and the seventh lens element on the optical axis;

G78 is an air gap between the seventh lens element and the eighth lens element on the optical axis;

G89 is an air gap between the eighth lens element and the ninth lens element on the optical axis;

G9F is an air gap between the ninth lens element and the filter on the optical axis;

TF is a thickness of the filter on the optical axis;

GFP is an air gap between the filter and the image plane on the optical axis;

AAG is a sum of eight air gaps from the first lens element to the ninth lens element on the optical axis;

ALT is a sum of nine thicknesses of the first lens element to the ninth lens element on the optical axis;

EFL is an effective focal length of the optical imaging lens;

BFL is a distance from the image-side surface of the ninth lens element to the image plane on the optical axis;

TTL is a distance from the object-side surface of the first lens element to the image plane on the optical axis;

TL is a distance from the object-side surface of the first lens element to the image-side surface of the ninth lens element on the optical axis;

HFOV is a half field of view of the optical imaging lens;

ImgH is an image height of the optical imaging lens;

Fno is an f-number of the optical imaging lens.

Referring to FIG. 7A to FIG. 7D, FIG. 7A is a diagram illustrating a longitudinal spherical aberration on the image plane 99 when wavelengths of the first embodiment are 470 nm, 555 nm, and 650 nm, FIG. 7B and FIG. 7C are diagrams respectively illustrating a field curvature aberration of a sagittal direction and a field curvature aberration of a tangential direction on the image plane 99 when the wavelengths of the first embodiment are 470 nm, 555 nm and 650 nm, and FIG. 7D is a diagram illustrating a distortion aberration on the image plane 99 when the wavelengths of the first embodiment are 470 nm, 555 nm, and 650 nm. The longitudinal spherical aberration of the first embodiment is shown in FIG. 7A, curves formed by the wavelengths are very close to each other and close to the middle, indicating that off-axis rays of different heights of each of the wavelengths are concentrated near an imaging point, and it may be seen from a deflection amplitude of the curve of each wavelength that deviation of the imaging point of the off-axis rays of different heights is controlled within a range of +0.03 mm, so that the first embodiment does significantly mitigate the spherical aberration of the same wavelength. In addition, distances among the three representative wavelengths are also quite close to each other, representing that imaging positions of the rays with the different wavelengths have been quite concentrated, thereby significantly mitigating a chromatic aberration.

In the two field curvature aberration diagrams in FIG. 7B and FIG. 7C, a focal length variation of the three representative wavelengths within the entire field of view range falls within +0.40 mm, indicating that the optical system of the first embodiment may effectively eliminate the optical aberrations. The distortion aberration diagram in FIG. 7D shows that the distortion aberration of the embodiment is maintained within a range of +20%, indicating that the distortion aberration of the first embodiment has met imaging quality requirements of the optical system, and compared with the existing optical lens, the first embodiment of the disclosure may still provide good imaging quality under the condition that the system length is shortened to 8.122 mm. Therefore, the first embodiment may shorten the lens length and has good imaging quality under the condition of maintaining good optical performance.

Figure 8:
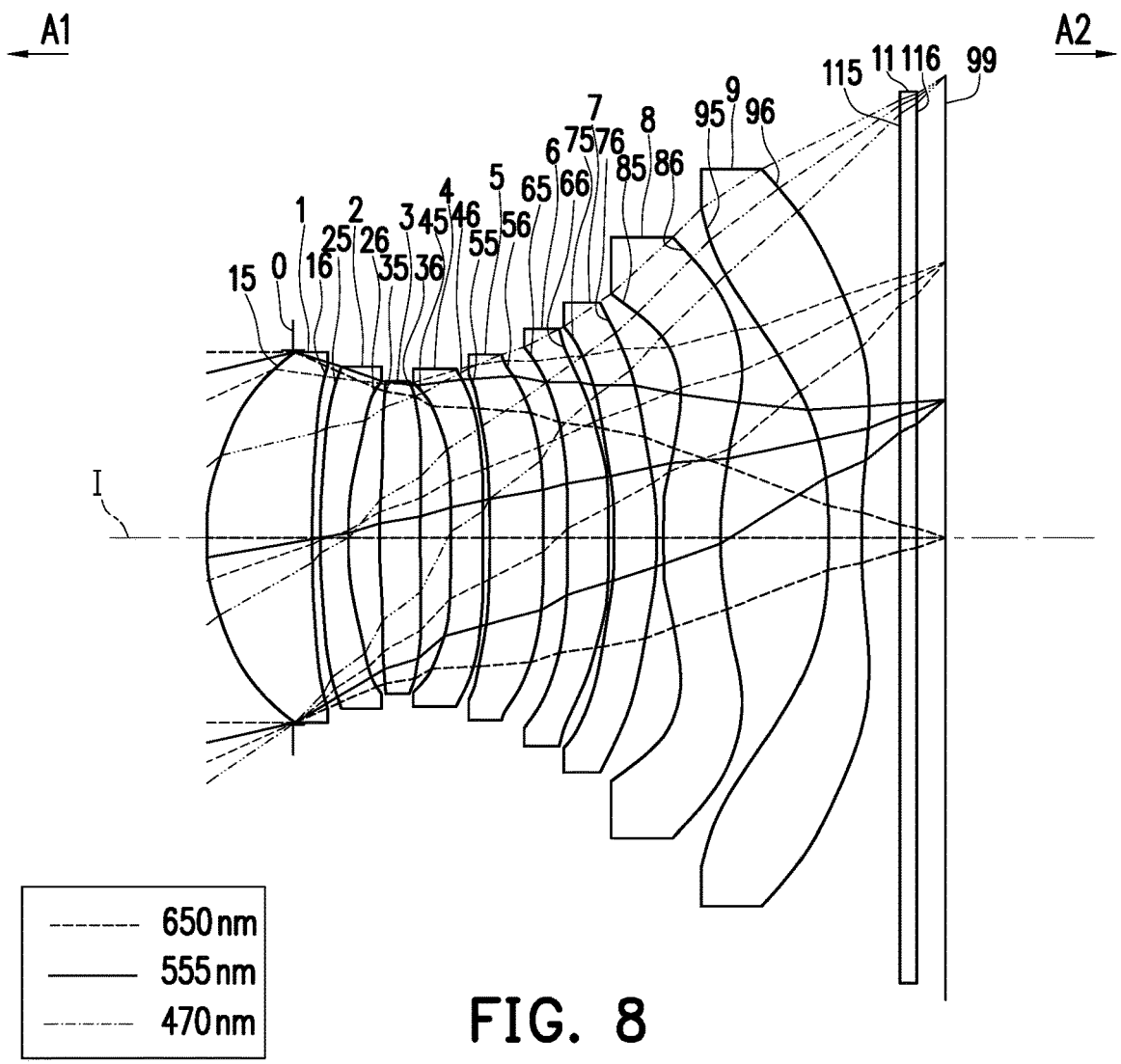
FIG. 8 is a schematic diagram of an optical imaging lens according to a second embodiment of the disclosure.

FIG. 8 is a schematic diagram of an optical imaging lens according to a second embodiment of the disclosure. FIG. 9A to FIG. 9D are diagrams of a longitudinal spherical aberration and various optical aberrations of the optical imaging lens of the second embodiment. Referring to FIG. 8 first, the second embodiment of the optical imaging lens 10 of the disclosure is substantially similar to the first embodiment, and differences there between are as follows: optical data, aspheric coefficients and parameters between the lenses 1, 2, 3, 4, 5, 6, 7, 8 and 9 are more or less different. It should be noted that in order to clearly show the figure, reference numerals of the optical axis regions and the periphery regions with surface shapes similar to that of the first embodiment are omitted in FIG. 8.

Detailed optical data of the optical imaging lens 10 of the second embodiment is shown in TABLE 3, and the effective focal length of the optical imaging lens 10 of the second embodiment is 6.438 mm, the HFOV is 36.289 degrees, the system length is 8.012 mm, the Fno is 1.600, and the image height is 5.000 mm.

TABLE 3

Second embodiment
System length = 8.012 mm, Effective focal length = 6.438 mm,
HFOV = 36.289°, Image height = 5.000 mm, Fno = 1.600

| Device | Surface | Radius of curvature (mm) | Thickness (mm) | Refractive index | Abbe number | Focal length (mm) |
|---|---|---|---|---|---|---|
| Object | | Infinity | Infinity | | | |
| Aperture 0 | | Infinity | −0.933 | | | |
| First lens element 1 | Object-side surface 15 | 2.799 | 1.143 | 1.545 | 55.987 | 6.195 |
| | Image-side surface 16 | 13.865 | 0.089 | | | |
| Second lens element 2 | Object-side surface 25 | 5.743 | 0.299 | 1.671 | 19.243 | −14.826 |
| | Image-side surface 26 | 3.577 | 0.343 | | | |
| Third lens element 3 | Object-side surface 35 | 7.709 | 0.437 | 1.535 | 55.690 | 19.772 |
| | Image-side surface 36 | 27.578 | 0.331 | | | |

TABLE 3-continued

Second embodiment
System length = 8.012 mm, Effective focal length = 6.438 mm,
HFOV = 36.289°, Image height = 5.000 mm, Fno = 1.600

| Device | Surface | Radius of curvature (mm) | Thickness (mm) | Refractive index | Abbe number | Focal length (mm) |
|---|---|---|---|---|---|---|
| Fourth lens element 4 | Object-side surface 45 | −20.038 | 0.348 | 1.671 | 19.243 | −21.159 |
| | Image-side surface 46 | 50.738 | 0.065 | | | |
| Fifth lens element 5 | Object-side surface 55 | −29.142 | 0.590 | 1.545 | 55.987 | 56.774 |
| | Image-side surface 56 | −15.132 | 0.256 | | | |
| Sixth lens element 6 | Object-side surface 65 | −34.812 | 0.451 | 1.535 | 55.690 | 27.891 |
| | Image-side surface 66 | −10.521 | 0.062 | | | |
| Seventh lens element 7 | Object-side surface 75 | −4.680 | 0.462 | 1.608 | 26.904 | 16.783 |
| | Image-side surface 76 | −3.335 | 0.069 | | | |
| Eighth lens element 8 | Object-side surface 85 | 4.125 | 0.620 | 1.545 | 55.987 | 88.799 |
| | Image-side surface 86 | 4.269 | 1.169 | | | |
| Ninth lens element 9 | Object-side surface 95 | −5.935 | 0.359 | 1.545 | 55.987 | −5.552 |
| | Image-side surface 96 | 6.335 | 0.400 | | | |
| Filter 11 | Object-side surface 115 | Infinity | 0.210 | 1.517 | 64.167 | |
| | Image-side surface 116 | Infinity | 0.308 | | | |
| | Image plane 99 | Infinity | | | | |

As shown in TABLE 4, TABLE 4 illustrates various aspheric coefficients of the object-side surface 15 of the first lens element 1 to the image-side surface 96 of the ninth lens element 9 of the second embodiment in the above equation (1).

TABLE 4

| Surface | K | $a_4$ | $a_6$ | $a_8$ | $a_{10}$ |
|---|---|---|---|---|---|
| 15 | 0.000000E+00 | 2.624843E−03 | −8.494627E−04 | 1.073405E−03 | −5.238779E−04 |
| 16 | 0.000000E+00 | −1.292754E−03 | −2.355708E−03 | 3.806818E−03 | −1.863934E−03 |
| 25 | 0.000000E+00 | −2.001604E−02 | −8.127101E−03 | 1.219151E−02 | −5.899170E−03 |
| 26 | −2.985097E+00 | −9.211978E−03 | −1.422375E−02 | 1.690525E−02 | −9.814590E−03 |
| 35 | 0.000000E+00 | −2.467503E−03 | −1.270277E−02 | 5.299850E−03 | −3.835560E−03 |
| 36 | 0.000000E+00 | −7.898756E−03 | −8.651625E−03 | 1.243246E−03 | −9.334555E−04 |
| 45 | 0.000000E+00 | −4.649443E−02 | 3.650355E−02 | −5.804681E−02 | 4.630733E−02 |
| 46 | 0.000000E+00 | −9.198071E−02 | 1.445903E−01 | −1.762787E−01 | 1.335978E−01 |
| 55 | 0.000000E+00 | −8.709149E−02 | 1.446546E−01 | −1.528991E−01 | 1.006268E−01 |
| 56 | 0.000000E+00 | −1.599844E−02 | −1.731864E−02 | 1.943403E−02 | −1.241547E−02 |
| 65 | 0.000000E+00 | 9.739618E−03 | −5.370874E−02 | 2.892478E−02 | 3.277958E−03 |
| 66 | 0.000000E+00 | −6.599343E−02 | 2.010630E−02 | 1.344476E−02 | −1.254176E−02 |
| 75 | 0.000000E+00 | −6.359539E−02 | 1.263320E−01 | −8.975282E−02 | 3.681764E−02 |
| 76 | −2.356918E+00 | 2.936075E−02 | 3.048697E−02 | −4.507937E−02 | 2.640284E−02 |
| 85 | −2.336161E+01 | 7.371927E−02 | −7.617364E−02 | 3.785326E−02 | −1.347093E−02 |
| 86 | −1.828873E+01 | 3.872007E−02 | −3.066468E−02 | 1.022520E−02 | −2.239324E−03 |
| 95 | 0.000000E+00 | −1.557010E−02 | −7.912890E−04 | 7.566397E−05 | 1.951995E−04 |
| 96 | 0.000000E+00 | −2.807690E−02 | 2.720244E−03 | −2.852829E−04 | 3.234122E−05 |

| Surface | $a_{12}$ | $a_{14}$ | $a_{16}$ | $a_{18}$ | $a_{20}$ |
|---|---|---|---|---|---|
| 15 | 1.676700E−04 | −2.796504E−05 | 2.078675E−06 | | |
| 16 | 4.965470E−04 | −6.937924E−05 | 4.118838E−06 | | |
| 25 | 1.588876E−03 | −2.223824E−04 | 1.276059E−05 | | |
| 26 | 3.786972E−03 | −8.437029E−04 | 8.874361E−05 | | |
| 35 | 2.333172E−03 | −6.701034E−04 | 7.598456E−05 | | |

TABLE 4-continued

| | | | | |
|---|---|---|---|---|
| 36 | 1.275018E-03 | -5.357020E-04 | 7.374144E-05 | | |
| 45 | -2.037582E-02 | 4.615142E-03 | -4.168635E-04 | | |
| 46 | -6.889678E-02 | 2.500634E-02 | -6.144875E-03 | 9.026293E-04 | -5.847072E-05 |
| 55 | -4.777752E-02 | 1.775626E-02 | -4.753848E-03 | 7.553980E-04 | -5.112566E-05 |
| 56 | 3.137610E-03 | 4.232297E-04 | -3.689146E-04 | 6.273746E-05 | -3.137651E-06 |
| 65 | -1.320075E-02 | 7.588093E-03 | -2.075079E-03 | 2.821786E-04 | -1.531684E-05 |
| 66 | 3.487807E-03 | -2.439718E-04 | -5.906094E-05 | 1.213362E-05 | -6.580643E-07 |
| 75 | -9.337288E-03 | 1.265932E-03 | -3.489870E-05 | -1.099357E-05 | 9.219856E-07 |
| 76 | -8.935738E-03 | 1.832210E-03 | -2.223394E-04 | 1.461470E-05 | -3.993836E-07 |
| 85 | 3.443798E-03 | -6.130536E-04 | 7.093392E-05 | -4.733094E-06 | 1.375843E-07 |
| 86 | 3.343110E-04 | -3.407860E-05 | 2.302733E-06 | -9.368150E-08 | 1.737063E-09 |
| 95 | -4.937050E-05 | 5.514815E-06 | -3.316137E-07 | 1.049624E-08 | -1.376530E-10 |
| 96 | -1.688356E-06 | -7.114094E-08 | 1.258412E-08 | -5.361670E-10 | 7.776000E-12 |

In addition, a relationship between important parameters in the optical imaging lens 10 of the second embodiment is shown in TABLE 23 and TABLE 24.

Figures 9A, 9B, 9C, 9D:
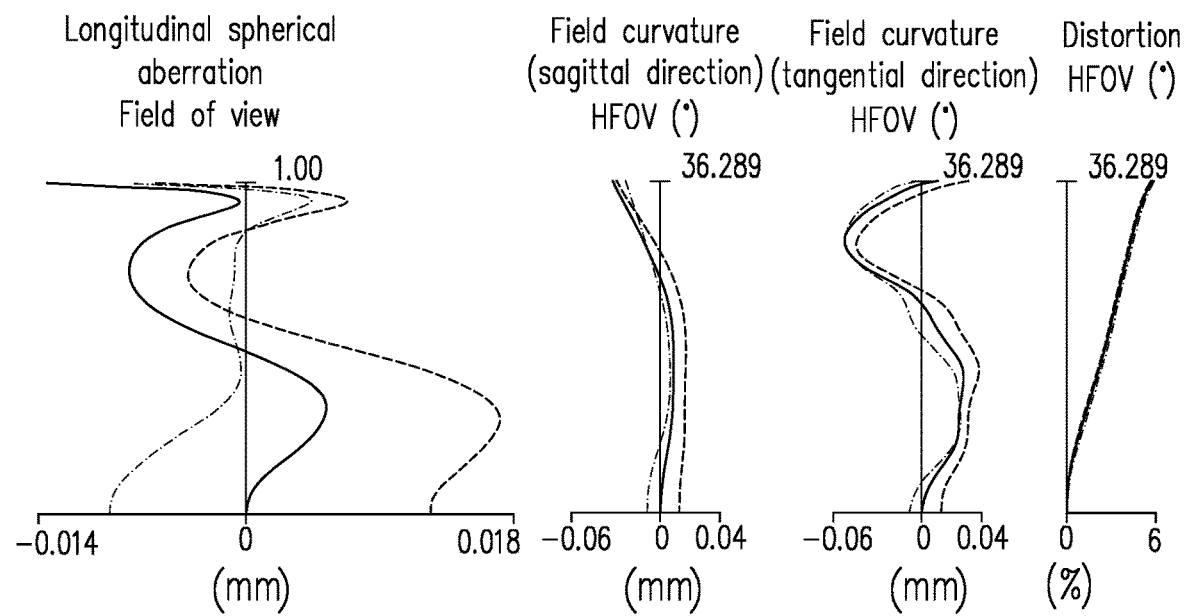
FIG. 9A to FIG. 9D are diagrams of a longitudinal spherical aberration and various optical aberrations of the optical imaging lens of the second embodiment.

The longitudinal spherical aberration of the second embodiment is as shown in FIG. 9A, and the deviation of the imaging points of the off-axis rays of different heights is controlled within a range of ±0.018 mm. In the two field curvature aberration diagrams of FIG. 9B and FIG. 9C, a focal length variation of the three representative wavelengths within the entire field of view range falls within ±0.06 mm. The distortion aberration diagram in FIG. 9D shows that the distortion aberration of the embodiment is maintained within a range of ±6%.

From the above description, it is known that the system length of the second embodiment is shorter than the system length of the first embodiment, and the HFOV of the second embodiment is larger than that of the first embodiment. Therefore, compared to the first embodiment, the second embodiment has a smaller volume and a larger angle range for receiving images. In addition, the longitudinal spherical aberration of the second embodiment is smaller than that of the first embodiment, the field curvature aberration of the second embodiment is smaller than that of the first embodiment, and the distortion aberration of the second embodiment is smaller than that of the first embodiment.

Figure 10:
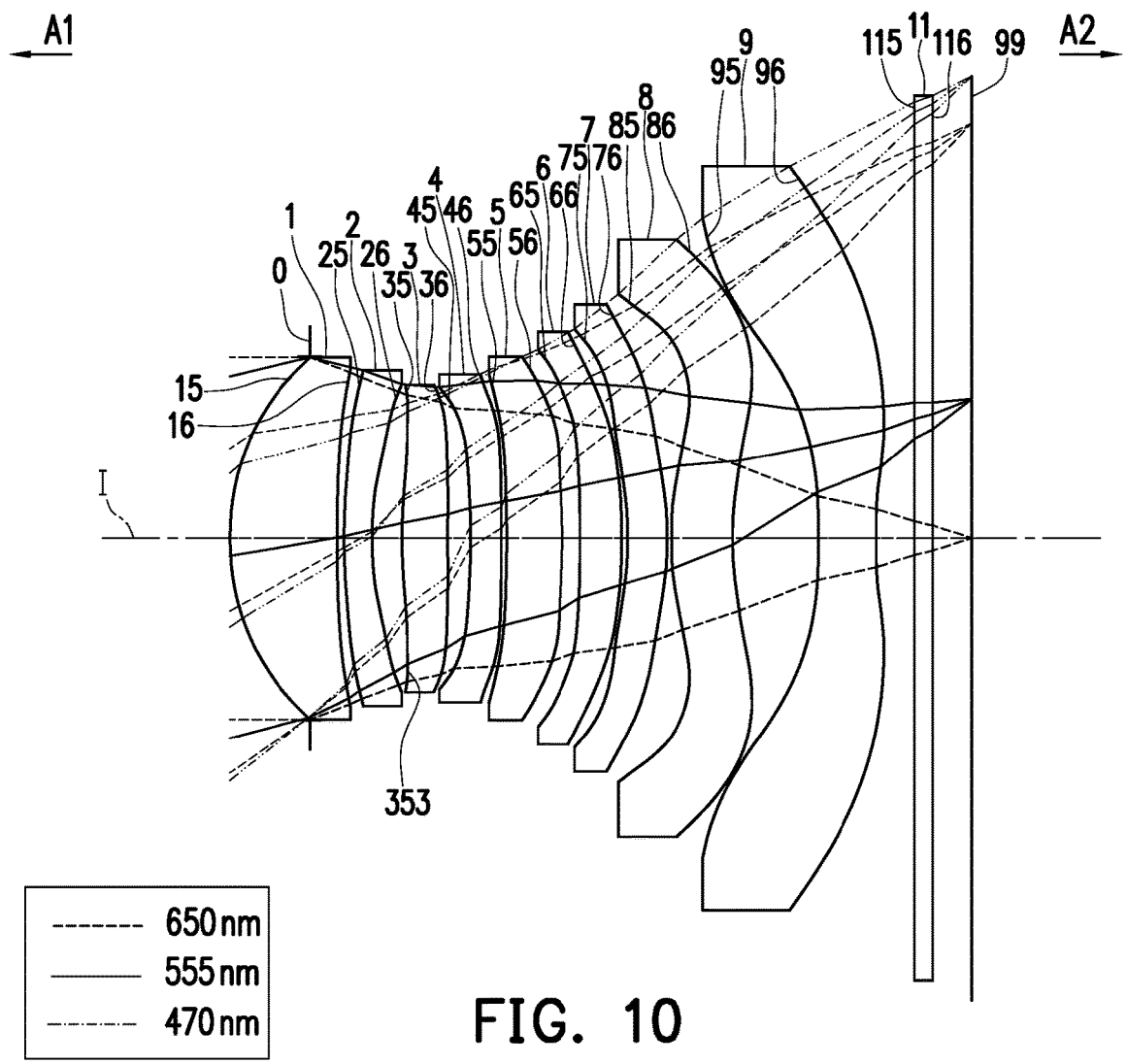
FIG. 10 is a schematic diagram of an optical imaging lens according to a third embodiment of the disclosure.

FIG. 10 is a schematic diagram of an optical imaging lens according to a third embodiment of the disclosure. FIG. 11A to FIG. 11D are diagrams of a longitudinal spherical aberration and various optical aberrations of the optical imaging lens of the third embodiment. Referring to FIG. 10 first, a third embodiment of the optical imaging lens 10 of the disclosure is substantially similar to the first embodiment, and differences there between are as follows: optical data, aspheric coefficients, and parameters between the lenses 1, 2, 3, 4, 5, 6, 7, 8, and 9 are more or less different. In addition, in the embodiment, the periphery region 353 of the object-side surface 35 of the third lens element 3 is concave. It should be noted that in order to clearly show the figure, reference numerals of the optical axis regions and the periphery regions with surface shapes similar to that of the first embodiment are omitted in FIG. 10.

The detailed optical data of the optical imaging lens 10 of the third embodiment is shown in TABLE 5, and the effective focal length of the optical imaging lens 10 of the third embodiment is 6.276 mm, the HFOV is 37.603 degrees, the system length is 8.039 mm, the Fno is 1.600, and the image height is 5.000 mm.

TABLE 5

Third embodiment
System length = 8.039 mm, Effective focal length = 6.276 mm, HFOV = 37.603°,
Image height = 5.000 mm, Fno = 1.600

| Device | Surface | Radius of curvature (mm) | Thickness (mm) | Refractive index | Abbe number | Focal length (mm) |
|---|---|---|---|---|---|---|
| Object | | Infinity | Infinity | | | |
| Aperture 0 | | Infinity | -0.867 | | | |
| First lens element 1 | Object-side surface 15 | 2.779 | 1.167 | 1.545 | 55.987 | 6.116 |
| | Image-side surface 16 | 14.076 | 0.076 | | | |
| Second lens element 2 | Object-side surface 25 | 5.736 | 0.300 | 1.671 | 19.243 | -14.293 |
| | Image-side surface 26 | 3.526 | 0.328 | | | |
| Third lens element 3 | Object-side surface 35 | 8.028 | 0.481 | 1.535 | 55.690 | 19.442 |
| | Image-side surface 36 | 34.000 | 0.258 | | | |
| Fourth lens element 4 | Object-side surface 45 | -24.894 | 0.330 | 1.671 | 19.243 | -20.220 |
| | Image-side surface 46 | 30.628 | 0.061 | | | |
| Fifth lens element 5 | Object-side surface 55 | -39.760 | 0.606 | 1.545 | 55.987 | 50.039 |
| | Image-side surface 56 | -16.286 | 0.188 | | | |

TABLE 5-continued

Third embodiment
System length = 8.039 mm, Effective focal length = 6.276 mm, HFOV = 37.603°,
Image height = 5.000 mm, Fno = 1.600

| Device | Surface | Radius of curvature (mm) | Thickness (mm) | Refractive index | Abbe number | Focal length (mm) |
|---|---|---|---|---|---|---|
| Sixth lens element 6 | Object-side surface 65 | −35.237 | 0.454 | 1.535 | 55.690 | 28.928 |
|  | Image-side surface 66 | −10.831 | 0.061 |  |  |  |
| Seventh lens element 7 | Object-side surface 75 | −4.927 | 0.432 | 1.608 | 26.904 | 15.741 |
|  | Image-side surface 76 | −3.368 | 0.047 |  |  |  |
| Eighth lens element 8 | Object-side surface 85 | 4.163 | 0.661 | 1.545 | 55.987 | 48.997 |
|  | Image-side surface 86 | 4.653 | 0.925 |  |  |  |
| Ninth lens element 9 | Object-side surface 95 | −5.858 | 0.635 | 1.545 | 55.987 | −5.610 |
|  | Image-side surface 96 | 6.673 | 0.400 |  |  |  |
| Filter 11 | Object-side surface 115 | Infinity | 0.210 | 1.517 | 64.167 |  |
|  | Image-side surface 116 | Infinity | 0.419 |  |  |  |
| Image plane 99 |  | Infinity |  |  |  |  |

As shown in TABLE 6, TABLE 6 illustrates various aspheric coefficients of the object-side surface 15 of the first lens element 1 to the image-side surface 96 of the ninth lens element 9 of the third embodiment in the above equation (1).

TABLE 6

| Surface | K | $a_4$ | $a_6$ | $a_8$ | $a_{10}$ |
|---|---|---|---|---|---|
| 15 | 0.000000E+00 | 2.286568E−03 | −8.078081E−04 | 1.065310E−03 | −5.245551E−04 |
| 16 | 0.000000E+00 | −1.377620E−03 | −2.421631E−03 | 3.766815E−03 | −1.859057E−03 |
| 25 | 0.000000E+00 | −2.041377E−02 | −8.188020E−03 | 1.216283E−02 | −5.893989E−03 |
| 26 | −2.891085E+00 | −9.319223E−03 | −1.432359E−02 | 1.677756E−02 | −9.842092E−03 |
| 35 | 0.000000E+00 | −2.341932E−03 | −1.274876E−02 | 5.206654E−03 | −3.936358E−03 |
| 36 | 0.000000E+00 | −8.023422E−03 | −9.068255E−03 | 1.160184E−03 | −9.648959E−04 |
| 45 | 0.000000E+00 | −4.500243E−02 | 3.662841E−02 | −5.791064E−02 | 4.622729E−02 |
| 46 | 0.000000E+00 | −9.059360E−02 | 1.450119E−01 | −1.763260E−01 | 1.335932E−01 |
| 55 | 0.000000E+00 | −8.661277E−02 | 1.442679E−01 | −1.528336E−01 | 1.006487E−01 |
| 56 | 0.000000E+00 | −1.567003E−02 | −1.769800E−02 | 1.944911E−02 | −1.239132E−02 |
| 65 | 0.000000E+00 | 1.063768E−02 | −5.349334E−03 | 2.887583E−02 | 3.264097E−03 |
| 66 | 0.000000E+00 | −6.583881E−02 | 1.992567E−02 | 1.344338E−02 | −1.254470E−02 |
| 75 | 0.000000E+00 | −6.463292E−02 | 1.263636E−01 | −8.979975E−02 | 3.680641E−02 |
| 76 | −2.337512E+00 | 2.847942E−02 | 3.041363E−02 | −4.507229E−02 | 2.639867E−02 |
| 85 | −2.345340E+01 | 7.152238E−02 | −7.595443E−02 | 3.787083E−02 | −1.346801E−02 |
| 86 | −2.043969E+01 | 3.843434E−02 | −3.073928E−02 | 1.023656E−02 | −2.239331E−03 |
| 95 | 0.000000E+00 | −1.436311E−02 | −8.375702E−04 | 7.636495E−05 | 1.952360E−04 |
| 96 | 0.000000E+00 | −2.588669E−02 | 2.592938E−03 | −2.867398E−04 | 3.258474E−05 |

| Surface | $a_{12}$ | $a_{14}$ | $a_{16}$ | $a_{18}$ | $a_{20}$ |
|---|---|---|---|---|---|
| 15 | 1.676714E−04 | −2.794654E−05 | 2.047599E−06 |  |  |
| 16 | 4.924082E−04 | −6.925364E−05 | 4.338262E−06 |  |  |
| 25 | 1.577186E−03 | −2.216028E−04 | 1.337453E−05 |  |  |
| 26 | 3.796268E−03 | −8.493863E−04 | 8.818992E−05 |  |  |
| 35 | 2.338727E−03 | −6.738171E−04 | 7.561299E−05 |  |  |
| 36 | 1.255590E−03 | −5.306031E−04 | 7.376023E−05 |  |  |
| 45 | −2.035230E−02 | 4.611094E−03 | −4.174061E−04 |  |  |
| 46 | −6.889719E−02 | 2.500536E−02 | −6.143716E−03 | 9.024592E−04 | −5.854189E−05 |
| 55 | −4.777288E−02 | 1.775549E−02 | −4.754074E−03 | 7.553914E−04 | −5.114440E−05 |
| 56 | 3.141104E−03 | 4.223641E−04 | −3.675731E−04 | 6.199060E−05 | −3.033766E−06 |
| 65 | −1.320240E−02 | 7.587578E−03 | −2.075212E−03 | 2.821628E−04 | −1.530652E−05 |
| 66 | 3.486175E−03 | −2.441247E−04 | −5.908853E−05 | 1.216644E−05 | −6.622444E−07 |
| 75 | −9.335824E−03 | 1.265947E−03 | −3.493049E−05 | −1.099894E−05 | 9.229182E−07 |
| 76 | −8.935590E−03 | 1.832233E−03 | −2.223399E−04 | 1.461540E−05 | −3.994355E−07 |
| 85 | 3.443508E−03 | −6.131308E−04 | 7.093257E−05 | −4.732734E−06 | 1.376186E−07 |
| 86 | 3.342369E−04 | −3.407954E−05 | 2.302451E−06 | −9.370723E−08 | 1.741821E−09 |

TABLE 6-continued

| | | | | | |
|---|---|---|---|---|---|
| 95 | −4.936583E−05 | 5.514796E−06 | −3.316310E−07 | 1.049486E−08 | −1.376600E−10 |
| 96 | −1.682439E−06 | −7.111014E−08 | 1.257096E−08 | −5.365620E−10 | 7.787000E−12 |

In addition, a relationship between important parameters in the optical imaging lens 10 of the third embodiment is shown in TABLE 23 and TABLE 24.

Figure 11A:
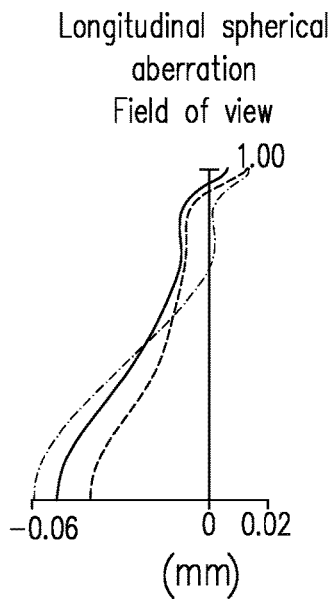
FIG. 11A to FIG. 11D are diagrams of a longitudinal spherical aberration and various optical aberrations of the optical imaging lens of the third embodiment.
Figure 11B:
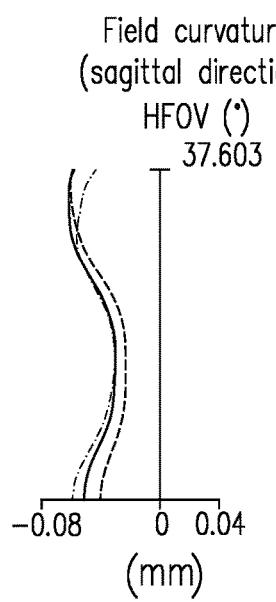
Figure 11C:
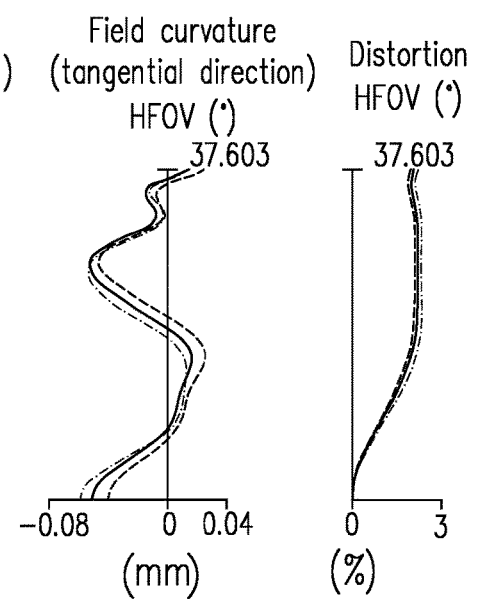
Figure 11D:
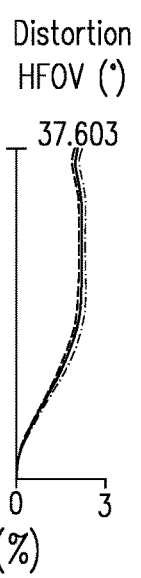

The longitudinal spherical aberration of the third embodiment is as shown in FIG. 11A, and the deviation of the imaging points of the off-axis rays of different heights is controlled within a range of ±0.06 mm. In the two field curvature aberration diagrams of FIG. 11B and FIG. 11C, a focal length variation of the three representative wavelengths within the entire field of view range falls within ±0.07 mm. The distortion aberration diagram in FIG. 11D shows that the distortion aberration of the embodiment is maintained within a range of ±2.5%.

From the above description, it is known that the system length of the third embodiment is shorter than the system length of the first embodiment, and the HFOV of the third embodiment is larger than that of the first embodiment. Therefore, compared to the first embodiment, the third embodiment has a smaller volume and a larger angle range for receiving images. In addition, the field curvature aberration of the third embodiment is smaller than that of the first embodiment, and the distortion aberration of the third embodiment is smaller than that of the first embodiment.

Figure 12:
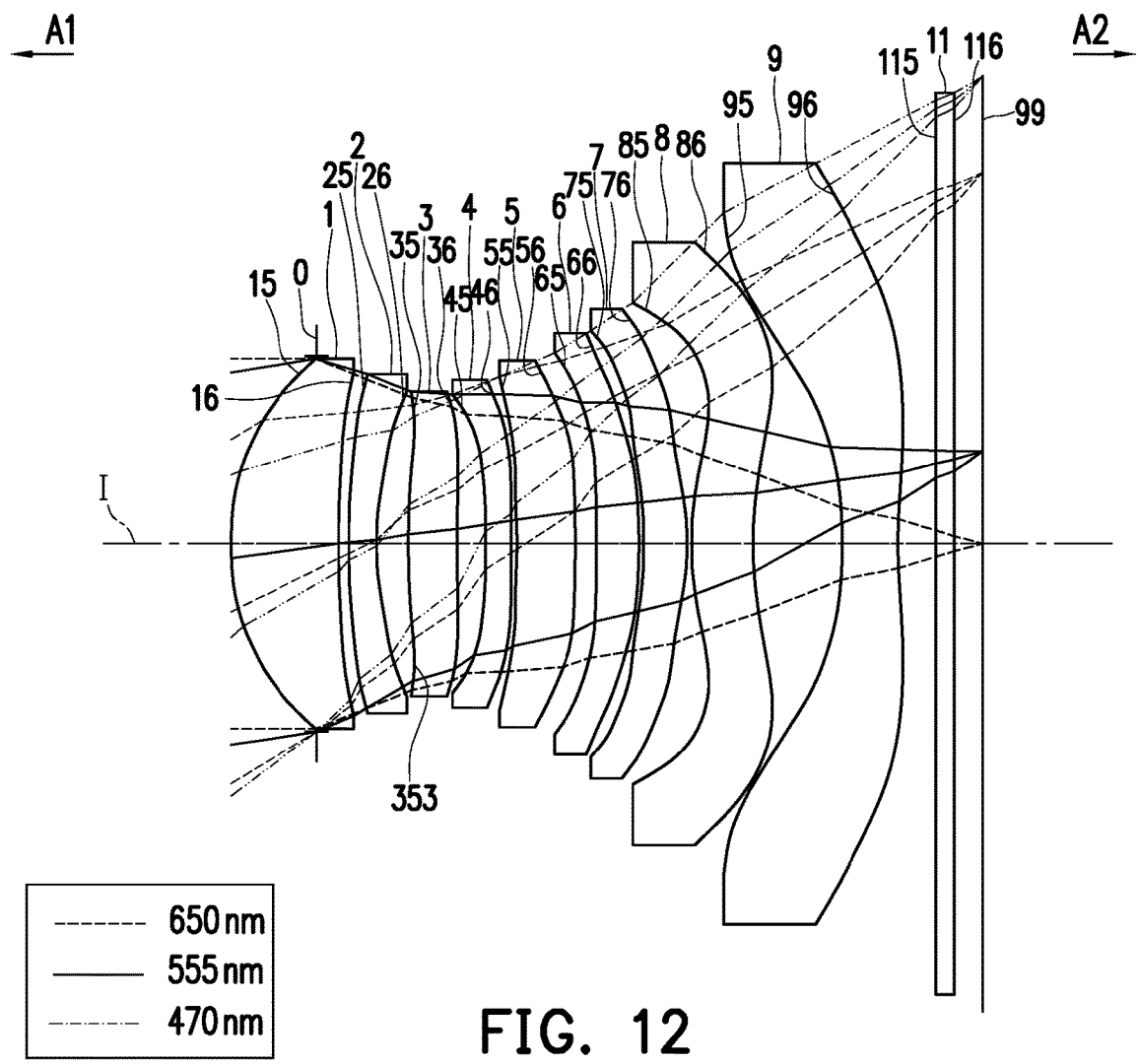
FIG. 12 is a schematic diagram of an optical imaging lens according to a fourth embodiment of the disclosure.

FIG. 12 is a schematic diagram of an optical imaging lens according to a fourth embodiment of the disclosure. FIG. 13A to FIG. 13D are diagrams of a longitudinal spherical aberration and various optical aberrations of the optical imaging lens of the fourth embodiment. Referring to FIG. 12 first, the fourth embodiment of the optical imaging lens 10 of the disclosure is substantially similar to the first embodiment, and differences there between are as follows: optical data, aspheric coefficients, and parameters between the lenses 1, 2, 3, 4, 5, 6, 7, 8, and 9 are more or less different. In addition, in the embodiment, the periphery region 353 of the object-side surface 35 of the third lens element 3 is concave. It should be noted that in order to clearly show the figure, reference numerals of the optical axis regions and the periphery regions with surface shapes similar to that of the first embodiment are omitted in FIG. 12.

The detailed optical data of the optical imaging lens 10 of the fourth embodiment is shown in TABLE 7, and the effective focal length of the optical imaging lens 10 of the fourth embodiment is 6.423 mm, the HFOV is 36.685 degrees, the system length is 8.051 mm, the Fno is 1.600, and the image height is 5.000 mm.

TABLE 7

Fourth embodiment
System length = 8.051 mm, Effective focal length-6.423 mm,
HFOV-36.685°, Image height = 5.000 mm, Fno = 1.600

| Device | Surface | Radius of curvature (mm) | Thickness (mm) | Refractive index | Abbe number | Focal length (mm) |
|---|---|---|---|---|---|---|
| Object | | Infinity | Infinity | | | |
| Aperture 0 | | Infinity | −0.923 | | | |
| First lens element 1 | Object-side surface 15 | 2.788 | 1.164 | 1.545 | 55.987 | 6.130 |
| | Image-side surface 16 | 14.188 | 0.098 | | | |
| Second lens element 2 | Object-side surface 25 | 5.711 | 0.300 | 1.671 | 19.243 | −14.454 |
| | Image-side surface 26 | 3.531 | 0.340 | | | |
| Third lens element 3 | Object-side surface 35 | 7.888 | 0.527 | 1.535 | 55.690 | 19.464 |
| | Image-side surface 36 | 31.386 | 0.295 | | | |
| Fourth lens element 4 | Object-side surface 45 | −16.949 | 0.278 | 1.671 | 19.243 | −21.390 |
| | Image-side surface 46 | 100.646 | 0.058 | | | |
| Fifth lens element 5 | Object-side surface 55 | −51.212 | 0.629 | 1.545 | 55.987 | 51.392 |
| | Image-side surface 56 | −18.212 | 0.227 | | | |
| Sixth lens element 6 | Object-side surface 65 | −37.110 | 0.447 | 1.535 | 55.690 | 27.079 |
| | Image-side surface 66 | −10.493 | 0.065 | | | |
| Seventh lens element 7 | Object-side surface 75 | −4.926 | 0.456 | 1.608 | 26.904 | 15.992 |
| | Image-side surface 76 | −3.392 | 0.047 | | | |
| Eighth lens element 8 | Object-side surface 85 | 4.230 | 0.654 | 1.545 | 55.987 | 115.580 |
| | Image-side surface 86 | 4.286 | 0.958 | | | |

TABLE 7-continued

Fourth embodiment
System length = 8.051 mm, Effective focal length-6.423 mm,
HFOV-36.685°, Image height = 5.000 mm, Fno = 1.600

| Device | Surface | Radius of curvature (mm) | Thickness (mm) | Refractive index | Abbe number | Focal length (mm) |
|---|---|---|---|---|---|---|
| Ninth lens element 9 | Object-side surface 95 | −5.370 | 0.593 | 1.545 | 55.987 | −5.341 |
| | Image-side surface 96 | 6.638 | 0.400 | | | |
| Filter 11 | Object-side surface 115 | Infinity | 0.210 | 1.517 | 64.167 | |
| | Image-side surface 116 | Infinity | 0.305 | | | |
| | Image plane 99 | Infinity | | | | |

As shown in TABLE 8, TABLE 8 illustrates various aspheric coefficients of the object-side surface 15 of the first lens element 1 to the image-side surface 96 of the ninth lens element 9 of the fourth embodiment in the above equation (1).

TABLE 8

| Surface | K | $a_4$ | $a_6$ | $a_8$ | $a_{10}$ |
|---|---|---|---|---|---|
| 15 | 0.000000E+00 | 2.347365E−03 | −8.404558E−04 | 1.066607E−03 | −5.252172E−04 |
| 16 | 0.000000E+00 | −1.232853E−03 | −2.426536E−03 | 3.767097E−03 | −1.857666E−03 |
| 25 | 0.000000E+00 | −2.043936E−02 | −8.172359E−03 | 1.216794E−02 | −5.890546E−03 |
| 26 | −3.059170E+00 | −9.244283E−03 | −1.432760E−02 | 1.678820E−02 | −9.837773E−03 |
| 35 | 0.000000E+00 | −2.582678E−03 | −1.274979E−02 | 5.217129E−03 | −3.924576E−03 |
| 36 | 0.000000E+00 | −7.423196E−03 | −8.895088E−03 | 1.207656E−03 | −9.608619E−04 |
| 45 | 0.000000E+00 | −4.500213E−02 | 3.653486E−02 | −5.795604E−02 | 4.623407E−02 |
| 46 | 0.000000E+00 | −9.083187E−02 | 1.449911E−01 | −1.763330E−01 | 1.335878E−01 |
| 55 | 0.000000E+00 | −8.676474E−02 | 1.442700E−01 | −1.528085E−01 | 1.006552E−01 |
| 56 | 0.000000E+00 | −1.591344E−02 | −1.773661E−02 | 1.943902E−02 | −1.238771E−02 |
| 65 | 0.000000E+00 | 1.096614E−02 | −5.342655E−02 | 2.888736E−02 | 3.265256E−03 |
| 66 | 0.000000E+00 | −6.402025E−02 | 1.994039E−02 | 1.344489E−02 | −1.254083E−02 |
| 75 | 0.000000E+00 | −6.429397E−02 | 1.263693E−01 | −8.980765E−02 | 3.682568E−02 |
| 76 | −2.298167E+00 | 2.858326E−02 | 3.046052E−02 | −4.507911E−02 | 2.639714E−02 |
| 85 | −2.692627E+01 | 7.253228E−02 | −7.613674E−02 | 3.787366E−02 | −1.346807E−02 |
| 86 | −2.220423E+01 | 3.871803E−02 | −3.076123E−02 | 1.023583E−02 | −2.239267E−03 |
| 95 | 0.000000E+00 | −1.374836E−02 | −8.237537E−04 | 7.699638E−05 | 1.952364E−04 |
| 96 | 0.000000E+00 | −2.552471E−02 | 2.594841E−03 | −2.873807E−04 | 3.260505E−05 |

| Surface | $a_{12}$ | $a_{14}$ | $a_{16}$ | $a_{18}$ | $a_{20}$ |
|---|---|---|---|---|---|
| 15 | 1.678124E−04 | −2.795066E−05 | 2.041923E−06 | | |
| 16 | 4.927578E−04 | −6.940258E−05 | 4.262388E−06 | | |
| 25 | 1.578231E−03 | −2.215640E−04 | 1.327711E−05 | | |
| 26 | 3.797172E−03 | −8.484709E−04 | 8.881358E−05 | | |
| 35 | 2.344305E−03 | −6.740445E−04 | 7.552570E−05 | | |
| 36 | 1.253991E−03 | −5.305594E−04 | 7.374932E−05 | | |
| 45 | −2.035286E−02 | 4.611452E−03 | −4.171333E−04 | | |
| 46 | −6.889887E−02 | 2.500708E−02 | −6.143586E−03 | 9.024280E−04 | −5.854244E−05 |
| 55 | −4.777200E−02 | 1.775521E−02 | −4.754008E−03 | 7.553535E−04 | −5.114498E−05 |
| 56 | 3.140408E−03 | 4.226759E−04 | −3.676187E−04 | 6.198067E−05 | −3.029765E−06 |
| 65 | −1.320187E−02 | 7.587525E−03 | −2.075131E−03 | 2.821526E−04 | −1.530690E−05 |
| 66 | 3.486496E−03 | −2.440609E−04 | −5.908409E−05 | 1.216662E−05 | −6.636840E−07 |
| 75 | −9.337346E−03 | 1.265918E−03 | −3.493779E−05 | −1.099798E−05 | 9.228584E−07 |
| 76 | −8.935769E−03 | 1.832206E−03 | −2.223393E−04 | 1.461537E−05 | −3.994131E−07 |
| 85 | 3.443209E−03 | −6.131567E−04 | 7.092885E−05 | −4.732375E−06 | 1.374934E−07 |
| 86 | 3.342315E−04 | −3.407895E−05 | 2.302557E−06 | −9.371007E−08 | 1.741941E−09 |
| 95 | −4.936441E−05 | 5.514772E−06 | −3.316307E−07 | 1.049519E−08 | −1.376780E−10 |
| 96 | −1.681722E−06 | −7.111186E−08 | 1.257272E−08 | −5.364470E−10 | 7.784000E−12 |

In addition, a relationship between important parameters in the optical imaging lens 10 of the fourth embodiment is shown in TABLE 23 and TABLE 24.

Figures 13A, 13B, 13C, 13D:
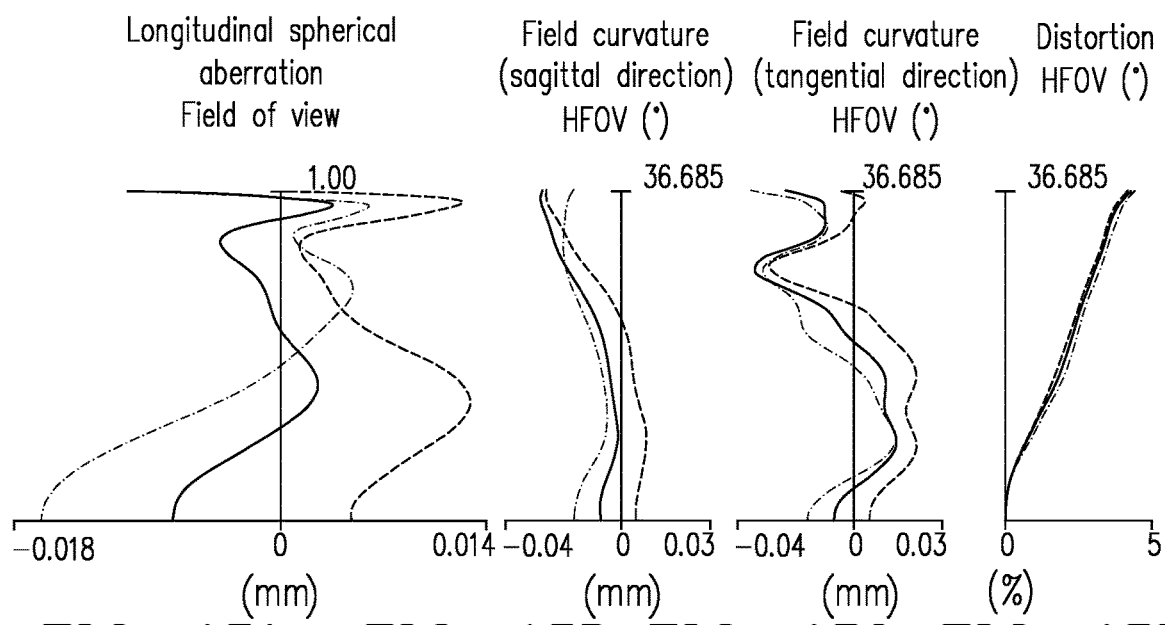
FIG. 13A to FIG. 13D are diagrams of a longitudinal spherical aberration and various optical aberrations of the optical imaging lens of the fourth embodiment.

The longitudinal spherical aberration of the fourth embodiment is as shown in FIG. 13A, and the deviation of the imaging points of the off-axis rays of different heights is controlled within a range of ±0.018 mm. In the two field curvature aberration diagrams of FIG. 13B and FIG. 13C, a focal length variation of the three representative wavelengths within the entire field of view range falls within ±0.04 mm. The distortion aberration diagram in FIG. 13D shows that the distortion aberration of the embodiment is maintained within a range of ±5%.

From the above description, it is known that the system length of the fourth embodiment is shorter than the system length of the first embodiment, and the HFOV of the fourth embodiment is larger than that of the first embodiment. Therefore, compared to the first embodiment, the fourth embodiment has a smaller volume and a larger angle range for receiving images. In addition, the longitudinal spherical aberration of the fourth embodiment is smaller than that of the first embodiment, the field curvature aberration of the fourth embodiment is smaller than that of the first embodiment, and the distortion aberration of the fourth embodiment is smaller than that of the first embodiment.

Figure 14:
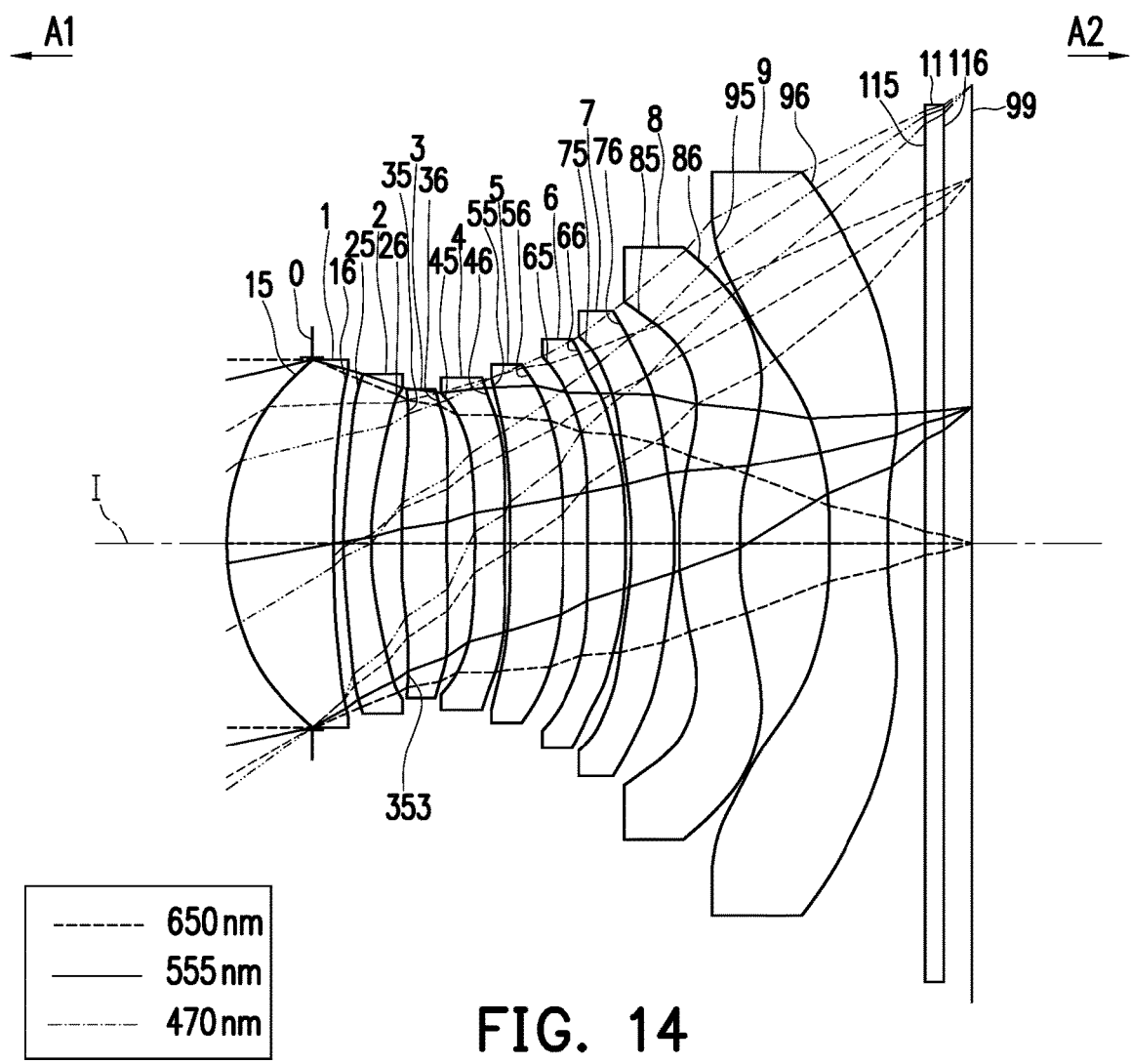
FIG. 14 is a schematic diagram of an optical imaging lens according to a fifth embodiment of the disclosure.

FIG. 14 is a schematic diagram of an optical imaging lens according to a fifth embodiment of the disclosure. FIG. 15A to FIG. 15D are diagrams of a longitudinal spherical aberration and various optical aberrations of the optical imaging lens of the fifth Referring to FIG. 14 first, the fifth embodiment of the optical imaging lens 10 embodiment. of the disclosure is substantially similar to the first embodiment, and differences there between are as follows: optical data, aspheric coefficients, and parameters between the lenses 1, 2, 3, 4, 5, 6, 7, 8, and 9 are more or less different. In addition, in the embodiment, the periphery region 353 of the object-side surface 35 of the third lens element 3 is concave. It should be noted that in order to clearly show the figure, reference numerals of the optical axis regions and the periphery regions with surface shapes similar to that of the first embodiment are omitted in FIG. 14.

The detailed optical data of the optical imaging lens 10 of the fifth embodiment is shown in TABLE 9, and the effective focal length of the optical imaging lens 10 of the fifth embodiment is 6.436 mm, the HFOV is 36.628 degrees, the system length is 8.054 mm, the Fno is 1.600, and the image height is 5.000 mm.

TABLE 9

Fifth embodiment
System length = 8.054 mm, Effective focal length-6.436 mm, HFOV = 36.628°,
Image height = 5.000 mm, Fno = 1.600

| Device | Surface | Radius of curvature (mm) | Thickness (mm) | Refractive index | Abbe number | Focal length (mm) |
|---|---|---|---|---|---|---|
| Object | | Infinity | Infinity | | | |
| Aperture 0 | | Infinity | −0.930 | | | |
| First lens element 1 | Object-side surface 15 | 2.770 | 1.166 | 1.545 | 55.987 | 6.112 |
| | Image-side surface 16 | 13.837 | 0.100 | | | |
| Second lens element 2 | Object-side surface 25 | 5.749 | 0.302 | 1.671 | 19.243 | −14.558 |
| | Image-side surface 26 | 3.555 | 0.329 | | | |
| Third lens element 3 | Object-side surface 35 | 7.541 | 0.481 | 1.535 | 55.690 | 19.448 |
| | Image-side surface 36 | 26.513 | 0.296 | | | |
| Fourth lens element 4 | Object-side surface 45 | −24.191 | 0.328 | 1.671 | 19.243 | −20.978 |
| | Image-side surface 46 | 34.650 | 0.060 | | | |
| Fifth lens element 5 | Object-side surface 55 | −36.782 | 0.573 | 1.545 | 55.987 | 48.216 |
| | Image-side surface 56 | −15.433 | 0.260 | | | |
| Sixth lens element 6 | Object-side surface 65 | −31.005 | 0.411 | 1.535 | 55.690 | 31.103 |
| | Image-side surface 66 | −10.906 | 0.067 | | | |
| Seventh lens element 7 | Object-side surface 75 | −4.919 | 0.462 | 1.608 | 26.904 | 15.918 |
| | Image-side surface 76 | −3.385 | 0.046 | | | |
| Eighth lens element 8 | Object-side surface 85 | 3.989 | 0.661 | 1.545 | 55.987 | 162.198 |
| | Image-side surface 86 | 3.932 | 0.962 | | | |
| Ninth lens element 9 | Object-side surface 95 | −5.700 | 0.631 | 1.545 | 55.987 | −5.347 |
| | Image-side surface 96 | 6.224 | 0.400 | | | |
| Filter 11 | Object-side surface 115 | Infinity | 0.210 | 1.517 | 64.167 | |
| | Image-side surface 116 | Infinity | 0.310 | | | |
| | Image plane 99 | Infinity | | | | |

As shown in TABLE 10, TABLE 10 illustrates various aspheric coefficients of the object-side surface 15 of the first lens element 1 to the image-side surface 96 of the ninth lens element 9 of the fifth embodiment in the above equation (1).

TABLE 10

| Surface | K | $a_4$ | $a_6$ | $a_8$ | $a_{10}$ |
|---|---|---|---|---|---|
| 15 | 0.000000E+00 | 2.145051E−03 | −8.521790E−04 | 1.060382E−03 | −5.252201E−04 |
| 16 | 0.000000E+00 | −1.369109E−03 | −2.420046E−03 | 3.765537E−03 | −1.859619E−03 |
| 25 | 0.000000E+00 | −2.040573E−02 | −8.180083E−03 | 1.216602E−02 | −5.893209E−03 |
| 26 | −3.083342E+00 | −9.375804E−03 | −1.433971E−02 | 1.678329E−02 | −9.842103E−03 |
| 35 | 0.000000E+00 | −2.281733E−03 | −1.272990E−02 | 5.211012E−03 | −3.928777E−03 |
| 36 | 0.000000E+00 | −7.503100E−03 | −9.001690E−03 | 1.173827E−03 | −9.626553E−04 |
| 45 | 0.000000E+00 | −4.565357E−02 | 3.654100E−02 | −5.792006E−02 | 4.622845E−02 |
| 46 | 0.000000E+00 | −9.045332E−02 | 1.450331E−01 | −1.763268E−01 | 1.335923E−01 |
| 55 | 0.000000E+00 | −8.660969E−02 | 1.442571E−01 | −1.528340E−01 | 1.006489E−01 |
| 56 | 0.000000E+00 | −1.576483E−02 | −1.772972E−02 | 1.944505E−02 | −1.239175E−02 |
| 65 | 0.000000E+00 | 9.720870E−03 | −5.348566E−02 | 2.886842E−02 | 3.262959E−03 |
| 66 | 0.000000E+00 | −6.530988E−02 | 1.986411E−02 | 1.344166E−02 | −1.254451E−02 |
| 75 | 0.000000E+00 | −6.449960E−02 | 1.263775E−01 | −8.981767E−02 | 3.681580E−02 |
| 76 | −2.162953E+00 | 2.847241E−02 | 3.046925E−02 | −4.506829E−02 | 2.639869E−02 |
| 85 | −2.531785E+01 | 7.159401E−02 | −7.594671E−02 | 3.787059E−02 | −1.346811E−02 |
| 86 | −2.022747E+01 | 3.842847E−02 | −3.073611E−02 | 1.023709E−02 | −2.239296E−03 |
| 95 | 0.000000E+00 | −1.416485E−02 | −8.339069E−04 | 7.649802E−05 | 1.952411E−04 |
| 96 | 0.000000E+00 | −2.636462E−02 | 2.599048E−03 | −2.865835E−04 | 3.259451E−05 |

| Surface | $a_{12}$ | $a_{14}$ | $a_{16}$ | $a_{18}$ | $a_{20}$ |
|---|---|---|---|---|---|
| 15 | 1.675773E−04 | −2.795711E−05 | 2.046848E−06 | | |
| 16 | 4.922583E−04 | −6.928127E−05 | 4.337358E−06 | | |
| 25 | 1.577273E−03 | −2.216722E−04 | 1.331766E−05 | | |
| 26 | 3.795705E−03 | −8.495468E−04 | 8.825174E−05 | | |
| 35 | 2.341924E−03 | −6.734053E−04 | 7.531798E−05 | | |
| 36 | 1.255655E−03 | −5.306119E−04 | 7.388277E−05 | | |
| 45 | −2.035052E−02 | 4.612127E−03 | −4.169553E−04 | | |
| 46 | −6.889702E−02 | 2.500541E−02 | −6.143696E−03 | 9.024672E−04 | −5.853867E−05 |
| 55 | −4.777286E−02 | 1.775547E−02 | −4.754088E−03 | 7.553832E−04 | −5.114839E−05 |
| 56 | 3.141092E−03 | 4.224005E−04 | −3.675682E−04 | 6.199174E−05 | −3.033450E−06 |
| 65 | −1.320257E−02 | 7.587551E−03 | −2.075216E−03 | 2.821622E−04 | −1.530659E−05 |
| 66 | 3.486204E−03 | −2.441212E−04 | −5.908816E−05 | 1.216648E−05 | −6.622441E−07 |
| 75 | −9.336535E−03 | 1.265925E−03 | −3.493081E−05 | −1.099881E−05 | 9.229531E−07 |
| 76 | −8.935588E−03 | 1.832233E−03 | −2.223399E−04 | 1.461540E−05 | −3.994348E−07 |
| 85 | 3.443497E−03 | −6.131312E−04 | 7.093266E−05 | −4.732707E−06 | 1.376237E−07 |
| 86 | 3.342372E−04 | −3.407973E−05 | 2.302423E−06 | −9.370988E−08 | 1.741599E−09 |
| 95 | −4.936565E−05 | 5.514800E−06 | −3.316311E−07 | 1.049483E−08 | −1.376630E−10 |
| 96 | −1.682235E−06 | −7.110831E−08 | 1.257109E−08 | −5.365530E−10 | 7.788000E−12 |

In addition, a relationship between important parameters in the optical imaging lens 10 of the fifth embodiment is shown in TABLE 23 and TABLE 24.

Figures 15A, 15B, 15C, 15D:
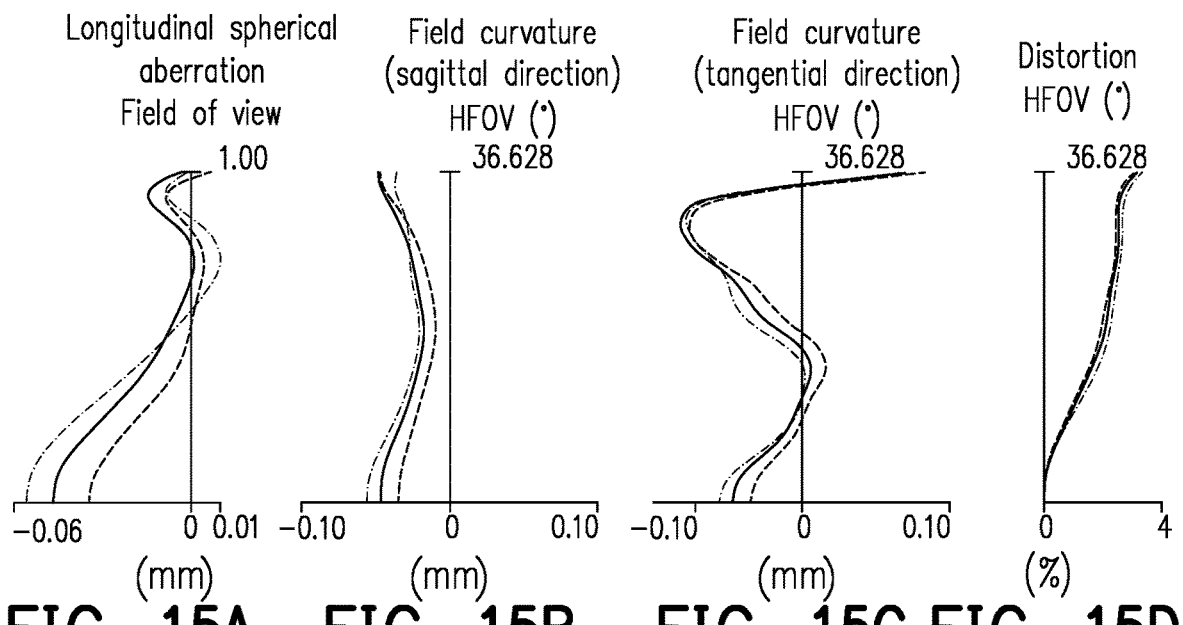
FIG. 15A to FIG. 15D are diagrams of a longitudinal spherical aberration and various optical aberrations of the optical imaging lens of the fifth embodiment.

The longitudinal spherical aberration of the fifth embodiment is as shown in FIG. 15A, and the deviation of the imaging points of the off-axis rays of different heights is controlled within a range of ±0.06 mm. In the two field curvature aberration diagrams of FIG. 15B and FIG. 15C, a focal length variation of the three representative wavelengths within the entire field of view range falls within ±0.09 mm. The distortion aberration diagram in FIG. 15D shows that the distortion aberration of the embodiment is maintained within a range of ±3.5%.

From the above description, it is known that the system length of the fifth embodiment is shorter than the system length of the first embodiment, and the HFOV of the fifth embodiment is larger than that of the first embodiment. Therefore, compared to the first embodiment, the fifth embodiment has a smaller volume and a larger angle range for receiving images. In addition, the field curvature aberration of the fifth embodiment is smaller than that of the first embodiment, and the distortion aberration of the fifth embodiment is smaller than that of the first embodiment.

Figure 16:
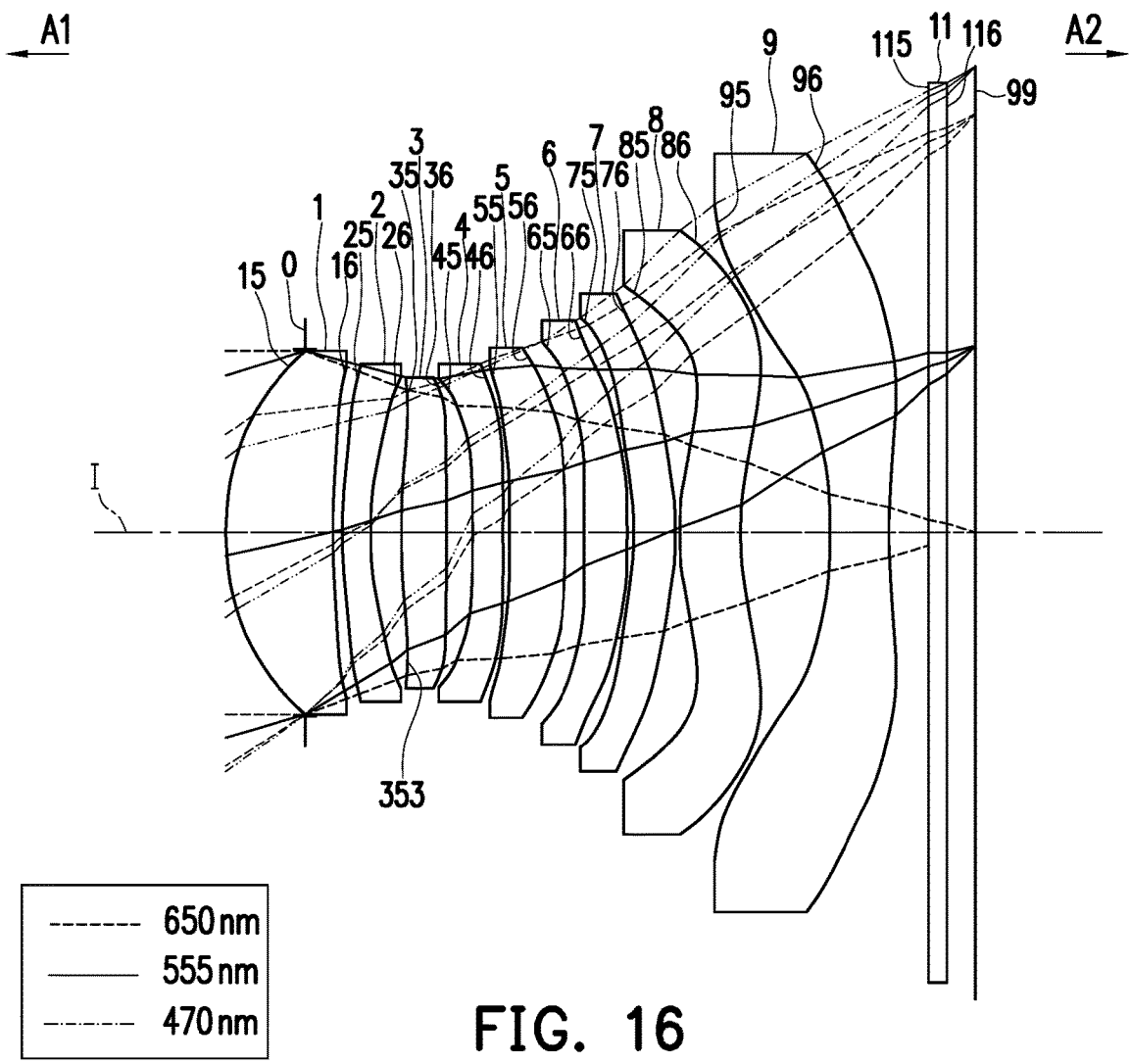
FIG. 16 is a schematic diagram of an optical imaging lens according to a sixth embodiment of the disclosure.

FIG. 16 is a schematic diagram of an optical imaging lens according to a sixth embodiment of the disclosure. FIG. 17A to FIG. 17D are diagrams of a longitudinal spherical aberration and various optical aberrations of the optical imaging lens of the sixth embodiment. Referring to FIG. 16 first, the sixth embodiment of the optical imaging lens 10 of the disclosure is substantially similar to the first embodiment, and differences there between are as follows: optical data, aspheric coefficients, and parameters between the lenses 1, 2, 3, 4, 5, 6, 7, 8, and 9 are more or less different. In addition, in the embodiment, the periphery region 353 of the object-side surface 35 of the third lens element 3 is concave. It should be noted that in order to clearly show the figure, reference numerals of the optical axis regions and the periphery regions with surface shapes similar to that of the first embodiment are omitted in FIG. 16.

The detailed optical data of the optical imaging lens 10 of the sixth embodiment is shown in TABLE 11, and the effective focal length of the optical imaging lens 10 of the sixth embodiment is 6.250 mm, the HFOV is 36.996 degrees, the system length is 8.050 mm, the Fno is 1.600, and the image height is 5.000 mm.

TABLE 11

Sixth embodiment
System length = 8.050 mm, Effective focal length = 6.250 mm, HFOV = 36.996°,
Image height = 5.000 mm, Fno = 1.600

| Device | Surface | Radius of curvature (mm) | Thickness (mm) | Refractive index | Abbe number | Focal length (mm) |
|---|---|---|---|---|---|---|
| Object | | Infinity | Infinity | | | |
| Aperture 0 | | Infinity | −0.854 | | | |
| First lens element 1 | Object-side surface 15 | 2.770 | 1.167 | 1.545 | 55.987 | 6.100 |
| | Image-side surface 16 | 13.979 | 0.095 | | | |
| Second lens element 2 | Object-side surface 25 | 5.729 | 0.300 | 1.671 | 19.243 | −14.453 |
| | Image-side surface 26 | 3.538 | 0.330 | | | |
| Third lens element 3 | Object-side surface 35 | 7.676 | 0.475 | 1.535 | 55.690 | 19.403 |
| | Image-side surface 36 | 28.515 | 0.291 | | | |
| Fourth lens element 4 | Object-side surface 45 | −23.960 | 0.328 | 1.671 | 19.243 | −20.954 |
| | Image-side surface 46 | 35.035 | 0.060 | | | |
| Fifth lens element 5 | Object-side surface 55 | −36.354 | 0.603 | 1.545 | 55.987 | 48.702 |
| | Image-side surface 56 | −15.452 | 0.212 | | | |
| Sixth lens element 6 | Object-side surface 65 | −39.074 | 0.456 | 1.535 | 55.690 | 28.600 |
| | Image-side surface 66 | −11.071 | 0.061 | | | |
| Seventh lens element 7 | Object-side surface 75 | −4.932 | 0.450 | 1.642 | 22.409 | 14.564 |
| | Image-side surface 76 | −3.354 | 0.054 | | | |
| Eighth lens element 8 | Object-side surface 85 | 4.261 | 0.656 | 1.545 | 55.987 | 117.628 |
| | Image-side surface 86 | 4.315 | 0.951 | | | |
| Ninth lens element 9 | Object-side surface 95 | −5.695 | 0.639 | 1.545 | 55.987 | −5.377 |
| | Image-side surface 96 | 6.306 | 0.400 | | | |
| Filter 11 | Object-side surface 115 | Infinity | 0.210 | 1.517 | 64.167 | |
| | Image-side surface 116 | Infinity | 0.314 | | | |
| Image plane 99 | | Infinity | | | | |

As shown in TABLE 12, TABLE 12 illustrates various aspheric coefficients of the object-side surface 15 of the first lens element 1 to the image-side surface 96 of the ninth lens element 9 of the sixth embodiment in the above equation (1).

TABLE 12

| Surface | K | $a_4$ | $a_6$ | $a_8$ | $a_{10}$ |
|---|---|---|---|---|---|
| 15 | 0.000000E+00 | 2.233760E−03 | −8.531305E−04 | 1.060112E−03 | −5.252374E−04 |
| 16 | 0.000000E+00 | −1.381237E−03 | −2.422245E−03 | 3.764982E−03 | −1.859792E−03 |
| 25 | 0.000000E+00 | −2.038835E−02 | −8.180608E−03 | 1.216528E−02 | −5.893630E−03 |
| 26 | −3.114514E+00 | −9.351046E−03 | −1.430465E−02 | 1.679261E−02 | −9.839988E−03 |
| 35 | 0.000000E+00 | −2.375690E−03 | −1.274721E−02 | 5.209854E−03 | −3.927490E−03 |
| 36 | 0.000000E+00 | −7.475602E−03 | −8.989045E−03 | 1.177472E−03 | −9.614981E−04 |
| 45 | 0.000000E+00 | −4.533030E−02 | 3.653897E−02 | −5.792359E−02 | 4.622691E−02 |
| 46 | 0.000000E+00 | −9.064505E−02 | 1.450326E−01 | −1.763258E−01 | 1.335926E−01 |
| 55 | 0.000000E+00 | −8.660444E−02 | 1.442559E−01 | −1.528346E−01 | 1.006488E−01 |
| 56 | 0.000000E+00 | −1.589429E−02 | −1.773525E−02 | 1.944540E−02 | −1.239160E−02 |
| 65 | 0.000000E+00 | 1.091825E−02 | −5.343620E−02 | 2.887114E−02 | 3.262894E−03 |
| 66 | 0.000000E+00 | −6.462298E−02 | 1.995706E−02 | 1.344595E−02 | −1.254430E−02 |
| 75 | 0.000000E+00 | −6.445203E−02 | 1.263977E−01 | −8.980741E−02 | 3.682456E−02 |
| 76 | −2.485299E+00 | 2.889222E−02 | 3.046755E−02 | −4.506827E−02 | 2.639869E−02 |
| 85 | −2.523296E+01 | 7.155696E−02 | −7.594920E−02 | 3.787058E−02 | −1.346809E−02 |
| 86 | −2.034230E+01 | 3.843891E−02 | −3.073707E−02 | 1.023687E−02 | −2.239322E−03 |

TABLE 12-continued

| Surface | | | | | |
|---|---|---|---|---|---|
| 95 | 0.000000E+00 | −1.401241E−02 | −8.311387E−04 | 7.653917E−05 | 1.952411E−04 |
| 96 | 0.000000E+00 | −2.630549E−02 | 2.605689E−03 | −2.862994E−04 | 3.259582E−05 |

| Surface | $a_{12}$ | $a_{14}$ | $a_{16}$ | $a_{18}$ | $a_{20}$ |
|---|---|---|---|---|---|
| 15 | 1.675879E−04 | −2.795400E−05 | 2.047805E−06 | | |
| 16 | 4.922004E−04 | −6.930082E−05 | 4.330884E−06 | | |
| 25 | 1.577147E−03 | −2.216679E−04 | 1.333346E−05 | | |
| 26 | 3.796233E−03 | −8.493894E−04 | 8.831361E−05 | | |
| 35 | 2.342797E−03 | −6.730504E−04 | 7.542210E−05 | | |
| 36 | 1.256151E−03 | −5.304067E−04 | 7.395550E−05 | | |
| 45 | −2.035112E−02 | 4.611893E−03 | −4.170444E−04 | | |
| 46 | −6.889699E−02 | 2.500540E−02 | −6.143704E−03 | 9.024628E−04 | −5.854077E−05 |
| 55 | −4.777283E−02 | 1.775550E−02 | −4.754076E−03 | 7.553886E−04 | −5.114626E−05 |
| 56 | 3.141119E−03 | 4.224032E−04 | −3.675687E−04 | 6.199129E−05 | −3.033651E−06 |
| 65 | −1.320260E−02 | 7.587541E−03 | −2.075217E−03 | 2.821620E−04 | −1.530658E−05 |
| 66 | 3.486223E−03 | −2.441194E−04 | −5.908803E−05 | 1.216647E−05 | −6.622506E−07 |
| 75 | −9.336420E−03 | 1.265924E−03 | −3.493116E−05 | −1.099886E−05 | 9.229473E−07 |
| 76 | −8.935587E−03 | 1.832233E−03 | −2.223399E−04 | 1.461540E−05 | −3.994351E−07 |
| 85 | 3.443501E−03 | −6.131306E−04 | 7.093273E−05 | −4.732699E−06 | 1.376246E−07 |
| 86 | 3.342349E−04 | −3.407991E−05 | 2.302411E−06 | −9.371068E−08 | 1.741548E−09 |
| 95 | −4.936568E−05 | 5.514798E−06 | −3.316310E−07 | 1.049484E−08 | −1.376620E−10 |
| 96 | −1.682190E−06 | −7.110300E−08 | 1.257112E−08 | −5.365530E−10 | 7.788000E−12 |

In addition, a relationship between important parameters in the optical imaging lens 10 of the sixth embodiment is shown in TABLE 23 and TABLE 24.

Figures 17A, 17B, 17C, 17D:
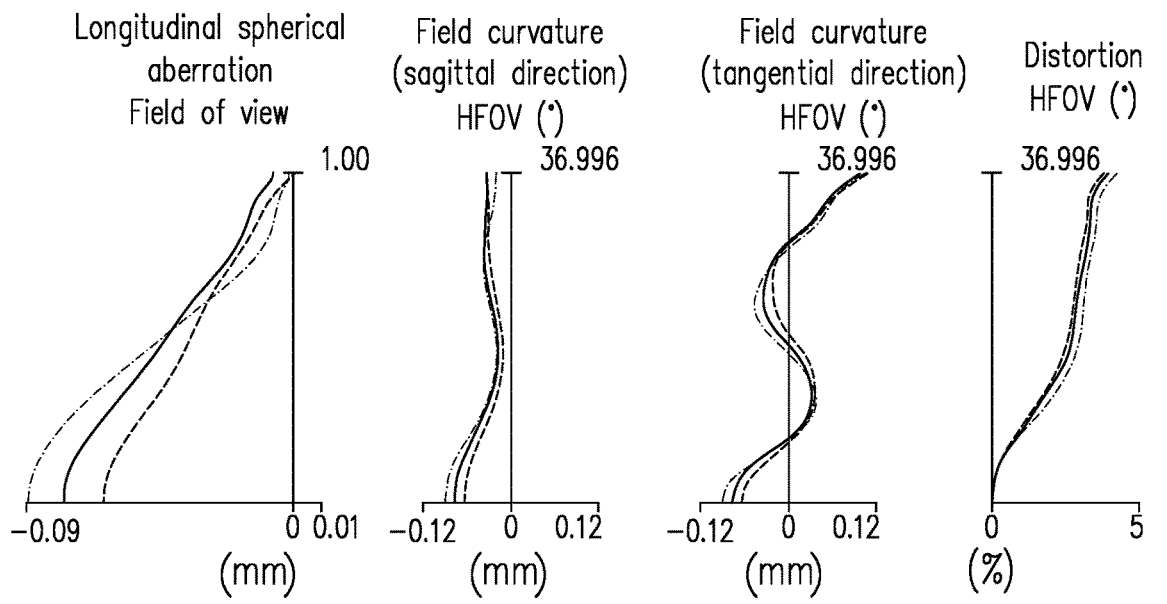
FIG. 17A to FIG. 17D are diagrams of a longitudinal spherical aberration and various optical aberrations of the optical imaging lens of the sixth embodiment.

The longitudinal spherical aberration of the sixth embodiment is as shown in FIG. 17A, and the deviation of the imaging points of the off-axis rays of different heights is controlled within a range of ±0.09 mm. In the two field curvature aberration diagrams of FIG. 17B and FIG. 17C, a focal length variation of the three representative wavelengths within the entire field of view range falls within ±0.12 mm. The distortion aberration diagram in FIG. 17D shows that the distortion aberration of the embodiment is maintained within a range of ±5%.

From the above description, it is known that the system length of the sixth embodiment is shorter than the system length of the first embodiment, and the HFOV of the sixth embodiment is larger than that of the first embodiment. Therefore, compared to the first embodiment, the sixth embodiment has a smaller volume and a larger angle range for receiving images. In addition, the field curvature aberration of the sixth embodiment is smaller than that of the first embodiment, and the distortion aberration of the sixth embodiment is smaller than that of the first embodiment.

Figure 18:
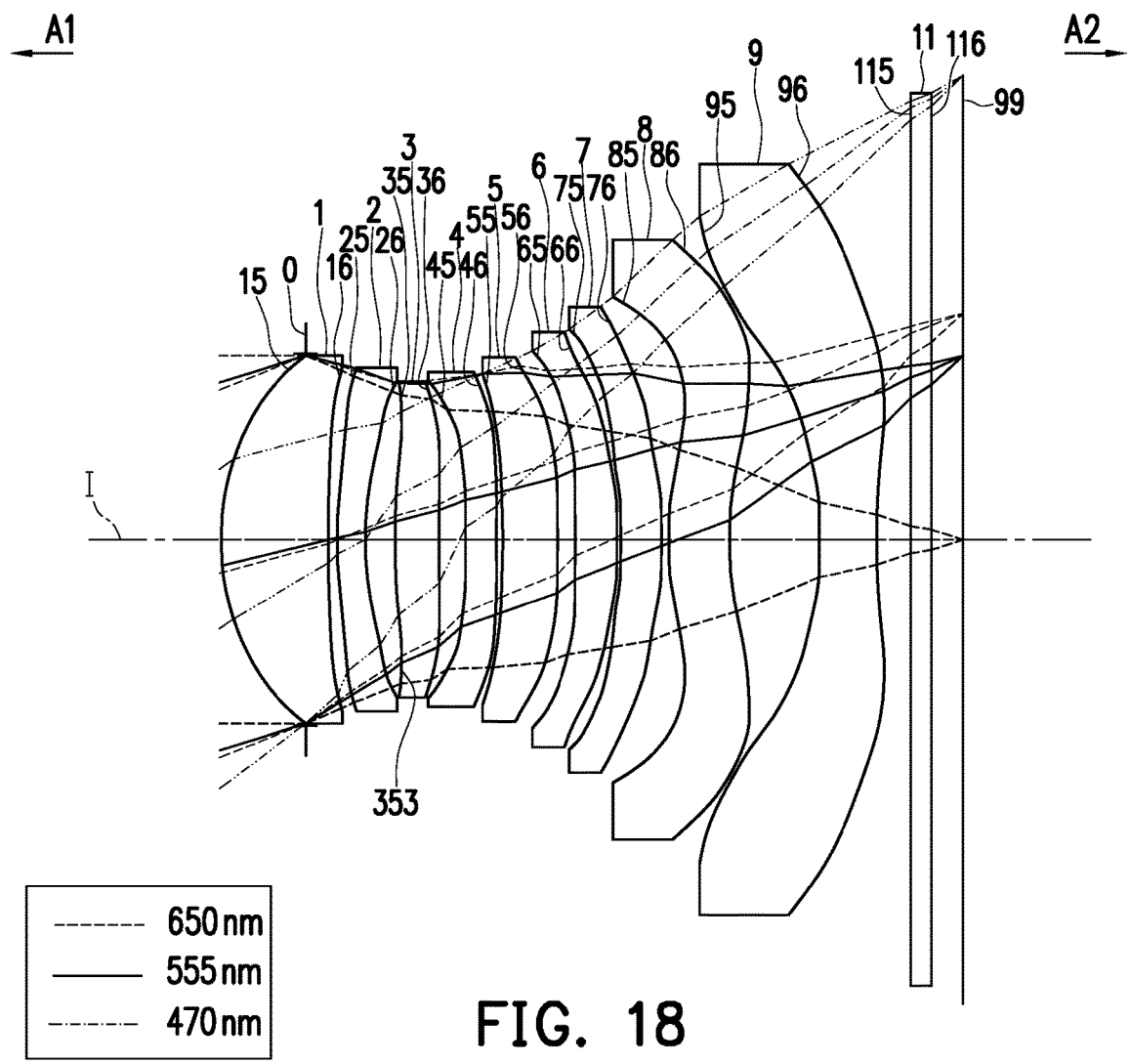
FIG. 18 is a schematic diagram of an optical imaging lens according to a seventh embodiment of the disclosure.

FIG. 18 is a schematic diagram of an optical imaging lens according to a seventh embodiment of the disclosure. FIG. 19A to FIG. 19D are diagrams of a longitudinal spherical aberration and various optical aberrations of the optical imaging lens of the seventh embodiment. Referring to FIG. 18 first, the seventh embodiment of the optical imaging lens 10 of the disclosure is substantially similar to the first embodiment, and differences there between are as follows: optical data, aspheric coefficients, and parameters between the lenses 1, 2, 3, 4, 5, 6, 7, 8, and 9 are more or less different. In addition, in the embodiment, the periphery region 353 of the object-side surface 35 of the third lens element 3 is concave. It should be noted that in order to clearly show the figure, reference numerals of the optical axis regions and the periphery regions with surface shapes similar to that of the first embodiment are omitted in FIG. 18.

The detailed optical data of the optical imaging lens 10 of the seventh embodiment is shown in TABLE 13, and the effective focal length of the optical imaging lens 10 of the seventh embodiment is 6.396 mm, the HFOV is 37.149 degrees, the system length is 7.998 mm, the Fno is 1.600, and the image height is 5.000 mm.

TABLE 13

Seventh embodiment
System length = 7.998 mm, Effective focal length = 6.396 mm, HFOV = 37.149°,
Image height = 5.000 mm, Fno = 1.600

| Device | Surface | Radius of curvature (mm) | Thickness (mm) | Refractive index | Abbe number | Focal length (mm) |
|---|---|---|---|---|---|---|
| Object | | Infinity | Infinity | | | |
| Aperture 0 | | Infinity | −0.915 | | | |
| First lens element 1 | Object-side surface 15 | 2.772 | 1.163 | 1.545 | 55.987 | 6.113 |
| | Image-side surface 16 | 13.910 | 0.095 | | | |
| Second lens element 2 | Object-side surface 25 | 5.700 | 0.300 | 1.671 | 19.243 | −14.808 |
| | Image-side surface 26 | 3.558 | 0.328 | | | |
| Third lens element 3 | Object-side surface 35 | 7.617 | 0.460 | 1.535 | 55.690 | 19.406 |
| | Image-side surface 36 | 27.695 | 0.292 | | | |

TABLE 13-continued

Seventh embodiment
System length = 7.998 mm, Effective focal length = 6.396 mm, HFOV = 37.149°,
Image height = 5.000 mm, Fno = 1.600

| Device | Surface | Radius of curvature (mm) | Thickness (mm) | Refractive index | Abbe number | Focal length (mm) |
|---|---|---|---|---|---|---|
| Fourth lens element 4 | Object-side surface 45 | −23.067 | 0.334 | 1.671 | 19.243 | −20.142 |
|  | Image-side surface 46 | 33.614 | 0.061 |  |  |  |
| Fifth lens element 5 | Object-side surface 55 | −31.315 | 0.597 | 1.545 | 55.987 | 52.324 |
|  | Image-side surface 56 | −15.044 | 0.200 |  |  |  |
| Sixth lens element 6 | Object-side surface 65 | −36.012 | 0.438 | 1.545 | 55.987 | 29.002 |
|  | Image-side surface 66 | −11.050 | 0.061 |  |  |  |
| Seventh lens element 7 | Object-side surface 75 | −4.887 | 0.439 | 1.608 | 26.904 | 15.757 |
|  | Image-side surface 76 | −3.354 | 0.062 |  |  |  |
| Eighth lens element 8 | Object-side surface 85 | 4.330 | 0.664 | 1.545 | 55.987 | 92.022 |
|  | Image-side surface 86 | 4.481 | 0.949 |  |  |  |
| Ninth lens element 9 | Object-side surface 95 | −5.708 | 0.633 | 1.545 | 55.987 | −5.390 |
|  | Image-side surface 96 | 6.319 | 0.400 |  |  |  |
| Filter 11 | Object-side surface 115 | Infinity | 0.210 | 1.517 | 64.167 |  |
|  | Image-side surface 116 | Infinity | 0.312 |  |  |  |
|  | Image plane 99 | Infinity |  |  |  |  |

As shown in TABLE 14, TABLE 14 illustrates various aspheric coefficients of the object-side surface 15 of the first lens element 1 to the image-side surface 96 of the ninth lens element 9 of the seventh embodiment in the above equation (1).

TABLE 14

| Surface | K | $a_4$ | $a_6$ | $a_8$ | $a_{10}$ |
|---|---|---|---|---|---|
| 15 | 0.000000E+00 | 2.257279E−03 | −8.420141E−04 | 1.061132E−03 | −5.251443E−04 |
| 16 | 0.000000E+00 | −1.395129E−03 | −2.424267E−03 | 3.764859E−03 | −1.859794E−03 |
| 25 | 0.000000E+00 | −2.039166E−02 | −8.183097E−03 | 1.216427E−02 | −5.893798E−03 |
| 26 | −3.101253E+00 | −9.378509E−03 | −1.431341E−02 | 1.679637E−02 | −9.838967E−03 |
| 35 | 0.000000E+00 | −2.411584E−03 | −1.274087E−02 | 5.211656E−03 | −3.927199E−03 |
| 36 | 0.000000E+00 | −7.560525E−03 | −9.006208E−03 | 1.172659E−03 | −9.623846E−04 |
| 45 | 0.000000E+00 | −4.517429E−02 | 3.659035E−02 | −5.791505E−02 | 4.622811E−02 |
| 46 | 0.000000E+00 | −9.066980E−02 | 1.450218E−01 | −1.763263E−01 | 1.335927E−01 |
| 55 | 0.000000E+00 | −8.657265E−02 | 1.442596E−01 | −1.528344E−01 | 1.006488E−01 |
| 56 | 0.000000E+00 | −1.580419E−02 | −1.772556E−02 | 1.944688E−02 | −1.239142E−02 |
| 65 | 0.000000E+00 | 1.047235E−02 | −5.349527E−02 | 2.886646E−02 | 3.262988E−03 |
| 66 | 0.000000E+00 | −6.492901E−02 | 1.987280E−02 | 1.344204E−02 | −1.254458E−02 |
| 75 | 0.000000E+00 | −6.453933E−02 | 1.263695E−01 | −8.981614E−02 | 3.681983E−02 |
| 76 | −2.090462E+00 | 2.860187E−02 | 3.046217E−02 | −4.506858E−02 | 2.639863E−02 |
| 85 | −2.535238E+01 | 7.159374E−02 | −7.595078E−02 | 3.787006E−02 | −1.346817E−02 |
| 86 | −2.043740E+01 | 3.842999E−02 | −3.073455E−02 | 1.023723E−02 | −2.239285E−03 |
| 95 | 0.000000E+00 | −1.431453E−02 | −8.341301E−04 | 7.652518E−05 | 1.952426E−04 |
| 96 | 0.000000E+00 | −2.625253E−02 | 2.594252E−03 | −2.864092E−04 | 3.259290E−05 |

| Surface | $a_{12}$ | $a_{14}$ | $a_{16}$ | $a_{18}$ | $a_{20}$ |
|---|---|---|---|---|---|
| 15 | 1.675800E−04 | −2.795885E−05 | 2.046440E−06 |  |  |
| 16 | 4.921847E−04 | −6.931141E−05 | 4.324432E−06 |  |  |
| 25 | 1.577074E−03 | −2.217165E−04 | 1.331456E−05 |  |  |
| 26 | 3.796196E−03 | −8.495127E−04 | 8.824866E−05 |  |  |
| 35 | 2.342964E−03 | −6.728438E−04 | 7.556945E−05 |  |  |

TABLE 14-continued

| | | | | |
|---|---|---|---|---|
| 36 | 1.256121E−03 | −5.303040E−04 | 7.403296E−05 | | |
| 45 | −2.035117E−02 | 4.611718E−03 | −4.171448E−04 | | |
| 46 | −6.889693E−02 | 2.500542E−02 | −6.143702E−03 | 9.024621E−04 | −5.854131E−05 |
| 55 | −4.777284E−02 | 1.775550E−02 | −4.754075E−03 | 7.553888E−04 | −5.114634E−05 |
| 56 | 3.141130E−03 | 4.224012E−04 | −3.675701E−04 | 6.199089E−05 | −3.033748E−06 |
| 65 | −1.320253E−02 | 7.587561E−03 | −2.075213E−03 | 2.821626E−04 | −1.530644E−05 |
| 66 | 3.486191E−03 | −2.441235E−04 | −5.908852E−05 | 1.216642E−05 | −6.622540E−07 |
| 75 | −9.336469E−03 | 1.265925E−03 | −3.493114E−05 | −1.099885E−05 | 9.229421E−07 |
| 76 | −8.935591E−03 | 1.832233E−03 | −2.223399E−04 | 1.461541E−05 | −3.994345E−07 |
| 85 | 3.443489E−03 | −6.131323E−04 | 7.093249E−05 | −4.732731E−06 | 1.376202E−07 |
| 86 | 3.342382E−04 | −3.407963E−05 | 2.302432E−06 | −9.370913E−08 | 1.741663E−09 |
| 95 | −4.936556E−05 | 5.514806E−06 | −3.316307E−07 | 1.049486E−08 | −1.376610E−10 |
| 96 | −1.682452E−06 | −7.111672E−08 | 1.257045E−08 | −5.365850E−10 | 7.787000E−12 |

In addition, a relationship between important parameters in the optical imaging lens 10 of the seventh embodiment is shown in TABLE 25 and TABLE 26.

Figures 19A, 19B, 19C, 19D:
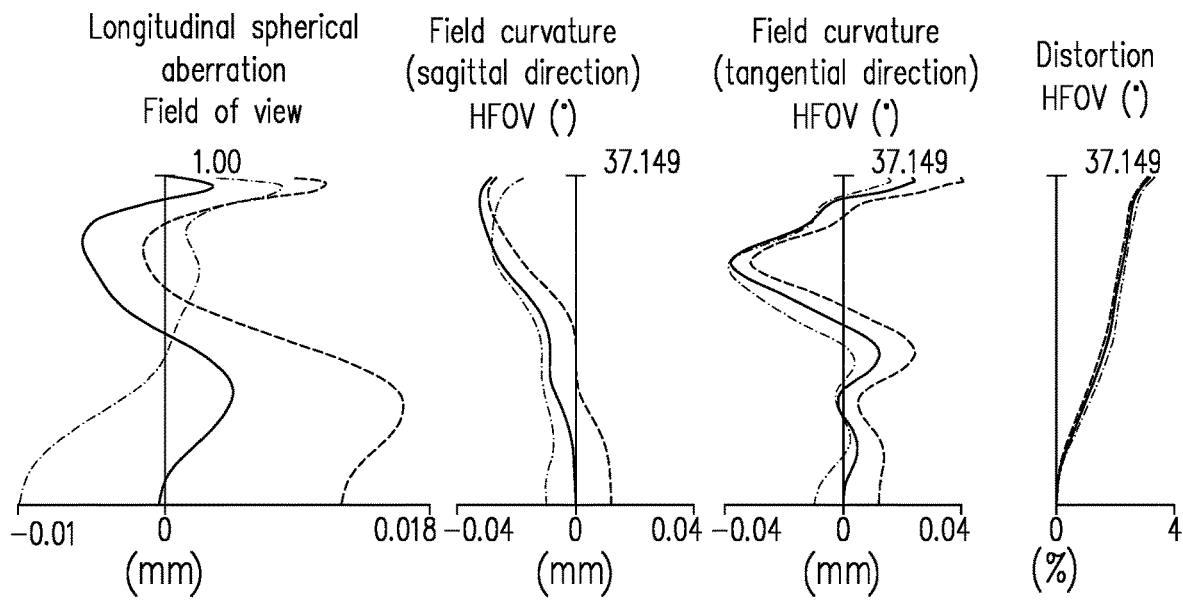
FIG. 19A to FIG. 19D are diagrams of a longitudinal spherical aberration and various optical aberrations of the optical imaging lens of the seventh embodiment.

The longitudinal spherical aberration of the seventh embodiment is as shown in FIG. 19A, and the deviation of the imaging points of the off-axis rays of different heights is controlled within a range of ±0.018 mm. In the two field curvature aberration diagrams of FIG. 19B and FIG. 19C, a focal length variation of the three representative wavelengths within the entire field of view range falls within ±0.045 mm. The distortion aberration diagram in FIG. 19D shows that the distortion aberration of the embodiment is maintained within a range of ±3.5%.

From the above description, it is known that the system length of the seventh embodiment is shorter than the system length of the first embodiment, and the HFOV of the seventh embodiment is larger than that of the first embodiment. Therefore, compared to the first embodiment, the seventh embodiment has a smaller volume and a larger angle range for receiving images. In addition, the longitudinal spherical aberration of the seventh embodiment is smaller than that of the first embodiment, the field curvature aberration of the seventh embodiment is smaller than that of the first embodiment, and the distortion aberration of the seventh embodiment is smaller than that of the first embodiment.

Figure 20:
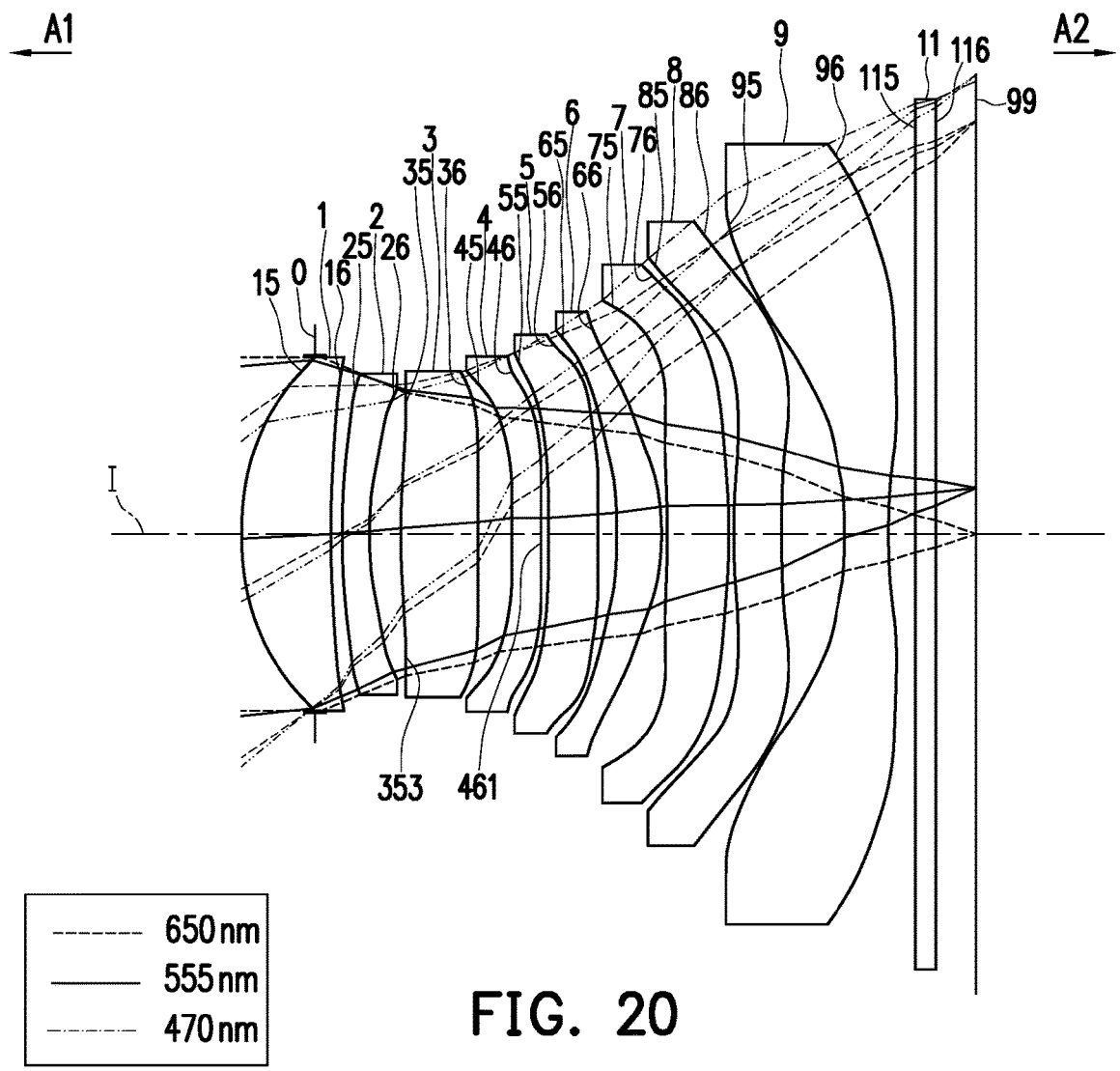
FIG. 20 is a schematic diagram of an optical imaging lens according to an eighth embodiment of the disclosure.

FIG. 20 is a schematic diagram of an optical imaging lens according to an eighth embodiment of the disclosure. FIG. 21A to FIG. 21D are diagrams of a longitudinal spherical aberration and various optical aberrations of the optical imaging lens of the eighth embodiment. Referring to FIG. 20 first, the eighth embodiment of the optical imaging lens 10 of the disclosure is substantially similar to the first embodiment, and differences there between are as follows: optical data, aspheric coefficients, and parameters between the lenses 1, 2, 3, 4, 5, 6, 7, 8, and 9 are more or less different. In addition, in the embodiment, the periphery region 353 of the object-side surface 35 of the third lens element 3 is concave, the optical axis region 461 of the image-side surface 46 of the fourth lens element 4 is convex, the fifth lens element 5 has negative refracting power, and the eighth lens element 8 has negative refracting power. It should be noted that in order to clearly show the figure, reference numerals of the optical axis regions and the periphery regions with surface shapes similar to that of the first embodiment are omitted in FIG. 20.

The detailed optical data of the optical imaging lens 10 of the eighth embodiment is shown in TABLE 15, and the effective focal length of the optical imaging lens 10 of the eighth embodiment is 6.122 mm, the HFOV is 37.591 degrees, the system length is 8.033 mm, the Fno is 1.600, and the image height is 5.000 mm.

TABLE 15

Eighth embodiment
System length = 8.033 mm, Effective focal length = 6.122 mm, HFOV = 37.591°,
Image height = 5.000 mm, Fno = 1.600

| Device | Surface | Radius of curvature (mm) | Thickness (mm) | Refractive index | Abbe number | Focal length (mm) |
|---|---|---|---|---|---|---|
| Object | | Infinity | Infinity | | | |
| Aperture 0 | | Infinity | −0.820 | | | |
| First lens element 1 | Object-side surface 15 | 2.704 | 1.003 | 1.545 | 55.987 | 5.976 |
| | Image-side surface 16 | 13.683 | 0.116 | | | |
| Second lens element 2 | Object-side surface 25 | 6.234 | 0.300 | 1.671 | 19.243 | −14.046 |
| | Image-side surface 26 | 3.694 | 0.341 | | | |
| Third lens element 3 | Object-side surface 35 | 8.541 | 0.833 | 1.535 | 55.690 | 18.430 |
| | Image-side surface 36 | 60.145 | 0.371 | | | |
| Fourth lens element 4 | Object-side surface 45 | −19.477 | 0.328 | 1.671 | 19.243 | −64.232 |
| | Image-side surface 46 | −35.494 | 0.074 | | | |
| Fifth lens element 5 | Object-side surface 55 | −35.022 | 0.543 | 1.545 | 55.987 | −80.147 |
| | Image-side surface 56 | −175.988 | 0.205 | | | |

TABLE 15-continued

Eighth embodiment
System length = 8.033 mm, Effective focal length = 6.122 mm, HFOV = 37.591°,
Image height = 5.000 mm, Fno = 1.600

| Device | Surface | Radius of curvature (mm) | Thickness (mm) | Refractive index | Abbe number | Focal length (mm) |
|---|---|---|---|---|---|---|
| Sixth lens element 6 | Object-side surface 65 | −3.711 | 0.494 | 1.545 | 55.987 | 7.570 |
| | Image-side surface 66 | −2.048 | 0.061 | | | |
| Seventh lens element 7 | Object-side surface 75 | −12.181 | 0.677 | 1.545 | 55.987 | 29.625 |
| | Image-side surface 76 | −7.086 | 0.048 | | | |
| Eighth lens element 8 | Object-side surface 85 | 15.967 | 0.520 | 1.661 | 20.373 | −47.911 |
| | Image-side surface 86 | 10.509 | 0.689 | | | |
| Ninth lens element 9 | Object-side surface 95 | −4.716 | 0.485 | 1.545 | 55.987 | −4.696 |
| | Image-side surface 96 | 5.829 | 0.300 | | | |
| Filter 11 | Object-side surface 115 | Infinity | 0.210 | 1.517 | 64.167 | |
| | Image-side surface 116 | Infinity | 0.437 | | | |
| | Image plane 99 | Infinity | | | | |

As shown in TABLE 16, TABLE 16 illustrates various aspheric coefficients of the object-side surface 15 of the first lens element 1 to the image-side surface 96 of the ninth lens element 9 of the eighth embodiment in the above equation (1).

TABLE 16

| Surface | K | $a_4$ | $a_6$ | $a_8$ | $a_{10}$ |
|---|---|---|---|---|---|
| 15 | 2.752976E−01 | 4.193338E−05 | −8.607814E−04 | 5.952945E−04 | −2.048535E−04 |
| 16 | 0.000000E+00 | −2.051527E−03 | −1.553479E−03 | 2.432605E−03 | −1.025226E−03 |
| 25 | 8.074276E+00 | −2.255422E−02 | −4.666367E−03 | 7.303591E−03 | −2.849007E−03 |
| 26 | −3.951562E+00 | −6.418506E−03 | −9.145768E−03 | 1.139448E−02 | −6.461107E−03 |
| 35 | 0.000000E+00 | −3.413194E−03 | −8.744186E−03 | 2.599956E−03 | −1.659852E−03 |
| 36 | 0.000000E+00 | −2.185344E−03 | −1.514769E−02 | 1.013198E−02 | −7.910832E−03 |
| 45 | 0.000000E+00 | −1.602088E−02 | −1.923609E−02 | 3.799017E−03 | −3.601176E−03 |
| 46 | 0.000000E+00 | 6.112349E−03 | −4.334461E−02 | 1.717782E−02 | −3.984200E−04 |
| 55 | 0.000000E+00 | −5.406755E−03 | −3.262002E−02 | 2.965671E−03 | 2.631430E−02 |
| 56 | 0.000000E+00 | −1.580714E−02 | 8.866517E−03 | −4.245618E−02 | 4.582489E−02 |
| 65 | 1.250693E+00 | 2.678753E−02 | 2.992552E−02 | −7.546626E−02 | 6.812365E−02 |
| 66 | −1.039444E+00 | 5.856745E−02 | −7.826756E−03 | −1.753711E−02 | 1.758929E−02 |
| 75 | 0.000000E+00 | 1.696606E−02 | 1.335817E−02 | −1.657912E−02 | 8.519900E−03 |
| 76 | 0.000000E+00 | 4.710481E−05 | 1.340177E−02 | −8.165078E−03 | 2.563058E−03 |
| 85 | 0.000000E+00 | 3.154510E−02 | −3.168583E−02 | 1.111888E−02 | −2.723531E−03 |
| 86 | −1.182082E+01 | 2.413035E−02 | −2.661802E−02 | 9.725545E−03 | −2.421392E−03 |
| 95 | −3.803406E−01 | −1.539360E−02 | −1.405371E−03 | 1.394214E−03 | −2.371095E−04 |
| 96 | −1.335949E+01 | −2.004602E−02 | 2.028119E−03 | 1.364207E−04 | −5.554758E−05 |

| Surface | $a_{12}$ | $a_{14}$ | $a_{16}$ | $a_{18}$ | $a_{20}$ |
|---|---|---|---|---|---|
| 15 | 2.970039E−05 | 1.173676E−06 | −7.051601E−07 | | |
| 16 | 2.155062E−04 | −2.298847E−05 | 1.261916E−06 | | |
| 25 | 4.632706E−04 | −2.976490E−06 | −4.362369E−06 | | |
| 26 | 2.564269E−03 | −6.269634E−04 | 7.760583E−05 | | |
| 35 | 9.521545E−04 | −2.655724E−04 | 3.128276E−05 | | |
| 36 | 3.841872E−03 | −9.278279E−04 | 8.541869E−05 | | |
| 45 | 3.561450E−03 | −1.226359E−03 | 1.422533E−04 | | |
| 46 | −1.601132E−03 | 4.349699E−04 | −3.334631E−05 | | |
| 55 | −2.327967E−02 | 9.533731E−03 | −2.180923E−03 | 2.731345E−04 | −1.464308E−05 |
| 56 | −2.346732E−02 | 6.575893E−03 | −1.025581E−03 | 8.124695E−05 | −2.360357E−06 |
| 65 | −3.306287E−02 | 9.319190E−03 | −1.517798E−03 | 1.315610E−04 | −4.647831E−06 |
| 66 | −8.824788E−03 | 2.584645E−03 | −4.359384E−04 | 3.902485E−05 | −1.434311E−06 |
| 75 | −2.960490E−03 | 6.951558E−04 | −1.032656E−04 | 8.579633E−06 | −2.988875E−07 |

TABLE 16-continued

| | | | | | |
|---|---|---|---|---|---|
| 76 | −5.952213E−04 | 1.039115E−04 | −1.224400E−05 | 8.333992E−07 | −2.421242E−08 |
| 85 | 4.504665E−04 | −4.713908E−05 | 2.921883E−06 | −9.235611E−08 | 9.394190E−10 |
| 86 | 4.231914E−04 | −4.974068E−05 | 3.688778E−06 | −1.543390E−07 | 2.758686E−09 |
| 95 | 1.684420E−05 | −1.259990E−07 | −5.628599E−08 | 3.287077E−09 | −5.944600E−11 |
| 96 | 5.711518E−06 | −2.740606E−07 | 5.137866E−09 | 4.029100E−11 | −2.040000E−12 |

In addition, a relationship between important parameters in the optical imaging lens 10 of the eighth embodiment is shown in TABLE 25 and TABLE 26.

Figure 21A:
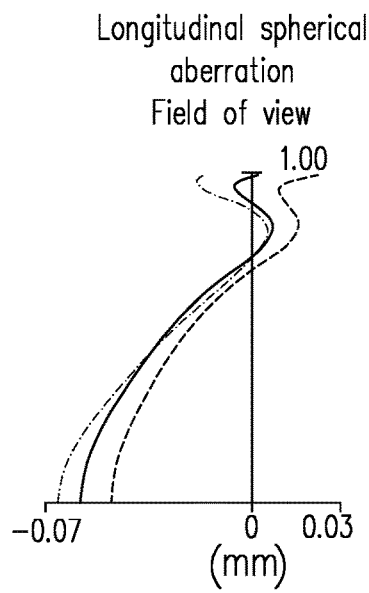
FIG. 21A to FIG. 21D are diagrams of a longitudinal spherical aberration and various optical aberrations of the optical imaging lens of the eighth embodiment.
Figure 21B:
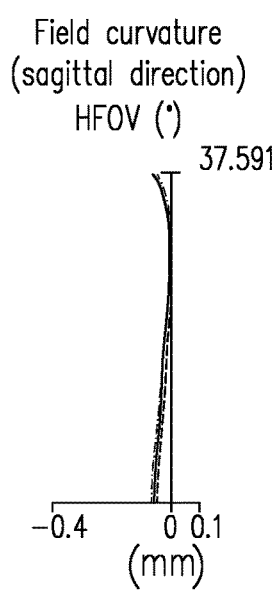
Figure 21C:
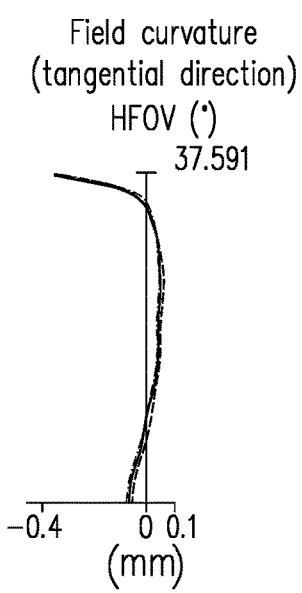
Figure 21D:

The longitudinal spherical aberration of the eighth embodiment is as shown in FIG. 21A, and the deviation of the imaging points of the off-axis rays of different heights is controlled within a range of ±0.07 mm. In the two field curvature aberration diagrams of FIG. 21B and FIG. 21C, a focal length variation of the three representative wavelengths within the entire field of view range falls within ±0.35 mm. The distortion aberration diagram in FIG. 21D shows that the distortion aberration of the embodiment is maintained within a range of ±5%.

From the above description, it is known that the system length of the eighth embodiment is shorter than the system length of the first embodiment, and the HFOV of the eighth embodiment is larger than that of the first embodiment. Therefore, compared to the first embodiment, the eighth embodiment has a smaller volume and a larger angle range for receiving images. In addition, the field curvature aberration of the eighth embodiment is smaller than that of the first embodiment, and the distortion aberration of the eighth embodiment is smaller than that of the first embodiment.

Figure 22:
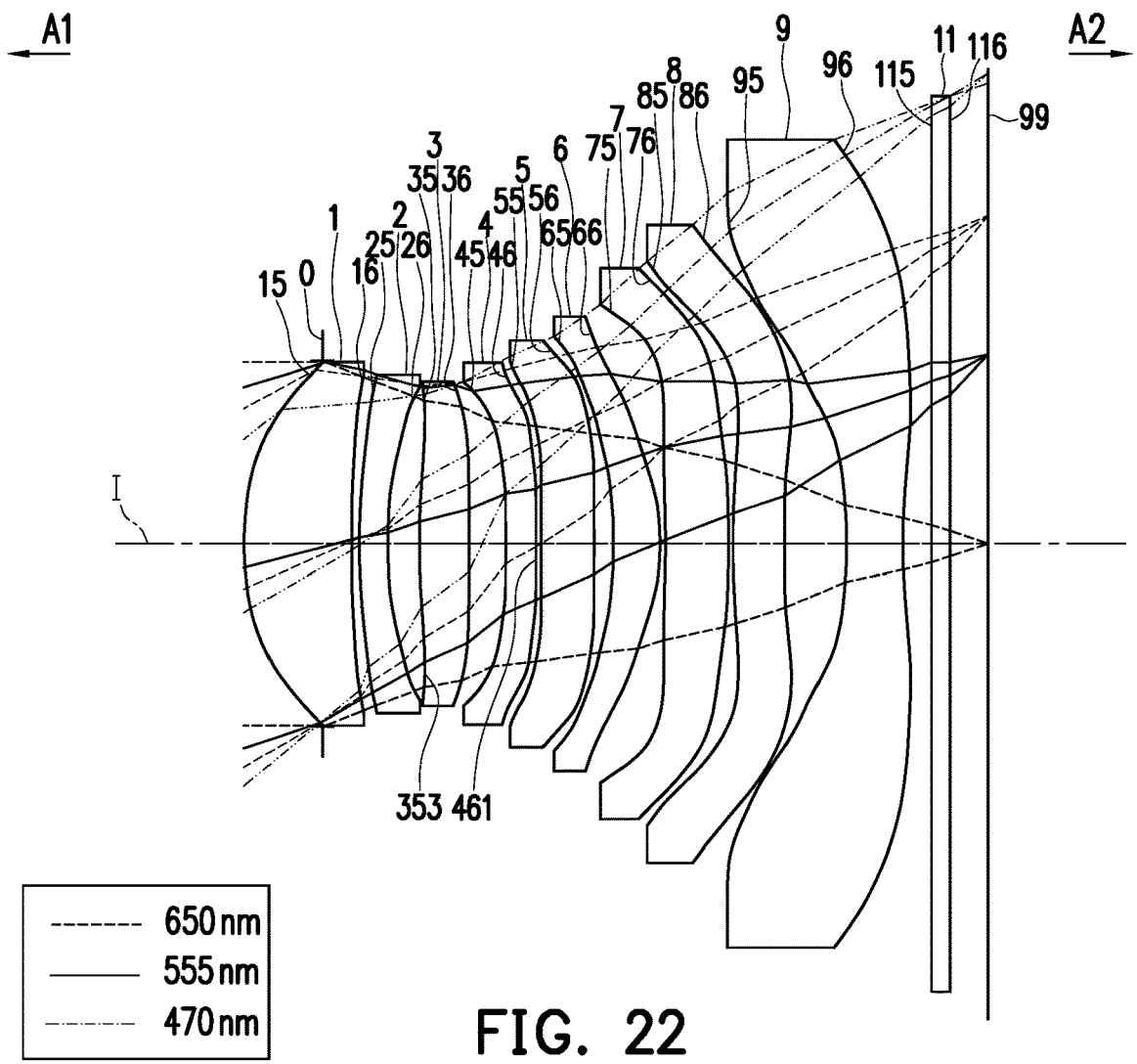
FIG. 22 is a schematic diagram of an optical imaging lens according to a ninth embodiment of the disclosure.

FIG. 22 is a schematic diagram of an optical imaging lens according to a ninth embodiment of the disclosure. FIG. 23A to FIG. 23D are diagrams of a longitudinal spherical aberration and various optical aberrations of the optical imaging lens of the ninth embodiment. Referring to FIG. 22 first, the ninth embodiment of the optical imaging lens 10 of the disclosure is substantially similar to the first embodiment, and differences there between are as follows: optical data, aspheric coefficients, and parameters between the lenses 1, 2, 3, 4, 5, 6, 7, 8, and 9 are more or less different. In addition, in the embodiment, the periphery region 353 of the object-side surface 35 of the third lens element 3 is concave, the optical axis region 461 of the image-side surface 46 of the fourth lens element 4 is convex, the fifth lens element 5 has negative refracting power, and the eighth lens element 8 has negative refracting power. It should be noted that in order to clearly show the figure, reference numerals of the optical axis regions and the periphery regions with surface shapes similar to that of the first embodiment are omitted in FIG. 22.

The detailed optical data of the optical imaging lens 10 of the ninth embodiment is shown in TABLE 17, and the effective focal length of the optical imaging lens 10 of the ninth embodiment is 6.186 mm, the HFOV is 37.979 degrees, the system length is 8.003 mm, the Fno 10 is 1.600, and the image height is 5.000 mm.

TABLE 17

Ninth embodiment
System length = 8.003 mm, Effective focal length = 6.186 mm, HFOV = 37.979°,
Image height = 5.000 mm, Fno = 1.600

| Device | Surface | Radius of curvature (mm) | Thickness (mm) | Refractive index | Abbe number | Focal length (mm) |
|---|---|---|---|---|---|---|
| Object | | Infinity | Infinity | | | |
| Aperture 0 | | Infinity | −0.844 | | | |
| First lens element 1 | Object-side surface 15 | 2.706 | 1.162 | 1.545 | 55.987 | 5.978 |
| | Image-side surface 16 | 13.391 | 0.088 | | | |
| Second lens element 2 | Object-side surface 25 | 6.289 | 0.300 | 1.671 | 19.243 | −14.353 |
| | Image-side surface 26 | 3.746 | 0.342 | | | |
| Third lens element 3 | Object-side surface 35 | 8.706 | 0.533 | 1.535 | 55.690 | 18.662 |
| | Image-side surface 36 | 64.808 | 0.391 | | | |
| Fourth lens element 4 | Object-side surface 45 | −19.593 | 0.330 | 1.671 | 19.243 | −59.526 |
| | Image-side surface 46 | −38.362 | 0.068 | | | |
| Fifth lens element 5 | Object-side surface 55 | −37.886 | 0.550 | 1.545 | 55.987 | −78.133 |
| | Image-side surface 56 | −338.907 | 0.210 | | | |
| Sixth lens element 6 | Object-side surface 65 | −3.694 | 0.501 | 1.545 | 55.987 | 7.637 |
| | Image-side surface 66 | −2.053 | 0.059 | | | |
| Seventh lens element 7 | Object-side surface 75 | −12.372 | 0.677 | 1.535 | 55.690 | 29.872 |
| | Image-side surface 76 | −7.119 | 0.048 | | | |

TABLE 17-continued

Ninth embodiment
System length = 8.003 mm, Effective focal length = 6.186 mm, HFOV = 37.979°,
Image height = 5.000 mm, Fno = 1.600

| Device | Surface | Radius of curvature (mm) | Thickness (mm) | Refractive index | Abbe number | Focal length (mm) |
|---|---|---|---|---|---|---|
| Eighth lens element 8 | Object-side surface 85 | 15.912 | 0.549 | 1.661 | 20.373 | −41.486 |
| | Image-side surface 86 | 9.964 | 0.672 | | | |
| Ninth lens element 9 | Object-side surface 95 | −4.735 | 0.595 | 1.545 | 55.987 | −4.656 |
| | Image-side surface 96 | 5.740 | 0.300 | | | |
| Filter 11 | Object-side surface 115 | Infinity | 0.210 | 1.517 | 64.167 | |
| | Image-side surface 116 | Infinity | 0.419 | | | |
| | Image plane 99 | Infinity | | | | |

As shown in TABLE 18, TABLE 18 illustrates various aspheric coefficients of the object-side surface 15 of the first lens element 1 to the image-side surface 96 of the ninth lens element 9 of the ninth embodiment in the above equation (1).

TABLE 18

| Surface | K | $a_4$ | $a_6$ | $a_8$ | $a_{10}$ |
|---|---|---|---|---|---|
| 15 | 2.711414E−01 | 4.297374E−04 | −9.091058E−04 | 5.903904E−04 | −2.047460E−04 |
| 16 | 0.000000E+00 | −1.957989E−03 | −1.557356E−03 | 2.423119E−03 | −1.027928E−03 |
| 25 | 7.987513E+00 | −2.305972E−02 | −4.717063E−03 | 7.306139E−03 | −2.849106E−03 |
| 26 | −3.901487E+00 | −6.215108E−03 | −8.981483E−03 | 1.144683E−02 | −6.450722E−03 |
| 35 | 0.000000E+00 | −3.213542E−03 | −8.808725E−03 | 2.575960E−03 | −1.664639E−03 |
| 36 | 0.000000E+00 | −3.564943E−03 | −1.519857E−02 | 1.012834E−02 | −7.910369E−03 |
| 45 | 0.000000E+00 | −1.556581E−02 | −1.919634E−02 | 3.799265E−03 | −3.602596E−03 |
| 46 | 0.000000E+00 | 6.150541E−03 | −4.333741E−02 | 1.718012E−02 | −3.976857E−04 |
| 55 | 0.000000E+00 | −5.366908E−03 | −3.260974E−02 | 2.967155E−03 | 2.631464E−02 |
| 56 | 0.000000E+00 | −1.578608E−02 | 8.873771E−03 | −4.245478E−02 | 4.582493E−02 |
| 65 | 1.249623E+00 | 2.738197E−02 | 2.996835E−02 | −7.544588E−02 | 6.812517E−02 |
| 66 | −1.047547E+00 | 5.871024E−02 | −7.814569E−03 | −1.753649E−02 | 1.758932E−02 |
| 75 | 0.000000E+00 | 1.691789E−02 | 1.334009E−02 | −1.658063E−02 | 8.519836E−03 |
| 76 | 0.000000E+00 | 7.627692E−05 | 1.341151E−02 | −8.165326E−03 | 2.562878E−03 |
| 85 | 0.000000E+00 | 3.155515E−02 | −3.169303E−02 | 1.111863E−02 | −2.723554E−03 |
| 86 | −2.462805E+01 | 2.416490E−02 | −2.661495E−02 | 9.725531E−03 | −2.421393E−03 |
| 95 | −3.873309E−01 | −1.537183E−02 | −1.407838E−03 | 1.394232E−03 | −2.371135E−04 |
| 96 | −1.886480E+01 | −1.970870E−02 | 2.047738E−03 | 1.357454E−04 | −5.557808E−05 |

| Surface | $a_{12}$ | $a_{14}$ | $a_{16}$ | $a_{18}$ | $a_{20}$ |
|---|---|---|---|---|---|
| 15 | 2.985194E−05 | 1.194979E−06 | −6.947198E−07 | | |
| 16 | 2.149831E−04 | −2.301078E−05 | 1.295053E−06 | | |
| 25 | 4.623634E−04 | −3.489882E−06 | −4.561357E−06 | | |
| 26 | 2.565029E−03 | −6.280060E−04 | 7.686453E−05 | | |
| 35 | 9.521651E−04 | −2.644342E−04 | 3.191901E−05 | | |
| 36 | 3.842394E−03 | −9.275944E−04 | 8.549792E−05 | | |
| 45 | 3.560500E−03 | −1.226681E−03 | 1.421405E−04 | | |
| 46 | −1.600930E−03 | 4.350249E−04 | −3.333089E−05 | | |
| 55 | −2.327960E−02 | 9.533752E−03 | −2.180916E−03 | 2.731364E−04 | −1.464253E−05 |
| 56 | −2.346728E−02 | 6.575896E−03 | −1.025581E−03 | 8.124739E−05 | −2.360290E−06 |
| 65 | −3.306285E−02 | 9.319186E−03 | −1.517799E−03 | 1.315608E−04 | −4.647900E−06 |
| 66 | −8.824791E−03 | 2.584647E−03 | −4.359384E−04 | 3.902488E−05 | −1.434308E−06 |
| 75 | −2.960483E−03 | 6.951558E−04 | −1.032654E−04 | 8.579638E−06 | −2.988852E−07 |
| 76 | −5.952329E−04 | 1.039106E−04 | −1.224403E−05 | 8.333993E−07 | −2.421254E−08 |
| 85 | 4.504647E−04 | −4.713922E−05 | 2.921867E−06 | −9.235726E−08 | 9.392870E−10 |
| 86 | 4.231913E−04 | −4.974069E−05 | 3.688779E−06 | −1.543389E−07 | 2.758706E−09 |
| 95 | 1.684410E−05 | −1.259540E−07 | −5.628649E−08 | 3.287111E−09 | −5.944500E−11 |
| 96 | 5.710917E−06 | −2.740725E−07 | 5.137846E−09 | 4.031100E−11 | −2.038000E−12 |

In addition, a relationship between important parameters in the optical imaging lens 10 of the ninth embodiment is shown in TABLE 25 and TABLE 26.

Figures 23A, 23B, 23C, 23D:
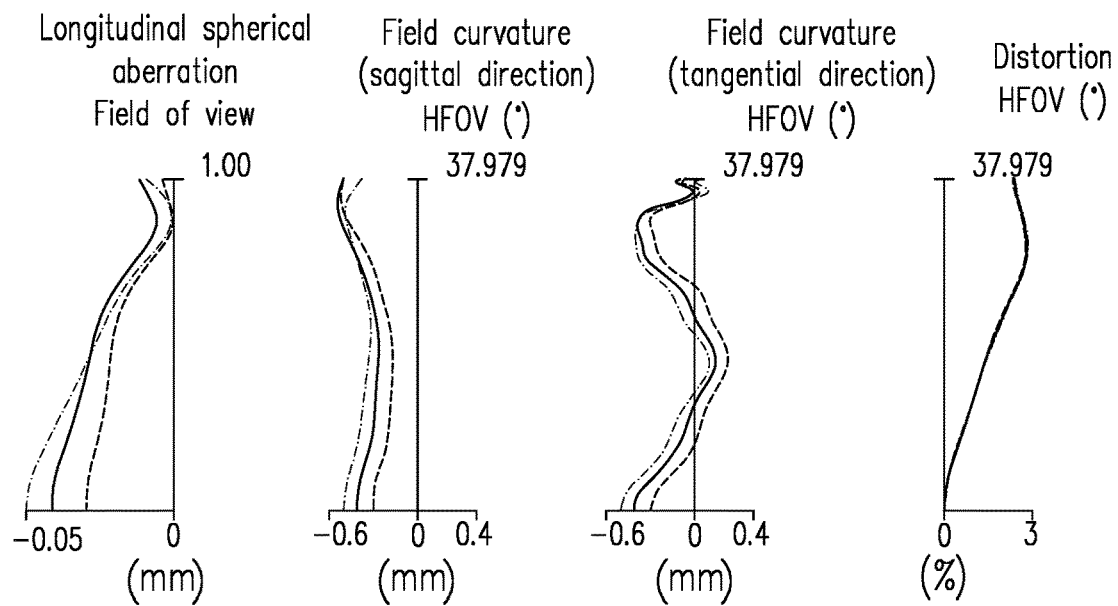
FIG. 23A to FIG. 23D are diagrams of a longitudinal spherical aberration and various optical aberrations of the optical imaging lens of the ninth embodiment.

The longitudinal spherical aberration of the ninth embodiment is as shown in FIG. 23A, and the deviation of the imaging points of the off-axis rays of different heights is controlled within a range of ±0.06 mm. In the two field curvature aberration diagrams of FIG. 23B and FIG. 23C, a focal length variation of the three representative wavelengths within the entire field of view range falls within ±0.06 mm. The distortion aberration diagram in FIG. 23D shows that the distortion aberration of the embodiment is maintained within a range of ±3%.

From the above description, it is known that the system length of the ninth embodiment is shorter than the system length of the first embodiment, and the HFOV of the ninth embodiment is larger than that of the first embodiment. Therefore, compared to the first embodiment, the ninth embodiment has a smaller volume and a larger angle range for receiving images. In addition, the field curvature aberration of the ninth embodiment is smaller than that of the first embodiment, and the distortion aberration of the ninth embodiment is smaller than that of the first embodiment.

Figure 24:
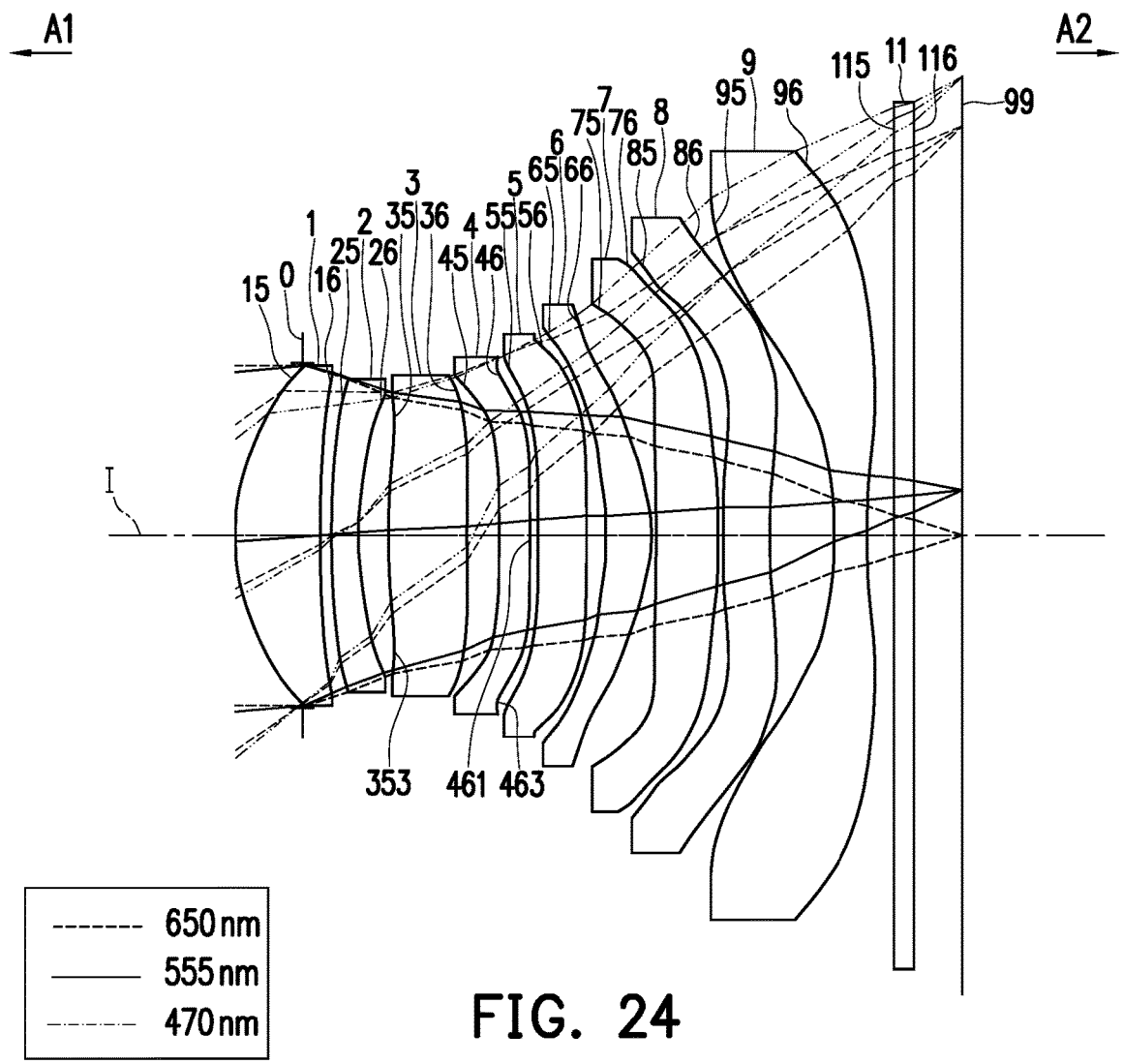
FIG. 24 is a schematic diagram of an optical imaging lens according to a tenth embodiment of the disclosure.

FIG. 24 is a schematic diagram of an optical imaging lens according to a tenth embodiment of the disclosure. FIG. 25A to FIG. 25D are diagrams of a longitudinal spherical aberration and various optical aberrations of the optical imaging lens of the tenth embodiment. Referring to FIG. 24 first, the tenth embodiment of the optical imaging lens 10 of the disclosure is substantially similar to the first embodiment, and differences there between are as follows: optical data, aspheric coefficients, and parameters between the lenses 1, 2, 3, 4, 5, 6, 7, 8, and 9 are more or less different. In addition, in the embodiment, the periphery region 353 of the object-side surface 35 of the third lens element 3 is concave, the optical axis region 461 of the image-side surface 46 of the fourth lens element 4 is convex, the periphery region 463 of the image-side surface 46 of the fourth lens element 4 is concave, the fifth lens element 5 has negative refracting power, and the eighth lens element 8 has negative refracting power. It should be noted that in order to clearly show the figure, reference numerals of the optical axis regions and the periphery regions with surface shapes similar to that of the first embodiment are omitted in FIG. 24.

The detailed optical data of the optical imaging lens 10 of the tenth embodiment is shown in TABLE 19, and the effective focal length of the optical imaging lens 10 of the tenth embodiment is 5.975 mm, the HFOV is 38.021 degrees, the system length is 7.924 mm, the Fno is 1.600, and the image height is 5.000 mm.

TABLE 19

Tenth embodiment
System length = 7.924 mm, Effective focal length = 5.975 mm, HFOV = 38.021°, Image height = 5.000 mm, Fno = 1.600

| Device | Surface | Radius of curvature (mm) | Thickness (mm) | Refractive index | Abbe number | Focal length (mm) |
|---|---|---|---|---|---|---|
| Object | | Infinity | Infinity | | | |
| Aperture 0 | | Infinity | −0.739 | | | |
| First lens element 1 | Object-side surface 15 | 2.707 | 0.935 | 1.545 | 55.987 | 5.990 |
| | Image-side surface 16 | 13.763 | 0.116 | | | |
| Second lens element 2 | Object-side surface 25 | 6.161 | 0.300 | 1.671 | 19.243 | −14.249 |
| | Image-side surface 26 | 3.687 | 0.331 | | | |
| Third lens element 3 | Object-side surface 35 | 8.927 | 0.849 | 1.535 | 55.690 | 18.336 |
| | Image-side surface 36 | 92.273 | 0.353 | | | |
| Fourth lens element 4 | Object-side surface 45 | −18.928 | 0.336 | 1.671 | 19.243 | −58.929 |
| | Image-side surface 46 | −36.247 | 0.084 | | | |
| Fifth lens element 5 | Object-side surface 55 | −31.566 | 0.533 | 1.535 | 55.690 | −83.426 |
| | Image-side surface 56 | −107.444 | 0.208 | | | |
| Sixth lens element 6 | Object-side surface 65 | −3.716 | 0.485 | 1.545 | 55.987 | 7.500 |
| | Image-side surface 66 | −2.038 | 0.061 | | | |
| Seventh lens element 7 | Object-side surface 75 | −12.636 | 0.677 | 1.545 | 55.987 | 27.429 |
| | Image-side surface 76 | −6.985 | 0.050 | | | |
| Eighth lens element 8 | Object-side surface 85 | 15.126 | 0.513 | 1.661 | 20.373 | −66.060 |
| | Image-side surface 86 | 11.108 | 0.695 | | | |
| Ninth lens element 9 | Object-side surface 95 | −4.714 | 0.360 | 1.545 | 55.987 | −4.899 |
| | Image-side surface 96 | 6.359 | 0.300 | | | |

TABLE 19-continued

Tenth embodiment
System length = 7.924 mm, Effective focal length = 5.975 mm, HFOV = 38.021°,
Image height = 5.000 mm, Fno = 1.600

| Device | Surface | Radius of curvature (mm) | Thickness (mm) | Refractive index | Abbe number | Focal length (mm) |
|---|---|---|---|---|---|---|
| Filter 11 | Object-side surface 115 | Infinity | 0.210 | 1.517 | 64.167 | |
| | Image-side surface 116 | Infinity | 0.529 | | | |
| | Image plane 99 | Infinity | | | | |

As shown in TABLE 20, TABLE 20 illustrates various aspheric coefficients of the object-side surface 15 of the first lens element 1 to the image-side surface 86 of the ninth lens 9 of the tenth embodiment in the above equation (1).

TABLE 20

| Surface | K | $a_4$ | $a_6$ | $a_8$ | $a_{10}$ |
|---|---|---|---|---|---|
| 15 | 2.835566E−01 | −2.161256E−04 | −7.700656E−04 | 6.057957E−04 | −2.039943E−04 |
| 16 | 0.000000E+00 | −2.076767E−03 | −1.515267E−03 | 2.446587E−03 | −1.021483E−03 |
| 25 | 7.966702E+00 | −2.266927E−02 | −4.637814E−03 | 7.304035E−03 | −2.843843E−03 |
| 26 | −3.871064E+00 | −6.519939E−03 | −9.213158E−03 | 1.138407E−02 | −6.459581E−03 |
| 35 | 0.000000E+00 | −3.786252E−03 | −8.658885E−03 | 2.621072E−03 | −1.658794E−03 |
| 36 | 0.000000E+00 | −2.477702E−03 | −1.511199E−02 | 1.013558E−02 | −7.912274E−03 |
| 45 | 0.000000E+00 | −1.585907E−02 | −1.930125E−02 | 3.790855E−03 | −3.600364E−03 |
| 46 | 0.000000E+00 | 6.129113E−03 | −4.331888E−02 | 1.718238E−02 | −3.983769E−04 |
| 55 | 0.000000E+00 | −5.438148E−03 | −3.263071E−02 | 2.963418E−03 | 2.631400E−02 |
| 56 | 0.000000E+00 | −1.576522E−02 | 8.869043E−03 | −4.245735E−02 | 4.582418E−02 |
| 65 | 1.248587E+00 | 2.747823E−02 | 2.991095E−02 | −7.547821E−02 | 6.812551E−02 |
| 66 | −1.034206E+00 | 5.878680E−02 | −7.789955E−03 | −1.753382E−02 | 1.758953E−02 |
| 75 | 0.000000E+00 | 1.696779E−02 | 1.334640E−02 | −1.658086E−02 | 8.519703E−03 |
| 76 | 0.000000E+00 | 7.121619E−05 | 1.340602E−02 | −8.164320E−03 | 2.563050E−03 |
| 85 | 0.000000E+00 | 3.136330E−02 | −3.167843E−02 | 1.111941E−02 | −2.723517E−03 |
| 86 | −4.911228E+00 | 2.410228E−02 | −2.662027E−02 | 9.725468E−03 | −2.421381E−03 |
| 95 | −3.681063E−01 | −1.541487E−02 | −1.409686E−03 | 1.394189E−03 | −2.371102E−04 |
| 96 | −1.117855E+01 | −2.028833E−02 | 2.015213E−03 | 1.364649E−04 | −5.551658E−05 |

| Surface | $a_{12}$ | $a_{14}$ | $a_{16}$ | $a_{18}$ | $a_{20}$ |
|---|---|---|---|---|---|
| 15 | 2.960017E−05 | 1.078102E−06 | −7.419101E−07 | | |
| 16 | 2.159894E−04 | −2.311214E−05 | 1.182640E−06 | | |
| 25 | 4.652893E−04 | −2.526907E−06 | −4.533061E−06 | | |
| 26 | 2.566483E−03 | −6.260256E−04 | 7.806515E−05 | | |
| 35 | 9.510391E−04 | −2.661522E−04 | 3.103809E−05 | | |
| 36 | 3.840865E−03 | −9.282547E−04 | 8.524408E−05 | | |
| 45 | 3.562228E−03 | −1.226085E−03 | 1.423525E−04 | | |
| 46 | −1.601015E−03 | 4.349979E−04 | −3.333784E−05 | | |
| 55 | −2.327973E−02 | 9.533717E−03 | −2.180927E−03 | 2.731332E−04 | −1.464354E−05 |
| 56 | −2.346743E−02 | 6.575870E−03 | −1.025584E−03 | 8.124680E−05 | −2.360384E−06 |
| 65 | −3.306276E−02 | 9.319205E−03 | −1.517796E−03 | 1.315612E−04 | −4.647823E−06 |
| 66 | −8.824787E−03 | 2.584646E−03 | −4.359384E−04 | 3.902486E−05 | −1.434306E−06 |
| 75 | −2.960503E−03 | 6.951530E−04 | −1.032658E−04 | 8.579594E−06 | −2.988894E−07 |
| 76 | −5.952220E−04 | 1.039125E−04 | −1.224401E−05 | 8.334039E−07 | −2.421218E−08 |
| 85 | 4.504666E−04 | −4.713909E−05 | 2.921879E−06 | −9.235614E−08 | 9.394110E−10 |
| 86 | 4.231913E−04 | −4.974077E−05 | 3.688781E−06 | −1.543391E−07 | 2.758703E−09 |
| 95 | 1.684029E−05 | −1.260080E−07 | −5.628799E−08 | 3.286975E−09 | −5.945300E−11 |
| 96 | 5.713578E−06 | −2.740012E−07 | 5.131991E−09 | 4.000900E−11 | −2.050000E−12 |

In addition, a relationship between important parameters in the optical imaging lens 10 of the tenth embodiment is shown in TABLE 25 and TABLE 26.

Figures 25A, 25B, 25C, 25D:
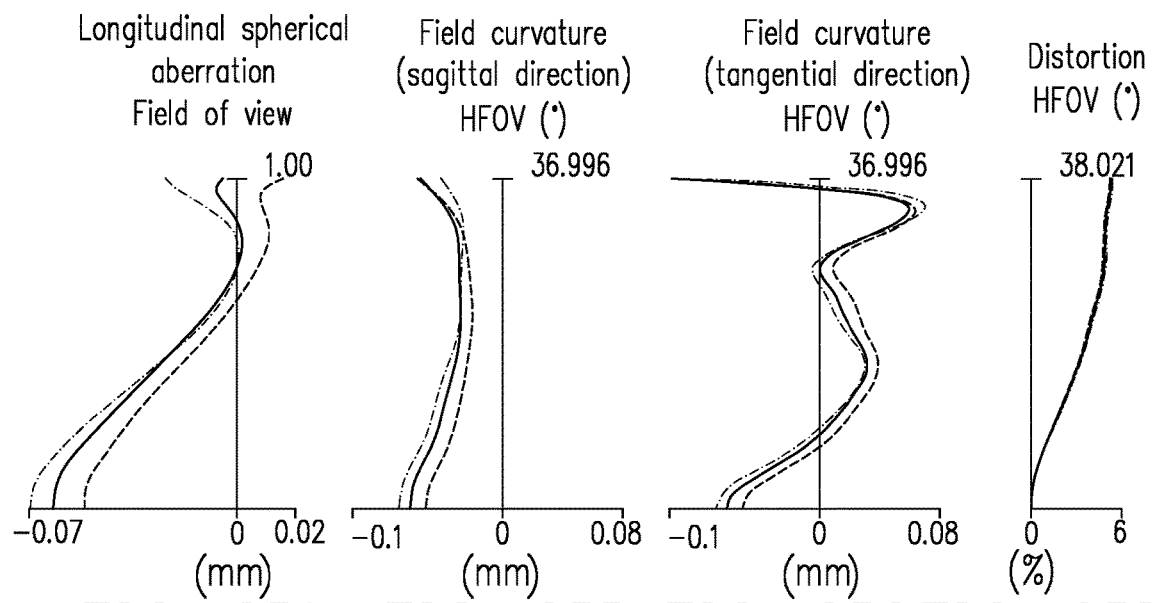
FIG. 25A to FIG. 25D are diagrams of a longitudinal spherical aberration and various optical aberrations of the optical imaging lens of the tenth embodiment.

The longitudinal spherical aberration of the tenth embodiment is as shown in FIG. 25A, and the deviation of the imaging points of the off-axis rays of different heights is controlled within a range of ±0.07 mm. In the two field curvature aberration diagrams of FIG. 25B and FIG. 25C, a focal length variation of the three representative wavelengths within the entire field of view range falls within ±0.10 mm. The distortion aberration diagram in FIG. 25D shows that the distortion aberration of the embodiment is maintained within a range of ±6%.

From the above description, it is known that the system length of the tenth embodiment is shorter than the system length of the first embodiment, and the HFOV of the tenth embodiment is larger than that of the first embodiment. Therefore, compared to the first embodiment, the tenth embodiment has a smaller volume and a larger angle range for receiving images. In addition, the field curvature aberration of the tenth embodiment is smaller than that of the first embodiment, and the distortion aberration of the tenth embodiment is smaller than that of the first embodiment.

Figure 26:
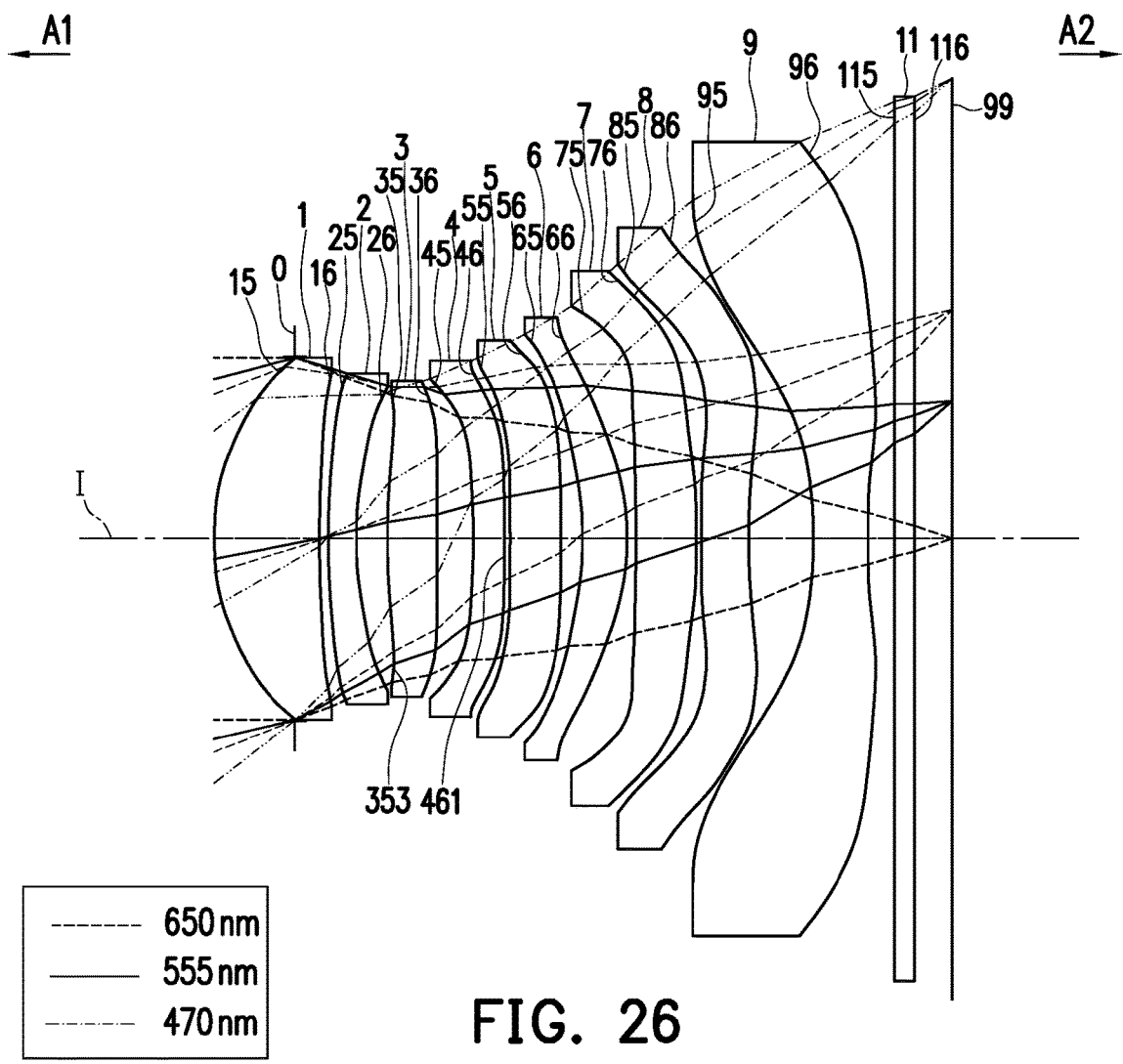
FIG. 26 is a schematic diagram of an optical imaging lens according to an eleventh embodiment of the disclosure.

FIG. 26 is a schematic diagram of an optical imaging lens according to an eleventh embodiment of the disclosure. FIG. 27A to FIG. 27D are diagrams of a longitudinal spherical aberration and various optical aberrations of the optical imaging lens of the eleventh Referring to FIG. 26 first, the eleventh embodiment of the optical imaging lens embodiment. 10 of the disclosure is substantially similar to the first embodiment, and differences there between are as follows: optical data, aspheric coefficients, and parameters between the lenses 1, 2, 3, 4, 5, 6, 7, 8, and 9 are more or less different. In addition, in the embodiment, the periphery region 353 of the object-side surface 35 of the third lens element 3 is concave, the optical axis region 461 of the image-side surface 46 of the fourth lens element 4 is convex, the fifth lens element 5 has negative refracting power, and the eighth lens element 8 has negative refracting power. It should be noted that in order to clearly show the figure, reference numerals of the optical axis regions and the periphery regions with surface shapes similar to that of the first embodiment are omitted in FIG. 26.

The detailed optical data of the optical imaging lens 10 of the eleventh embodiment is shown in TABLE 21, and the effective focal length of the optical imaging lens 10 of the eleventh embodiment is 6.289 mm, the HFOV is 37.519 degrees, the system length is 7.995 mm, the Fno is 1.600, and the image height is 5.000 mm.

TABLE 21

Eleventh embodiment
System length = 7.995 mm, Effective focal length = 6.289 mm, HFOV = 37.519°,
Image height = 5.000 mm, Fno = 1.600

| Device | Surface | Radius of curvature (mm) | Thickness (mm) | Refractive index | Abbe number | Focal length (mm) |
|---|---|---|---|---|---|---|
| Object | | Infinity | Infinity | | | |
| Aperture 0 | | Infinity | −0.892 | | | |
| First lens element 1 | Object-side surface 15 | 2.704 | 1.149 | 1.545 | 55.987 | 5.977 |
| | Image-side surface 16 | 13.381 | 0.095 | | | |
| Second lens element 2 | Object-side surface 25 | 6.252 | 0.300 | 1.671 | 19.243 | −14.577 |
| | Image-side surface 26 | 3.754 | 0.342 | | | |
| Third lens element 3 | Object-side surface 35 | 8.653 | 0.531 | 1.535 | 55.690 | 18.713 |
| | Image-side surface 36 | 60.879 | 0.391 | | | |
| Fourth lens element 4 | Object-side surface 45 | −19.308 | 0.330 | 1.671 | 19.243 | −57.978 |
| | Image-side surface 46 | −38.233 | 0.068 | | | |
| Fifth lens element 5 | Object-side surface 55 | −35.989 | 0.544 | 1.545 | 55.987 | −78.970 |
| | Image-side surface 56 | −218.285 | 0.237 | | | |
| Sixth lens element 6 | Object-side surface 65 | −3.687 | 0.489 | 1.545 | 55.987 | 7.737 |
| | Image-side surface 66 | −2.061 | 0.090 | | | |
| Seventh lens element 7 | Object-side surface 75 | −11.558 | 0.648 | 1.661 | 20.373 | 27.607 |
| | Image-side surface 76 | −7.261 | 0.051 | | | |
| Eighth lens element 8 | Object-side surface 85 | 17.231 | 0.517 | 1.661 | 20.373 | −36.621 |
| | Image-side surface 86 | 9.983 | 0.689 | | | |
| Ninth lens element 9 | Object-side surface 95 | −4.730 | 0.595 | 1.545 | 55.987 | −4.632 |
| | Image-side surface 96 | 5.683 | 0.300 | | | |
| Filter 11 | Object-side surface 115 | Infinity | 0.210 | 1.517 | 64.167 | |
| | Image-side surface 116 | Infinity | 0.419 | | | |
| Image plane 99 | | Infinity | | | | |

As shown in TABLE 22, TABLE 22 illustrates various aspheric coefficients of the object-side surface 15 of the first lens element 1 to the image-side surface 96 of the eleventh lens 9 of the eleventh embodiment in the above equation (1).

TABLE 22

| Surface | K | $a_4$ | $a_6$ | $a_8$ | $a_{10}$ |
|---|---|---|---|---|---|
| 15 | 2.685744E−01 | 4.067934E−04 | −8.985155E−04 | 5.914898E−04 | −2.042480E−04 |
| 16 | 0.000000E+00 | −1.896283E−03 | −1.553893E−03 | 2.425095E−03 | −1.027137E−03 |
| 25 | 7.984999E+00 | −2.301215E−02 | −4.708423E−03 | 7.305554E−03 | −2.849298E−03 |
| 26 | −3.905622E+00 | −6.241792E−03 | −8.985978E−03 | 1.144643E−02 | −6.450400E−03 |
| 35 | 0.000000E+00 | −3.169869E−03 | −8.804689E−03 | 2.575467E−03 | −1.664874E−03 |
| 36 | 0.000000E+00 | −3.822171E−03 | −1.519571E−02 | 1.013063E−02 | −7.909663E−03 |
| 45 | 0.000000E+00 | −1.583284E−03 | −1.920213E−02 | 3.800847E−03 | −3.602383E−03 |
| 46 | 0.000000E+00 | 6.073151E−03 | −4.335284E−02 | 1.717749E−02 | −3.981425E−04 |
| 55 | 0.000000E+00 | −5.327819E−03 | −3.260064E−02 | 2.968293E−03 | 2.631478E−02 |
| 56 | 0.000000E+00 | −1.558267E−02 | 8.874768E−03 | −4.245589E−02 | 4.582491E−02 |
| 65 | 1.254062E+00 | 2.733514E−02 | 3.025181E−02 | −7.545147E−02 | 6.812298E−02 |
| 66 | −1.081022E+00 | 5.936512E−02 | −7.877973E−03 | −1.753878E−02 | 1.758930E−02 |
| 75 | 0.000000E+00 | 1.694593E−02 | 1.335078E−02 | −1.658226E−02 | 8.519760E−03 |
| 76 | 0.000000E+00 | −3.854579E−05 | 1.337809E−02 | −8.164092E−03 | 2.562811E−03 |
| 85 | 0.000000E+00 | 3.179983E−02 | −3.164855E−02 | 1.111851E−02 | −2.723563E−03 |
| 86 | −1.204334E+01 | 2.395327E−02 | −2.663379E−02 | 9.726298E−03 | −2.421352E−03 |
| 95 | −3.848251E−01 | −1.538044E−02 | −1.408240E−03 | 1.394235E−03 | −2.371162E−04 |
| 96 | −1.922435E+01 | −1.966403E−02 | 2.048844E−03 | 1.358034E−04 | −5.557529E−05 |

| Surface | $a_{12}$ | $a_{14}$ | $a_{16}$ | $a_{18}$ | $a_{20}$ |
|---|---|---|---|---|---|
| 15 | 2.980494E−05 | 1.186605E−06 | −6.986336E−07 | | |
| 16 | 2.150906E−04 | −2.302020E−05 | 1.269224E−06 | | |
| 25 | 4.623033E−04 | −3.532754E−06 | −4.563865E−06 | | |
| 26 | 2.565318E−03 | −6.278718E−04 | 7.692692E−05 | | |
| 35 | 9.519249E−04 | −2.645694E−04 | 3.187216E−05 | | |
| 36 | 3.842631E−03 | −9.275279E−04 | 8.551478E−05 | | |
| 45 | 3.560547E−03 | −1.226680E−03 | 1.421376E−04 | | |
| 46 | −1.601009E−03 | 4.350109E−04 | −3.333342E−05 | | |
| 55 | −2.327960E−02 | 9.533745E−03 | −2.180919E−03 | 2.731356E−04 | −1.464279E−05 |
| 56 | −2.346725E−02 | 6.575907E−03 | −1.025578E−03 | 8.124806E−05 | −2.360142E−06 |
| 65 | −3.306290E−02 | 9.319178E−03 | −1.517800E−03 | 1.315605E−04 | −4.647944E−06 |
| 66 | −8.824778E−03 | 2.584650E−03 | −4.359378E−04 | 3.902497E−05 | −1.434294E−06 |
| 75 | −2.960503E−03 | 6.951532E−04 | −1.032658E−04 | 8.579597E−06 | −2.988894E−07 |
| 76 | −5.953103E−04 | 1.039155E−04 | −1.224379E−05 | 8.334190E−07 | −2.421098E−08 |
| 85 | 4.504634E−04 | −4.713933E−05 | 2.921857E−06 | −9.235802E−08 | 9.392210E−10 |
| 86 | 4.231928E−04 | −4.974062E−05 | 3.688783E−06 | −1.543387E−07 | 2.758721E−09 |
| 95 | 1.684338E−05 | −1.260605E−07 | −5.628493E−08 | 3.287139E−09 | −5.944500E−11 |
| 96 | 5.711083E−06 | −2.740730E−07 | 5.138003E−09 | 4.028700E−11 | −2.045000E−12 |

In addition, a relationship between important parameters in the optical imaging lens 10 of the eleventh embodiment is shown in TABLE 25 and TABLE 26.

Figures 27A, 27B, 27C, 27D:
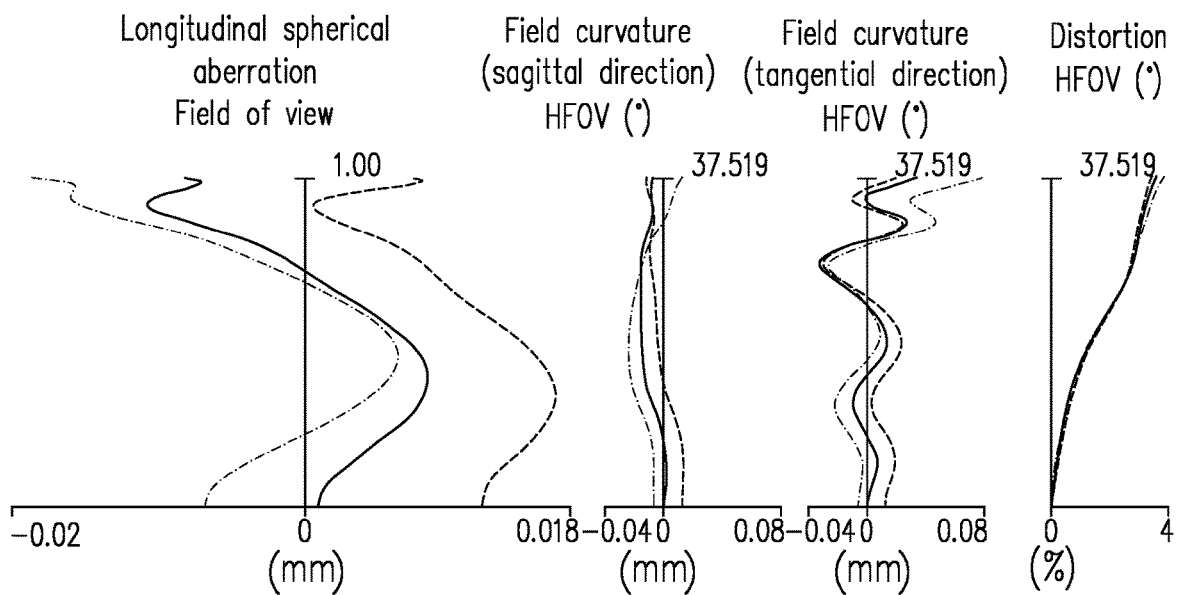
FIG. 27A to FIG. 27D are diagrams of a longitudinal spherical aberration and various optical aberrations of the optical imaging lens of the eleventh embodiment.

The longitudinal spherical aberration of the eleventh embodiment is as shown in FIG. 27A, and the deviation of the imaging points of the off-axis rays of different heights is controlled within a range of ±0.02 mm. In the two field curvature aberration diagrams of FIG. 27B and FIG. 27C, a focal length variation of the three representative wavelengths within the entire field of view range falls within ±0.08 mm. The distortion aberration diagram in FIG. 27D shows that the distortion aberration of the embodiment is maintained within a range of ±4%.

From the above description, it is known that the system length of the eleventh embodiment is shorter than the system length of the first embodiment, and the HFOV of the eleventh embodiment is larger than that of the first embodiment. Therefore, compared to the first embodiment, the eleventh embodiment has a smaller volume and a larger angle range for receiving images. In addition, the longitudinal spherical aberration of the eleventh embodiment is smaller than that of the first embodiment, the field curvature aberration of the eleventh embodiment is smaller than that of the first embodiment, and the distortion aberration of the eleventh embodiment is smaller than that of the first embodiment.

Referring to TABLE 23 to TABLE 26, TABLE 23 to TABLE 26 are table diagrams of various optical parameters of the aforementioned first embodiment to the eleventh embodiment. When the optical imaging lens 10 meets the requirements that the second lens element 2 has negative refracting power and the fourth lens element 4 has negative refracting power in collaboration with one of the following (a) and (b) combinations, it may all achieve the effects of correcting the spherical aberration and optical aberration and reducing distortion of the optical system while designing the optical imaging lens 10 with a large image height and a small Fno.

Where, (a) the optical axis region 751 of the object-side surface 75 of the seventh lens element 7 is concave and the optical axis region 961 of the image-side surface 96 of the ninth lens element 9 is concave; or (b) the periphery region 553 of the object-side surface 55 of the fifth lens element 5 is concave and the optical axis region 761 of the image-side surface 76 of the seventh lens element 7 is convex.

TABLE 23

| Condition | First embodiment | Second embodiment | Third embodiment | Fourth embodiment | Fifth embodiment | Sixth embodiment |
|---|---|---|---|---|---|---|
| T1 | 0.951 | 1.143 | 1.167 | 1.164 | 1.166 | 1.167 |
| G12 | 0.143 | 0.089 | 0.076 | 0.098 | 0.100 | 0.095 |
| T2 | 0.439 | 0.299 | 0.300 | 0.300 | 0.302 | 0.300 |
| G23 | 0.267 | 0.343 | 0.328 | 0.340 | 0.329 | 0.330 |
| T3 | 0.644 | 0.437 | 0.481 | 0.527 | 0.481 | 0.475 |
| G34 | 0.340 | 0.331 | 0.258 | 0.295 | 0.296 | 0.291 |
| T4 | 0.395 | 0.348 | 0.330 | 0.278 | 0.328 | 0.328 |
| G45 | 0.143 | 0.065 | 0.061 | 0.058 | 0.060 | 0.060 |
| T5 | 0.751 | 0.590 | 0.606 | 0.629 | 0.573 | 0.603 |
| G56 | 0.188 | 0.256 | 0.188 | 0.227 | 0.260 | 0.212 |
| T6 | 0.571 | 0.451 | 0.454 | 0.447 | 0.411 | 0.456 |
| G67 | 0.061 | 0.062 | 0.061 | 0.065 | 0.067 | 0.061 |
| T7 | 0.551 | 0.462 | 0.432 | 0.456 | 0.462 | 0.450 |
| G78 | 0.047 | 0.069 | 0.047 | 0.047 | 0.046 | 0.054 |
| T8 | 0.588 | 0.620 | 0.661 | 0.654 | 0.661 | 0.656 |
| G89 | 0.511 | 1.169 | 0.925 | 0.958 | 0.962 | 0.951 |
| T9 | 0.431 | 0.359 | 0.635 | 0.593 | 0.631 | 0.639 |
| G9F | 0.400 | 0.400 | 0.400 | 0.400 | 0.400 | 0.400 |
| TF | 0.210 | 0.210 | 0.210 | 0.210 | 0.210 | 0.210 |
| GFP | 0.489 | 0.308 | 0.419 | 0.305 | 0.310 | 0.314 |
| BFL | 1.099 | 0.918 | 1.029 | 0.915 | 0.920 | 0.924 |
| EFL | 6.251 | 6.438 | 6.276 | 6.423 | 6.436 | 6.250 |
| TTL | 8.122 | 8.012 | 8.039 | 8.051 | 8.054 | 8.050 |
| TL | 7.023 | 7.094 | 7.010 | 7.137 | 7.134 | 7.126 |
| ALT | 5.321 | 4.709 | 5.066 | 5.050 | 5.015 | 5.072 |
| AAG | 1.702 | 2.384 | 1.944 | 2.087 | 2.119 | 2.053 |
| V1 | 55.987 | 55.987 | 55.987 | 55.987 | 55.987 | 55.987 |
| V2 | 19.243 | 19.243 | 19.243 | 19.243 | 19.243 | 19.243 |
| V3 | 55.690 | 55.690 | 55.690 | 55.690 | 55.690 | 55.690 |
| V4 | 19.243 | 19.243 | 19.243 | 19.243 | 19.243 | 19.243 |
| V5 | 55.987 | 55.987 | 55.987 | 55.987 | 55.987 | 55.987 |
| V6 | 55.690 | 55.690 | 55.690 | 55.690 | 55.690 | 55.690 |
| V7 | 26.904 | 26.904 | 26.904 | 26.904 | 26.904 | 22.409 |
| V8 | 55.987 | 55.987 | 55.987 | 55.987 | 55.987 | 55.987 |
| V9 | 55.987 | 55.987 | 55.987 | 55.987 | 55.987 | 55.987 |

TABLE 24

| Condition | First embodiment | Second embodiment | Third embodiment | Fourth embodiment | Fifth embodiment | Sixth embodiment |
|---|---|---|---|---|---|---|
| ALT/(T1 + G89) | 3.640 | 2.036 | 2.421 | 2.379 | 2.357 | 2.395 |
| AAG/(T8 + T9) | 1.670 | 2.435 | 1.500 | 1.673 | 1.641 | 1.585 |
| (G12 + G23 + G34)/T2 | 1.709 | 2.552 | 2.207 | 2.442 | 2.400 | 2.386 |
| BFL/(G12 + G34) | 2.273 | 2.181 | 3.085 | 2.329 | 2.327 | 2.397 |
| (T3 + T5)/T4 | 3.535 | 2.949 | 3.296 | 4.163 | 3.218 | 3.286 |
| (T6 + T7)/G23 | 4.197 | 2.661 | 2.706 | 2.657 | 2.652 | 2.744 |
| V4 + V5 + V6 | 130.920 | 130.920 | 130.920 | 130.920 | 130.920 | 130.920 |
| V2 + V7 + V8 | 102.134 | 102.134 | 102.134 | 102.134 | 102.134 | 97.639 |
| (T1 + T8)/(G45 + T5 + G56) | 1.421 | 1.937 | 2.138 | 1.991 | 2.045 | 2.086 |
| TL/(G78 + T8 + G89 + T9) | 4.451 | 3.199 | 3.090 | 3.168 | 3.102 | 3.097 |
| EFL/(T5 + T6 + G67) | 4.520 | 5.841 | 5.598 | 5.630 | 6.121 | 5.584 |
| V2 + V4 + V7 | 65.390 | 65.390 | 65.390 | 65.390 | 65.390 | 60.895 |
| V7 + V8 − V9 | 26.904 | 26.904 | 26.904 | 26.904 | 26.904 | 22.409 |
| TTL/(T1 + G89 + T9) | 4.290 | 2.998 | 2.948 | 2.965 | 2.919 | 2.919 |
| (T5 + T6)/(G56 + G67) | 5.299 | 3.277 | 4.251 | 3.692 | 3.016 | 3.880 |
| T1/(T3 + G45) | 1.208 | 2.277 | 2.153 | 1.989 | 2.154 | 2.184 |
| (T5 + T8)/T2 | 3.050 | 4.041 | 4.231 | 4.277 | 4.088 | 4.197 |
| T1/(G23 + G34 + G45) | 1.266 | 1.546 | 1.806 | 1.681 | 1.702 | 1.715 |
| AAG/(T5 + T6) | 1.287 | 2.292 | 1.834 | 1.940 | 2.152 | 1.940 |
| (T3 + G34 + T4)/T6 | 2.415 | 2.476 | 2.353 | 2.461 | 2.686 | 2.399 |

TABLE 25

| Condition | Seventh embodiment | Eighth embodiment | Ninth embodiment | Tenth embodiment | Eleventh embodiment |
|---|---|---|---|---|---|
| T1 | 1.163 | 1.003 | 1.162 | 0.935 | 1.149 |
| G12 | 0.095 | 0.116 | 0.088 | 0.116 | 0.095 |
| T2 | 0.300 | 0.300 | 0.300 | 0.300 | 0.300 |
| G23 | 0.328 | 0.341 | 0.342 | 0.331 | 0.342 |
| T3 | 0.460 | 0.833 | 0.533 | 0.849 | 0.531 |
| G34 | 0.292 | 0.371 | 0.391 | 0.353 | 0.391 |
| T4 | 0.334 | 0.328 | 0.330 | 0.336 | 0.330 |
| G45 | 0.061 | 0.074 | 0.068 | 0.084 | 0.068 |
| T5 | 0.597 | 0.543 | 0.550 | 0.533 | 0.544 |
| G56 | 0.200 | 0.205 | 0.210 | 0.208 | 0.237 |
| T6 | 0.438 | 0.494 | 0.501 | 0.485 | 0.489 |
| G67 | 0.061 | 0.061 | 0.059 | 0.061 | 0.090 |
| T7 | 0.439 | 0.677 | 0.677 | 0.677 | 0.648 |
| G78 | 0.062 | 0.048 | 0.048 | 0.050 | 0.051 |
| T8 | 0.664 | 0.520 | 0.549 | 0.513 | 0.517 |
| G89 | 0.949 | 0.689 | 0.672 | 0.695 | 0.689 |
| T9 | 0.633 | 0.485 | 0.595 | 0.360 | 0.595 |
| G9F | 0.400 | 0.300 | 0.300 | 0.300 | 0.300 |
| TF | 0.210 | 0.210 | 0.210 | 0.210 | 0.210 |
| GFP | 0.312 | 0.437 | 0.419 | 0.529 | 0.419 |
| BFL | 0.922 | 0.947 | 0.929 | 1.039 | 0.929 |
| EFL | 6.396 | 6.122 | 6.186 | 5.975 | 6.289 |

TABLE 25-continued

| Condition | Seventh embodiment | Eighth embodiment | Ninth embodiment | Tenth embodiment | Eleventh embodiment |
|---|---|---|---|---|---|
| TTL | 7.998 | 8.033 | 8.003 | 7.924 | 7.995 |
| TL | 7.075 | 7.087 | 7.074 | 6.885 | 7.066 |
| ALT | 5.028 | 5.182 | 5.196 | 4.987 | 5.104 |
| AAG | 2.048 | 1.904 | 1.878 | 1.899 | 1.962 |
| V1 | 55.987 | 55.987 | 55.987 | 55.987 | 55.987 |
| V2 | 19.243 | 19.243 | 19.243 | 19.243 | 19.243 |
| V3 | 55.690 | 55.690 | 55.690 | 55.690 | 55.690 |
| V4 | 19.243 | 19.243 | 19.243 | 19.243 | 19.243 |
| V5 | 55.987 | 55.987 | 55.987 | 55.690 | 55.987 |
| V6 | 55.987 | 55.987 | 55.987 | 55.987 | 55.987 |
| V7 | 26.904 | 55.987 | 55.690 | 55.987 | 20.373 |
| V8 | 55.987 | 20.373 | 20.373 | 20.373 | 20.373 |
| V9 | 55.987 | 55.987 | 55.987 | 55.987 | 55.987 |

TABLE 26

| Condition | Seventh embodiment | Eighth embodiment | Ninth embodiment | Tenth embodiment | Eleventh embodiment |
|---|---|---|---|---|---|
| ALT/(T1 + G89) | 2.380 | 3.063 | 2.834 | 3.060 | 2.778 |
| AAG/(T8 + T9) | 1.578 | 1.895 | 1.641 | 2.176 | 1.764 |
| (G12 + G23 + G34)/T2 | 2.383 | 2.760 | 2.740 | 2.668 | 2.758 |
| BFL/(G12 + G34) | 2.383 | 1.945 | 1.940 | 2.214 | 1.912 |
| (T3 + T5)/T4 | 3.167 | 4.197 | 3.284 | 4.112 | 3.264 |
| (T6 + T7)/G23 | 2.675 | 3.436 | 3.442 | 3.508 | 3.329 |
| V4 + V5 + V6 | 131.217 | 131.217 | 131.217 | 130.920 | 131.217 |
| V2 + V7 + V8 | 102.134 | 95.603 | 95.306 | 95.603 | 59.989 |
| (T1 + T8)/(G45 + T5 + G56) | 2.131 | 1.852 | 2.066 | 1.754 | 1.961 |
| TL/(G78 + T8 + G89 + T9) | 3.065 | 4.068 | 3.796 | 4.256 | 3.817 |
| EFL/(T5 + T6 + G67) | 5.839 | 5.575 | 5.573 | 5.538 | 5.593 |
| V2 + V4 + V7 | 65.390 | 94.473 | 94.176 | 94.473 | 58.859 |
| V7 + V8 − V9 | 26.904 | 20.373 | 20.076 | 20.373 | −15.241 |
| TTL/(T1 + G89 + T9) | 2.913 | 3.690 | 3.296 | 3.982 | 3.287 |
| (T5 + T6)/(G56 + G67) | 3.968 | 3.901 | 3.905 | 3.789 | 3.160 |
| T1/(T3 + G45) | 2.233 | 1.106 | 1.932 | 1.002 | 1.916 |
| (T5 + T8)/T2 | 4.204 | 3.545 | 3.668 | 3.485 | 3.539 |
| T1/(G23 + G34 + G45) | 1.708 | 1.276 | 1.449 | 1.215 | 1.434 |
| AAG/(T5 + T6) | 1.979 | 1.836 | 1.787 | 1.865 | 1.898 |
| (T3 + G34 + T4)/T6 | 2.481 | 3.097 | 2.506 | 3.172 | 2.559 |

The embodiment of the disclosure may also achieve the effects of correcting the spherical aberration and optical aberration of the optical system and reducing distortion while designing the optical imaging lens 10 with a large image height and a small Fno by satisfying that the first lens element 1 has a positive refracting power, the third lens element 3 has a positive refracting power, the optical axis region 751 of the object-side surface 75 of the seventh lens element 7 is concave and the optical axis region 961 of the image-side surface 96 of the ninth lens element 9 is concave.

The embodiment of the disclosure may mitigate the chromatic aberration by satisfying a material configuration of: at least three pieces of lens elements among the fifth lens element 5 to the ninth lens element 9 have Abbe numbers greater than 50.000, and when it is satisfied that the first lens element 1 has a positive refracting power, the third lens element 3 has a positive refracting power, and the optical axis region 751 of the object-side surface 75 of the seventh lens element 7 is concave in collaboration with the fourth lens element 4 has negative refracting power, the periphery region 453 of the object-side surface 45 of the fourth lens element 4 is concave, the periphery region 553 of the object-side surface 55 of the fifth lens element 5 is concave, the periphery region 563 of the image-side surface 56 of the fifth lens element 5 is convex, the periphery region 653 of the object-side surface 65 of the sixth lens element 6 is concave or the periphery region 853 of the object-side surface 85 of the eighth lens element 8 is concave, the effects of increasing the image height and reducing the Fno are achieved.

In addition, by satisfying following material configuration, not only the optical imaging lens 10 of the embodiment of the disclosure may mitigate the chromatic aberration, since different materials have different refractive indexes, by matching the materials with each other, the rays may be smoothly turned and converged to achieve better imaging quality.

the optical imaging lens 10 conforms to V4+V5+V6≥120.000, and a preferable range is 120.000≤V4+V5+V6≤140.000;

the optical imaging lens 10 conforms to V2+V7+V8≤110.000, and a preferable range is 55.000≤V2+V7+V8≤110.000;

the optical imaging lens 10 conforms to V2+V4+V7≤110.000, and a preferable range is 55.000≤V2+V4+V7≤110.000; or the optical imaging lens 10 conforms to V7+V8−V9≤30.000, and a preferable range is −20.000≤V7+V8−V9≤30.000.

In addition, in order to shorten the system length of the optical imaging lens 10, the air gaps between the lens elements or the thicknesses of the lens elements may be adjusted appropriately, but difficulty of production and the imaging quality must be considered at the same time.

Therefore, if numerical limits of the following conditions are satisfied, a better configuration is achieved:

Where, the optical imaging lens 10 may conform to ALT/(T1+G89)≤3.900, and a preferable range is 1.900≤ALT/(T1+G89)≤3.900;

the optical imaging lens 10 may conform to AAG/(T8+T9)≤2.500, and a preferable range is 1.400≤AAG/(T8+T9)≤2.500;

the optical imaging lens 10 may conform to (G12+G23+G34)/T2=1.700, and a preferable range is 1.700≤(G12+G23+G34)/T2≤2.900;

the optical imaging lens 10 may conform to BFL/(G12+G34)≤3.100, and a preferable range is 1.800≤BFL/(G12+G34)≤3.100;

the optical imaging lens 10 may conform to (T3+T5)/T4≤4.200, and a preferable range is 2.800≤(T3+T5)/T4≤4.200;

the optical imaging lens 10 may conform to (T6+T7)/G23≤4.300, and a preferable range is 2.500≤(T6+T7)/G23≤4.300;

the optical imaging lens 10 may conform to (T1+T8)/(G45+T5+G56)=1.300, and a preferred range is 1.300≤(T1+T8)/(G45+T5+G56)≤2.300;

the optical imaging lens 10 may conform to TL/(G78+T8+G89+T9)≤4.500, and a preferred range is 2.900≤TL/(G78+T8+G89+T9)≤4.500;

the optical imaging lens 10 may conform to EFL/(T5+T6+G67)≥4.500, and a preferred range is 4.500≤EFL/(T5+T6+G67)≤6.200;

the optical imaging lens 10 may conform to TTL/(T1+G89+T9)≤4.300, and a preferable range is 2.800≤TTL/(T1+G89+T9)≤4.300;

the optical imaging lens 10 may conform to (T5+T6)/(G56+G67)≥3.000, and a preferable range is 3.000≤(T5+T6)/(G56+G67)≤5.500;

the optical imaging lens 10 may conform to T1/(T3+G45)=1.000, and a preferred range is 1.000≤T1/(T3+G45)≤2.500;

the optical imaging lens 10 may conform to (T5+T8)/T2=3.000, and a preferable range is 3.000≤(T5+T8)/T2≤4.500;

the optical imaging lens 10 may conform to T1/(G23+G34+G45)=1.000, and a preferable range is 1.000≤T1/(G23+G34+G45)≤2.000;

the optical imaging lens 10 may conform to AAG/(T5+T6)≤2.800, and a preferable range is 1.000≤AAG/(T5+T6)≤2.800; and the optical imaging lens 10 may conform to (T3+G34+T4)/T6≤3.200, and a preferable range is 1.500≤(T3+G34+T4)/T6≤3.200.

Due to unpredictability of the optical system design, under the framework of the disclosure, to meet the above conditions may preferably shorten the length of the lens system of the disclosure, increase the image height, improve the imaging quality, or increase a assembly yield rate, thereby mitigating the disadvantages of the prior art.

The above-listed exemplary conditions may also be optionally combined and applied to the embodiments of the disclosure, which is not limited by the disclosure. In the implementation of the disclosure, in addition to the aforementioned conditions, other detailed structures such as more concave and convex surface arrangements of lens elements may be additionally designed for a single lens elements or a plurality of lens elements to enhance control of system performance and/or resolution. It should be noted that these details may be selectively combined and used in other embodiments of the disclosure under a premise of no confliction.

In summary, the optical imaging lens of the embodiments of the disclosure may have following effects and advantages:

First, the longitudinal spherical aberration, astigmatic aberration, and distortion of the various embodiments of the disclosure all meet usage specifications. In addition, the off-axis rays of three representative wavelengths of red, green, and blue at different heights are all concentrated near the imaging point. From the deflection amplitude of each curve, it may be seen that the imaging point deviations of the off-axis rays of different heights are controlled to achieve good suppression capabilities for spherical aberration, optical aberration and distortion. Further referring to imaging quality data, the distances between the three representative wavelengths of red, green, and blue are quite close to each other, indicating that the disclosure has good concentration ability for rays of different wavelengths under various conditions and has excellent dispersion suppression ability. In summary, the disclosure may have excellent imaging quality through the design and mutual matching of the lenses.

Second, in the optical imaging lens of the embodiments of the disclosure, when the optical imaging lens 10 satisfies that the second lens element 2 has negative refracting power and the fourth lens element 4 has negative refracting power in collaboration with one of the following combinations, the effects of correcting the spherical aberration and optical aberration of the optical system and reducing distortion may be achieved while the optical imaging lens 10 with a large image height and a small Fno is designed: (a) the optical axis region 751 of the object-side surface 75 of the seventh lens element 7 is concave and the optical axis region 961 of the image-side surface 96 of the ninth lens element 9 is concave; or (b) the periphery region 553 of the object-side surface 55 of the fifth lens element 5 is concave and the optical axis region 761 of the image-side surface 76 of the seventh lens element 7 is convex.

Third, in the optical imaging lens of the embodiments of the disclosure, by satisfying that the first lens element 1 has a positive refracting power, the third lens element 3 has a positive refracting power, the optical axis region 751 of the object-side surface 75 of the seventh lens element 7 is concave, and the optical axis region 961 of the image-side surface 96 of the ninth lens element 9 is concave, the effects of correcting the spherical aberration and optical aberration of the optical system and reducing distortion may be achieved while the optical imaging lens 10 with a large image height and a small Fno is designed.

Fourth, in the optical imaging lens of the embodiments of the disclosure, the chromatic aberration may be mitigated by satisfying a material configuration of: at least three pieces of lens elements among the fifth lens element 5 to the ninth lens element 9 have Abbe numbers greater than 50.000, and when it is satisfied that the first lens element 1 has a positive refracting power, the third lens element 3 has a positive refracting power, and the optical axis region 751 of the object-side surface 75 of the seventh lens element 7 is concave in collaboration with the fourth lens element 4 has negative refracting power, the periphery region 453 of the object-side surface 45 of the fourth lens element 4 is concave, the periphery region 553 of the object-side surface 55 of the fifth lens element 5 is concave, the periphery region 563 of the image-side surface 56 of the fifth lens element 5 is convex, the periphery region 653 of the object-side surface 65 of the sixth lens element 6 is concave or the periphery region 853 of the object-side surface 85 of the eighth lens element 8 is concave, the effects of increasing the image height and reducing the Fno are achieved.

Fifth, in the optical imaging lens of the embodiments of the disclosure, by satisfying following material configuration of: V4+V5+V6≤120.000, V2+V7+V8≤110.000, V2+V4+V7≤110.000 or V7+V8−V9≤30.000, not only the chromatic aberration is mitigated, since different materials have different refractive indexes, by matching the materials with each other, the rays may be smoothly turned and converged to achieve better imaging quality. The preferred ranges are 120.000≤V4+V5+V6≤140.000, 55.000≤V2+V7+V8≤110.000, 55.000≤V2+V4+V7≤110.000, or −20.000≤V7+V8−V9≤30.000.

Sixth, the lenses of each embodiment of the disclosure adopt an aspheric design, which avails optimizing the imaging quality.

Seventh, a material of the lenses of each embodiment of the disclosure may be a plastic material, which avails weight reduction, and may further reduce a weight of the optical imaging lens to reduce the cost.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \le A \le \alpha_1$ or $\beta_2 \le B \le \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E = \gamma_1$ or $E \ge \gamma_2$ or $\gamma_2 \le E \le \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

What is claimed is:

1. An optical imaging lens, comprising a first lens element, a second lens element, a third lens element, a fourth lens element, a fifth lens element, a sixth lens element, a seventh lens element, an eighth lens element, and a ninth lens element arranged in sequence from an object side to an image side along an optical axis, each of the first lens element to the ninth lens element comprising an object-side surface facing the object-side surface and allowing imaging rays to pass through and an image-side surface facing the image-side and allowing the imaging rays to pass through, wherein
the first lens element has positive refracting power;
the third lens element has positive refracting power;
the sixth lens element has positive refracting power;
an optical axis region of the object-side surface of the seventh lens element is concave; and
an optical axis region of the image-side surface of the ninth lens element is concave;
a periphery region of the object-side surface of the ninth lens element is concave,
wherein lens elements of the optical imaging lens are only the nine lens elements described above,
wherein the optical imaging lens further satisfies: BFL/(G12+G34)≤3.100, wherein BFL is a distance from the image-side surface of the ninth lens element to an image plane on the optical axis, G12 is an air gap between the first lens element and the second lens element on the optical axis, and G34 is an air gap between the third lens element and the fourth lens element on the optical axis.

2. The optical imaging lens according to claim 1, wherein the optical imaging lens further satisfies: ALT/(T1+G89) ≤3.900, wherein ALT is a sum of nine thicknesses of the first lens element to the ninth lens element on the optical axis, T1 is a thickness of the first lens element on the optical axis, and G89 is an air gap between the eighth lens element and the ninth lens element on the optical axis.

3. The optical imaging lens according to claim 1, wherein the optical imaging lens further satisfies: AAG/(T8+T9) ≤2.500, wherein AAG is a sum of eight air gaps from the first lens element to the ninth lens element on the optical axis, T8 is a thickness of the eighth lens element on the optical axis, and T9 is a thickness of the ninth lens element on the optical axis.

4. The optical imaging lens according to claim 1, wherein the optical imaging lens further satisfies: (G12+G23+G34)/T2≥1.700, wherein G23 is an air gap between the second lens element and the third lens element on the optical axis, and T2 is a thickness of the second lens element on the optical axis.

5. The optical imaging lens according to claim 1, wherein the optical imaging lens further satisfies: (T3+T5)/T4≤4.200, wherein T3 is a thickness of the third lens element on the optical axis, T5 is a thickness of the fifth lens element on the optical axis, and T4 is a thickness of the fourth lens element on the optical axis.

6. The optical imaging lens according to claim 1, wherein the optical imaging lens further satisfies: (T6+T7)/G23≤4.300, wherein T6 is a thickness of the sixth lens element on the optical axis, T7 is a thickness of the seventh lens element on the optical axis, and G23 is an air gap between the second lens element and the third lens element on the optical axis.

7. The optical imaging lens according to claim 1, wherein the second lens element has negative refracting power.

8. The optical imaging lens according to claim 1, wherein the optical imaging lens further satisfies: (T1+T8)/(G45+T5+G56)≥1.300, wherein T1 is a thickness of the first lens element on the optical axis, T8 is a thickness of the eighth lens element on the optical axis, G45 is an air gap between the fourth lens element and the fifth lens element on the optical axis, T5 is a thickness of the fifth lens element on the optical axis, and G56 is an air gap between the fifth lens element and the six lenses on the optical axis.

9. The optical imaging lens according to claim 1, wherein the optical imaging lens further satisfies: TL/(G78+T8+G89+T9)≤4.500, wherein TL is a distance from the object-side surface of the first lens element to the image-side surface of the ninth lens element on the optical axis, G78 is an air gap between the seventh lens element and the eighth lens element on the optical axis, T8 is a thickness of the eighth lens element on the optical axis, G89 is an air gap between the eighth lens element and the ninth lens element on the optical axis, and T9 is a thickness of the ninth lens element on the optical axis.

10. The optical imaging lens according to claim 1, wherein the optical imaging lens further satisfies: V7+V8−V9≤30.000, wherein V7 is an Abbe number of the seventh lens element, V8 is an Abbe number of the eighth lens element, and V9 is an Abbe number of the ninth lens element.

11. The optical imaging lens according to claim 1, wherein the optical imaging lens further satisfies: EFL/(T5+T6+G67)≥4.500, wherein EFL is an effective focal length of the optical imaging lens, T5 is a thickness of the fifth lens element on the optical axis, T6 is a thickness of the sixth lens element on the optical axis, and G67 is an air gap between the sixth lens element and the seventh lens element on the optical axis.

12. The optical imaging lens according to claim 1, wherein the optical imaging lens further satisfies: TTL/(T1+G89+T9)≤4.300, wherein TTL is a distance from the object-side surface of the first lens element to the image plane on the optical axis, T1 is a thickness of the first lens element on the optical axis, G89 is an air gap between the eighth lens element and the ninth lens element on the optical axis, and T9 is a thickness of the ninth lens element on the optical axis.

13. The optical imaging lens according to claim 1, wherein the optical imaging lens further satisfies: (T5+T6)/(G56+G67)≥3.000, wherein T5 is a thickness of the fifth lens element on the optical axis, T6 is a thickness of the sixth lens element on the optical axis, G56 is an air gap between the fifth lens element and the sixth lens element on the optical axis, and G67 is an air gap between the sixth lens element and the seventh lens element on the optical axis.

14. The optical imaging lens according to claim 1, wherein
a periphery region of the object-side surface of the fifth lens element is concave.

15. The optical imaging lens according to claim 1, wherein the optical imaging lens further satisfies: T1/(T3+G45)≥1.000, wherein T1 is a thickness of the first lens element on the optical axis, T3 is a thickness of the third lens element on the optical axis, and G45 is an air gap between the fourth lens element and the fifth lens element on the optical axis.

16. The optical imaging lens according to claim 1, wherein the optical imaging lens further satisfies: (T5+T8)/T2≥3.000, wherein T5 is a thickness of the fifth lens element on the optical axis, T8 is a thickness of the eighth lens element on the optical axis, and T2 is a thickness of the second lens element on the optical axis.

17. The optical imaging lens according to claim 1, wherein the optical imaging lens further satisfies: T1/(G23+G34+G45)≥1.000, wherein T1 is a thickness of the first lens element on the optical axis, G23 is an air gap between the second lens element and the third lens element on the optical axis, and G45 is an air gap between the fourth lens element and the fifth lens element on the optical axis.

18. The optical imaging lens according to claim 1, wherein the optical imaging lens further satisfies: AAG/(T5+T6)≤2.800, wherein AAG is a sum of eight air gaps from the first lens element to the ninth lens element on the optical axis, T5 is a thickness of the fifth lens element on the optical axis, and T6 is a thickness of the sixth lens element on the optical axis.

19. The optical imaging lens according to claim 1, wherein the optical imaging lens further satisfies: (T3+G34+T4)/T6≤3.200, wherein T3 is a thickness of the third lens element on the optical axis, T4 is a thickness of the fourth lens element on the optical axis, and T6 is a thickness of the sixth lens element on the optical axis.

* * * * *